(12) United States Patent
Tonami

(10) Patent No.: US 7,385,900 B2
(45) Date of Patent: Jun. 10, 2008

(54) REPRODUCING APPARATUS

(75) Inventor: Junichiro Tonami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 695 days.

(21) Appl. No.: 11/055,613

(22) Filed: Feb. 11, 2005

(65) Prior Publication Data

US 2005/0207516 A1 Sep. 22, 2005

(30) Foreign Application Priority Data

Mar. 17, 2004 (JP) .............................. 2004-076613

(51) Int. Cl.
*G11B 7/09* (2006.01)
*G11B 20/10* (2006.01)
*H03K 5/159* (2006.01)

(52) U.S. Cl. .............................. 369/59.22; 369/59.21; 369/124.05; 369/59.19; 375/232

(58) Field of Classification Search ............. 369/59.22, 369/59.21, 59.19, 124.05; 375/232
See application file for complete search history.

(56) References Cited

U.S. PATENT DOCUMENTS

| | | | | |
|---|---|---|---|---|
| 3,801,913 | A * | 4/1974 | Daguet et al. ............... | 708/322 |
| 6,396,542 | B1 * | 5/2002 | Patel .......................... | 348/445 |
| 6,445,662 | B1 * | 9/2002 | Tonami ..................... | 369/59.21 |
| 6,661,761 | B2 * | 12/2003 | Hayami et al. ........... | 369/59.21 |
| 6,690,635 | B2 * | 2/2004 | Tonami ..................... | 369/59.22 |
| 6,816,547 | B1 * | 11/2004 | Kuribayashi ................. | 375/229 |
| 6,836,456 | B2 * | 12/2004 | Tonami ..................... | 369/59.22 |
| 6,876,618 | B2 * | 4/2005 | Tonami et al. ........... | 369/59.21 |
| 6,914,867 | B2 * | 7/2005 | Tonami ..................... | 369/59.22 |
| 2006/0028749 | A1 * | 2/2006 | Tonami et al. ................. | 360/39 |
| 2006/0123328 | A1 * | 6/2006 | Tonami et al. .............. | 714/801 |

FOREIGN PATENT DOCUMENTS

| | | |
|---|---|---|
| JP | 07-192270 | 7/1995 |
| JP | 10-106161 | 4/1998 |
| JP | 3395734 | 1/2001 |

* cited by examiner

*Primary Examiner*—Gautam R Patel
(74) *Attorney, Agent, or Firm*—Louis Woo

(57) ABSTRACT

A transversal filter subjects a reproduced signal to partial-response waveform equalization responsive to tap coefficients to generate an equalization-resultant signal. There is generated 0-point information representing whether or not the reproduced signal corresponds to a zero-cross point. A temporary decision device calculates a temporary decision value of the equalization-resultant signal on the basis of a PR mode signal, an RLL mode signal, at least four successive samples of the 0-point information, and at least four successive samples of the equalization-resultant signal. Calculation is made as to a difference between the temporary decision value of the equalization-resultant signal and an actual value thereof. An error signal is generated in response to the calculated difference. The tap coefficients of the transversal filter are controlled in response to the generated error signal. The partial-response waveform equalization is PR(a, b, b, b, a).

13 Claims, 32 Drawing Sheets

→ TIME

→ TIME

OUTPUT VALUE/INPUT VALUE
(AT DETECTION SIDE)

| RLL \ PR | PR (a, b, b, b, a) | PR (1, 2, 2, 2, 1) | PR (1, 3, 3, 3, 1) |
|---|---|---|---|
| RLL (1, X) | 2a+3b | 8 | 11 |
| | a+3b | 7 | 10 |
| | 3b | 6 | 9 |
| | a+2b | 5 | 7 |
| | 2b | 4 | 6 |
| | 2a+b | 4 | 5 |
| | a+b | 3 | 4 |
| | 2a | 2 | 2 |
| | a | 1 | 1 |
| | 0 | 0 | 0 |

| RLL \ PR | PR (a, b, b, b, a) | PR (1, 2, 2, 2, 1) | PR (1, 3, 3, 3, 1) | PR (1, 1, 1, 1, 1) |
|---|---|---|---|---|
| RLL (2, X) | 2a+3b | 8 | 11 | 5 |
| | a+3b | 7 | 10 | 4 |
| | 3b | 6 | 9 | 3 |
| | a+2b | 5 | 7 | 3 |
| | a+b | 3 | 4 | 2 |
| | 2a | 2 | 2 | 2 |
| | a | 1 | 1 | 1 |
| | 0 | 0 | 0 | 0 |

OUTPUT VALUE/INPUT VALUE
(AT DETECTION SIDE)

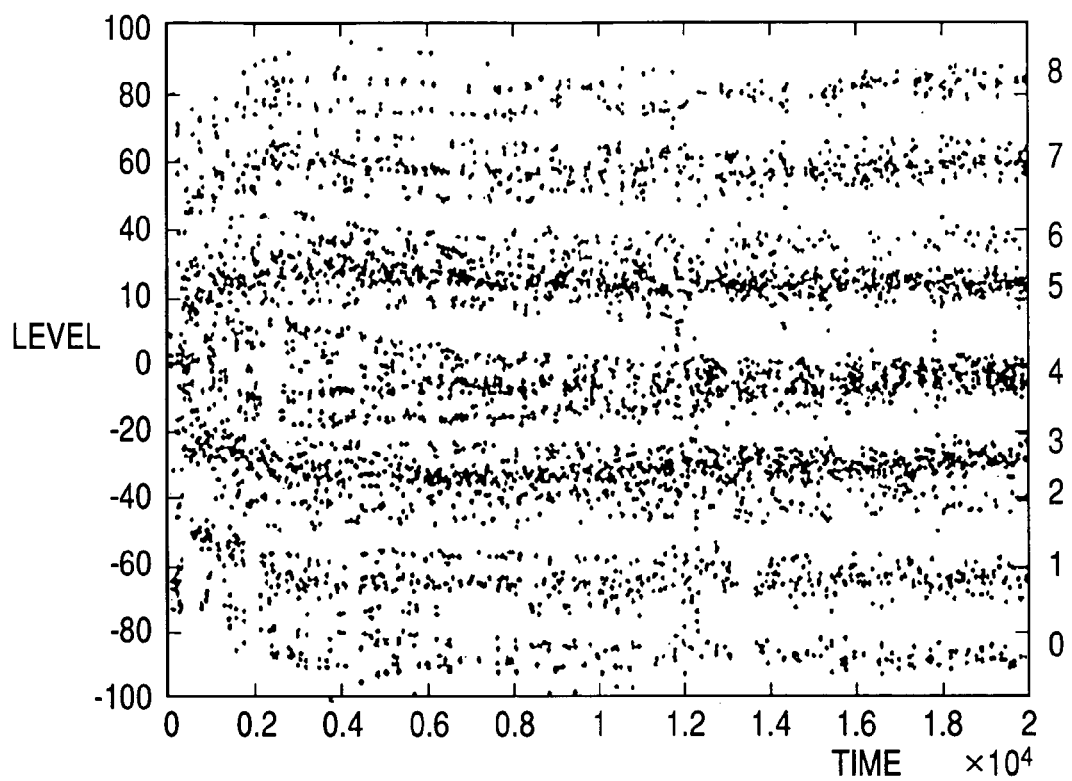
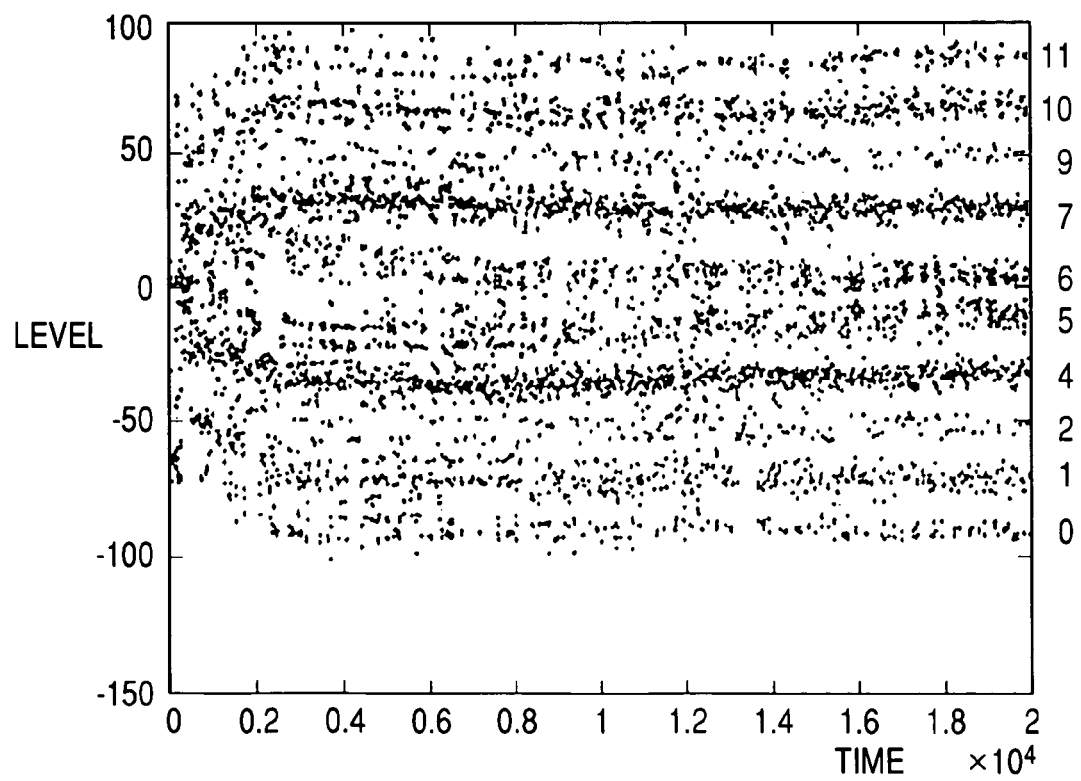

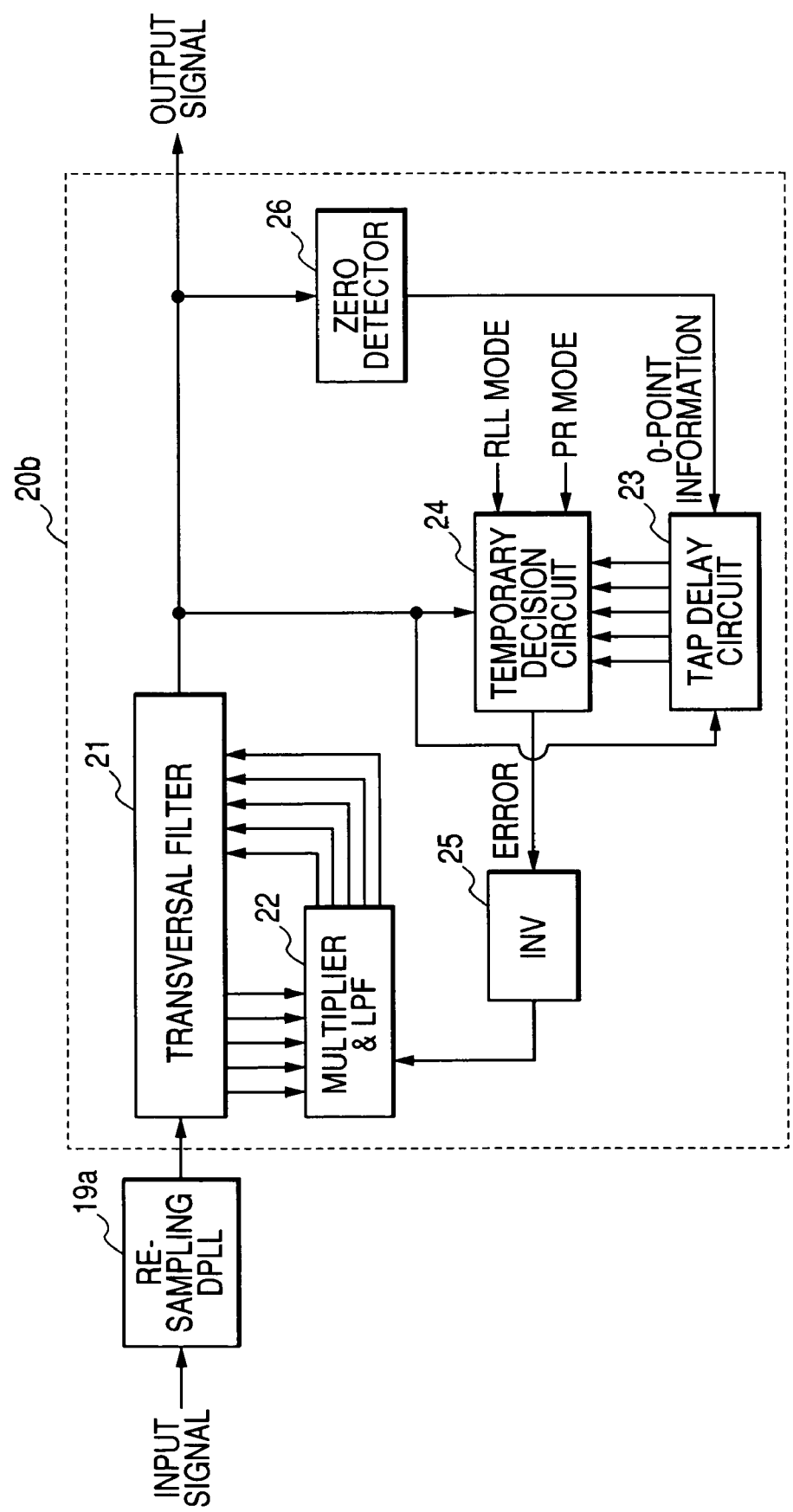

FIG. 34 dk, dk+1=00

| C0, C1, C2 ..... C8 |
|---|
| 010 000 000 |
| 010 000 010 |
| 010 000 100 |
| 001 001 000 |
| 001 001 010 |
| ..... |
| 001 010 100 | dk, dk+1=01

| C0, C1, C2 ..... C8 |
|---|
| 000 000 000 |
| 000 000 010 |
| 000 000 100 |
| 001 000 000 |
| 000 000 010 |
| ..... |
| 001 010 000 | dk, dk+1=10

| C0, C1, C2 ..... C8 |
|---|
| 000 010 010 |
| 000 010 100 |
| 010 010 010 |
| 010 010 100 |
| 000 101 000 |
| ..... |
| 010 101 010 | dk, dk+1=11

| C0, C1, C2 ..... C8 |
|---|
| 000 010 000 |
| 010 010 000 |
| 000 100 000 |
| 000 100 010 |
| 010 100 000 |
| ..... |
| 010 100 100 |

FIG. 35

$(d_k, d_{k+1}, d_{k+2}, \ldots d_{k+7}) =$

0000000

| C0, C1, C2 ..... C44 |
|---|
| 010 000 ... 000 |
| 010 000 ... 010 |
| 010 000 ... 100 |
| 001 001 ... 000 |
| 001 001 ... 010 |
| .... |
| 001 010 ... 100 |

00000001

| C0, C1, C2 ..... C44 |
|---|
| 000 000 ... 000 |
| 000 000 ... 010 |
| 000 000 ... 100 |
| 001 000 ... 000 |
| 000 000 ... 010 |
| .... |
| 001 010 ... 000 |

. . . .

10010010

| C0, C1, C2 ..... C44 |
|---|
| 000 010 ... 000 |
| 010 010 ... 000 |
| 000 100 ... 000 |
| 000 100 ... 000 |
| 010 100 ... 010 |
| .... |
| 010 100 ... 100 |

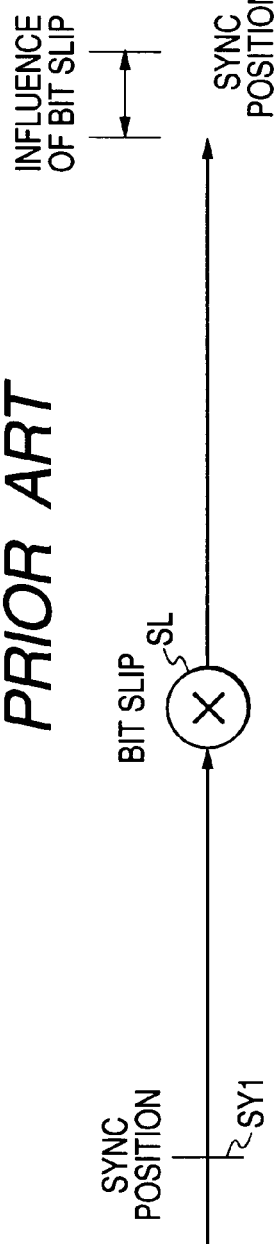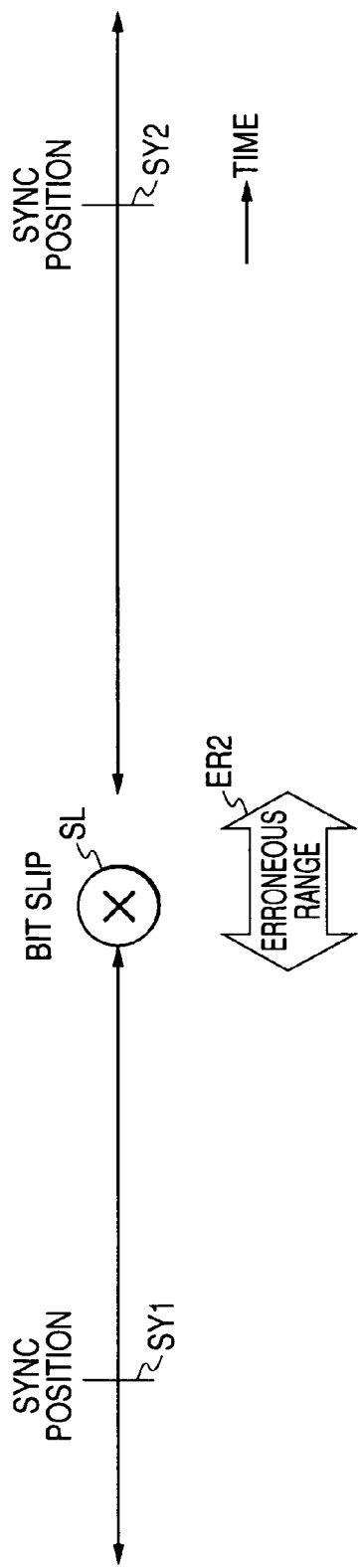

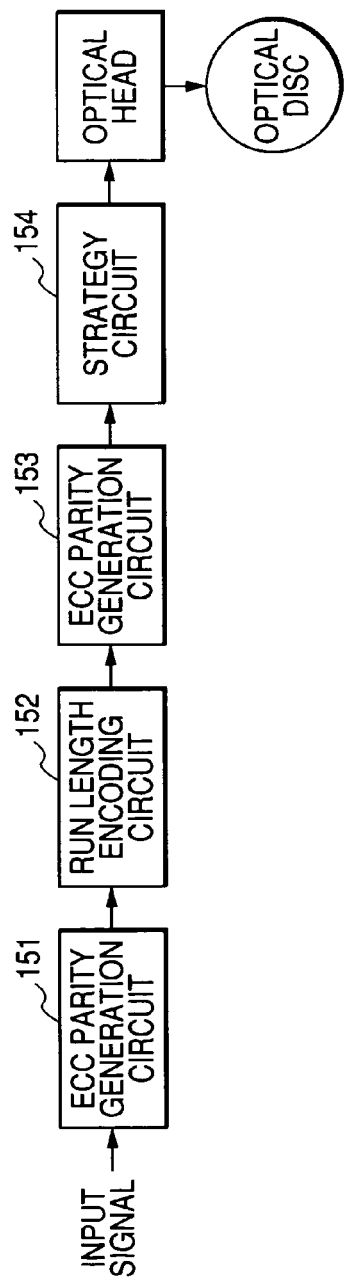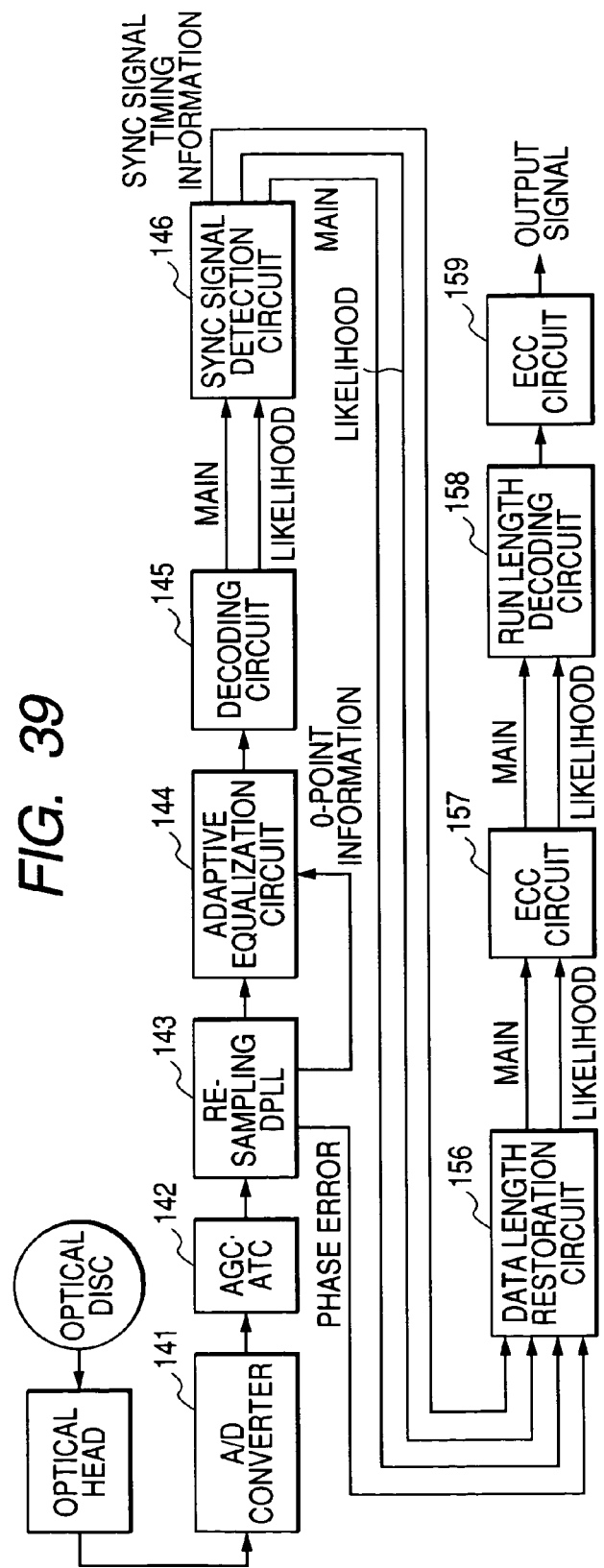

REPRODUCING APPARATUS

BACKGROUND OF THE INVENTION

1. Field of the Invention

This invention generally relates to an apparatus for reproducing information from a recording medium. This invention particularly relates to an apparatus for reproducing a signal of a run-length-limited code from a recording medium such as an optical disc. This invention also relates to an apparatus for recording and reproducing a signal of a run-length-limited code on and from a recording medium such as an optical disc.

2. Description of the Related Art

Japanese patent application publication number 10-106161/1998 discloses an optical information reproducing apparatus based on a PRML (partial response maximum likelihood) system. In the apparatus of Japanese application 10-106161, information of a run-length-limited code is reproduced from an optical disc through a reproducing section, and a transversal filter subjects the reproduced waveform to partial-response equalization depending on tap coefficients. An example of the partial-response equalization is PR(1, X, X, 1) equalization. The output signal of the transversal filter is decoded into binary data by a maximum-likelihood decoder. A parameter setting device selects intersymbol-interference imparting values in the partial-response equalization in accordance with the characteristics of the reproduced waveform. Furthermore, the parameter setting device sets the tap coefficients of the transversal filter and a decision point signal level for the maximum-likelihood decoder as parameters in response to the selected intersymbol-interference imparting values.

In the apparatus of Japanese application 10-106161, the parameter setting device includes a memory loaded with parameter-setting reference data. A target after-equalization waveform is determined on the basis of the parameter-setting reference data and the selected intersymbol-interference imparting values. The apparatus of Japanese application 10-106161 premises that the optical disc has predetermined pits (reference pits) representative of the parameter-setting reference data. A reference-data signal is reproduced from the predetermined pits in the optical disc. The tap coefficients of the transversal filter are set to equalize the waveform of the reproduced reference-data signal to the target after-equalization waveform.

In the apparatus of Japanese application 10-106161, the parameter setting device also includes an error-rate deciding device which compares the binary data outputted from the maximum-likelihood decoder and the parameter-setting reference data fed from the memory to calculate the rate of bit errors therebetween. The error-rate deciding device judges whether or not the calculated bit error rate is within an allowable range. The selection of intersymbol-interference imparting values are responsive to the result of the judgment by the error-rate deciding device. The tap coefficients of the transversal filter and the decision point signal level for the maximum-likelihood decoder which occur when the calculated bit error rate is within the allowable range are actually used in the partial-response equalization and the decoding procedure. Japanese application 10-106161 discloses that the PR(1, X, X, 1) equalization may be replaced by PR(1, X1, X2, . . . , Xn, 1) equalization where "n" denotes an integer equal to or greater than 1.

The apparatus of Japanese application 10-106161 fails to implement suitable waveform equalization for a signal reproduced from an optical disc which lacks predetermined pits representative of parameter-setting reference data.

Japanese patent application publication number 7-192270/1995 discloses an apparatus for reproducing a digital signal of a run-length-limited code from an optical disc. The apparatus of Japanese application 7-192270 uses a method suited for a high information recording density. The method in Japanese application 7-192270 performs ternary equalization whose objects are only an amplitude except for points corresponding to a data train provided with a minimum code inverting gap among points just before and just after the inverting position of a code and amplitude at the inverting position of the code.

In the apparatus of Japanese application 7-192270, a signal is read out from an optical disc by an optical head, and the read-out signal is applied through an amplifier to an equalizer. A decider following the equalizer discriminates the level of the output signal of the equalizer. The decider includes two comparators. The output signals of the comparators are fed to an error calculation circuit as level discrimination results. Since the decider includes the two comparators, the signal processing by the decider is relatively complicated and the level discrimination results provided by the decider tend to be adversely affected by noise and signal distortion.

U.S. Pat. No. 6,445,662 corresponding to Japanese patent number P3395734 (publication number 2001-110146) discloses first and second reproducing apparatuses.

The first reproducing apparatus in U.S. Pat. No. 6,445,662 includes first means for reproducing a signal of a run-length-limited code from a recording medium, and a transversal filter for subjecting the signal reproduced by the first means to a partial-response waveform equalization to generate an equalization-resultant signal. The partial-response waveform equalization depends on tap coefficients. The first reproducing apparatus also includes second means for detecting whether or not the signal reproduced by the first means corresponds to a zero-cross point, and for generating 0-point information in response to a result of the detection, a delay circuit responsive to the 0-point information generated by the second means for outputting at least three successive samples of the 0-point information, and a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal. The PR mode signal represents a type of the partial-response waveform equalization. Preferably, the type of the partial-response waveform equalization is expressed as PR(a, b, b, a). The RLL mode signal represents a type of the run-length-limited code. The first reproducing apparatus further includes third means for calculating a difference between the temporary decision value of the equalization-resultant signal and the actual value thereof, and for generating an error signal in response to the calculated difference, and fourth means for controlling the tap coefficients of the transversal filter in response to the error signal generated by the third means so that the error signal can be minimized.

The second reproducing apparatus in U.S. Pat. No. 6,445,662 includes first means for reproducing a signal of a run-length-limited code from a recording medium, and a transversal filter for subjecting the signal reproduced by the first means to a partial-response waveform equalization to generate an equalization-resultant signal. The partial-response waveform equalization depends on tap coefficients.

The second reproducing apparatus also includes second means for detecting whether or not the equalization-resultant signal generated by the transversal filter corresponds to a zero-cross point, and for generating 0-point information in response to a result of the detection, a delay circuit responsive to the 0-point information generated by the second means for outputting at least three successive samples of the 0-point information, and a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal. The PR mode signal represents a type of the partial-response waveform equalization. Preferably, the type of the partial-response waveform equalization is expressed as PR(a, b, b, a). The RLL mode signal represents a type of the run-length-limited code. The second reproducing apparatus further includes third means for calculating a difference between the temporary decision value of the equalization-resultant signal and the actual value thereof, and for generating an error signal in response to the calculated difference, and fourth means for controlling the tap coefficients of the transversal filter in response to the error signal generated by the third means so that the error signal can be minimized.

In U.S. Pat. No. 6,445,662, the first reproducing apparatus may further includes an error selection circuit for extracting effective components from the error signal in response to the temporary decision value to generate an effective error signal which replaces the original error signal. Alternatively, the first reproducing apparatus may further includes an error selection circuit for extracting effective components from the error signal in response to the successive samples of the 0-point information to generate an effective error signal which replaces the original error signal.

U.S. Pat. No. 6,445,662 does not disclose the implementation of partial-response waveform equalization of a type "PR(a, b, b, a)".

SUMMARY OF THE INVENTION

It is a first object of this invention to provide a reliable reproducing apparatus including a waveform equalization circuit for subjecting a reproduced signal of a run-length-limited code to partial-response waveform equalization of a type "PR(a, b, b, a)".

It is a second object of this invention to provide a reliable recording and reproducing apparatus including a waveform equalization circuit for subjecting a reproduced signal of a run-length-limited code to partial-response waveform equalization of a type "PR(a, b, b, a)".

A first aspect of this invention provides a reproducing apparatus comprising first means for reproducing a signal of a run-length-limited code from a recording medium; a transversal filter for subjecting the signal reproduced by the first means to partial-response waveform equalization to generate an equalization-resultant signal, the partial-response waveform equalization depending on tap coefficients; second means for detecting whether or not the signal reproduced by the first means corresponds to a zero-cross point, and generating 0-point information in response to a result of said detecting; a first delay circuit responsive to the 0-point information generated by the second means for outputting at least four successive samples of the 0-point information; a second delay circuit responsive to the equalization-resultant signal generated by the transversal filter for outputting at least four successive samples of the equalization-resultant signal; a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code; third means for calculating a difference between the temporary decision value of the equalization-resultant signal and an actual value thereof, and generating an error signal in response to the calculated difference; and fourth means for controlling the tap coefficients of the transversal filter in response to the error signal generated by the third means; wherein the type of the partial-response waveform equalization is PR(a, b, b, b, a).

A second aspect of this invention provides a reproducing apparatus comprising first means for reproducing a signal of a run-length-limited code from a recording medium; a transversal filter for subjecting the signal reproduced by the first means to partial-response waveform equalization to generate an equalization-resultant signal, the partial-response waveform equalization depending on tap coefficients; second means for detecting whether or not the equalization-resultant signal generated by the transversal filter corresponds to a zero-cross point, and generating 0-point information in response to a result of said detecting; a first delay circuit responsive to the 0-point information generated by the second means for outputting at least four successive samples of the 0-point information; a second delay circuit responsive to the equalization-resultant signal generated by the transversal filter for outputting at least four successive samples of the equalization-resultant signal; a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code; third means for calculating a difference between the temporary decision value of the equalization-resultant signal and an actual value thereof, and generating an error signal in response to the calculated difference; and fourth means for controlling the tap coefficients of the transversal filter in response to the error signal generated by the third means; wherein the type of the partial-response waveform equalization is PR(a, b, b, b, a).

A third aspect of this invention is based on the first aspect thereof, and provides a reproducing apparatus wherein the temporary decision device comprises means for designating a positionally-intermediate one among the successive samples of the 0-point information as a sample of interest; means for determining whether or not the 0-point information sample of interest does not correspond to a zero-cross point and the 0-point information samples immediately preceding and immediately following the 0-point information sample of interest correspond to zero-cross points; means for, in cases where it is determined that the 0-point information sample of interest does not correspond to a zero-cross point and the 0-point information samples immediately preceding and immediately following the 0-point information sample of interest correspond to zero-cross points, providing first target values of three successive ones among the successive samples of the equalization-resultant signal and providing second target values of the three successive ones among the successive samples of the equalization-resultant signal, the first target values corresponding to a first signal state transition and a first polarity of object one among the successive samples of the equalization-resultant signal which relates to the 0-point information sample of interest, the second target values corresponding to a second signal state transition different from the first signal state transition and a second polarity of the object one among the successive samples of the equalization-resultant signal which is opposite to the first polarity; means for calculating a first sum of the squares of Euclidean distances between the first target values of the three successive ones among the successive samples of the equalization-resultant signal and actual values thereof; means for calculating a second sum of the squares of Euclidean distances between the second target values of the three successive ones among the successive samples of the equalization-resultant signal and the actual values thereof; means for determining smaller one of the first and second sums; means for concluding an actual polarity of the object one among the successive samples of the equalization-resultant signal to be one of the first and second polarities which relates to the smaller one of the first and second sums; and means for calculating the temporary decision value of the equalization-resultant signal on the basis of the concluded actual polarity of the object one among the successive samples of the equalization-resultant signal.

A fourth aspect of this invention is based on the first aspect thereof, and provides a reproducing apparatus wherein the temporary decision device comprises means for designating a positionally-intermediate one among the successive samples of the 0-point information as a sample of interest; means for determining whether or not the 0-point information sample of interest does not correspond to a zero-cross point and the 0-point information samples immediately preceding and immediately following the 0-point information sample of interest correspond to zero-cross points; means for determining whether or not the 0-point information sample of interest does not correspond to a zero-cross point and only the 0-point information sample immediately following the 0-point information sample of interest corresponds to a zero-cross point; means for determining whether or not the 0-point information sample of interest corresponds to a zero-cross point and none of the others of the successive samples of the 0-point information corresponds to a zero-cross point; and means for calculating the temporary decision value of the equalization-resultant signal on the basis of a polarity of one among the successive samples of the equalization-resultant signal which positionally neighbors an equalization-resultant signal sample corresponding to the 0-point information sample of interest in cases where it is determined that the 0-point information sample of interest does not correspond to a zero-cross point and the 0-point information samples immediately preceding and immediately following the 0-point information sample of interest correspond to zero-cross points, in cases where the 0-point information sample of interest does not correspond to a zero-cross point and only the 0-point information sample immediately following the 0-point information sample of interest corresponds to a zero-cross point, and in cases where the 0-point information sample of interest corresponds to a zero-cross point and none of the others of the successive samples of the 0-point information corresponds to a zero-cross point.

A fifth aspect of this invention is based on the first aspect thereof, and provides a reproducing apparatus further comprising an A/D converter for sampling the signal reproduced by the first means in response to a system clock signal to generate a sampled signal, and converting the sampled signal into a digital signal; and means for re-sampling the digital signal generated by the A/D converter at a desired bit rate to generate a re-sampling resultant signal, and feeding the re-sampling resultant signal to the transversal filter.

A sixth aspect of this invention is based on the second aspect thereof, and provides a reproducing apparatus wherein the second means comprises means for detecting a polarity inversion of the equalization-resultant signal, means for selecting one of two samples of the equalization-resultant signal which are positionally adjacent to the detected polarity inversion, the selected one of the samples being closer to a value of "0", and means for generating the 0-point information in response to the selected sample.

A seventh aspect of this invention is based on the first aspect thereof, and provides a reproducing apparatus further comprising means for determining whether or not the temporary decision value is in a predetermined range at least a given value away from a zero level, and means for fixing the error signal to a value of "0" when it is determined that the temporary decision value is in the predetermined range.

An eighth aspect of this invention is based on the first aspect thereof, and provides a reproducing apparatus wherein the type of the partial-response waveform equalization is PR(1, 1, 1, 1, 1).

A ninth aspect of this invention provides a recording and reproducing apparatus comprising first means for generating a parity signal in response to an input signal, and adding the parity signal to the input signal to generate a parity-added signal; a run length encoder for converting every "m" bits of the parity-added signal to "n" bits of a signal of a run-length-limited code, where "m"<"n"; second means for recording the signal of the run-length-limited code on a recording medium; third means for reproducing the signal of the run-length-limited code from the recording medium; an A/D converter for converting the signal reproduced by the third means into a digital reproduced signal; a phase locked loop for re-sampling the digital reproduced signal at a re-sampling frequency to generate a re-sampling resultant signal, extracting a phase error from the digital reproduced signal, and controlling the re-sampling frequency in response to the extracted phase error; fourth means for detecting whether or not the re-sampling resultant signal generated by the phase locked loop corresponds to a zero-cross point, and generating 0-point information in response to a result of said detecting; an adaptive equalizer for subjecting the re-sampling resultant signal to waveform equalization in response to the 0-point information generated by the fourth means to generate an equalization-resultant signal; a maximum likelihood decoder for subjecting the equalization-resultant signal to maximum likelihood decoding to generate a first decoding-resultant signal and first likelihood information relating to the first decoding-resultant signal; a run length decoder for converting every "n" bits of the first decoding-resultant signal to "m" bits of a second decoding-resultant signal, and converting the first likelihood information to second likelihood information relating to the second decoding-resultant signal; and fifth means for subjecting the second decoding-resultant signal generated by the run length decoder to error correction in response to a parity signal contained in the second decoding-resultant signal.

A tenth aspect of this invention provides a reproducing apparatus comprising first means for reproducing a signal of a run-length-limited code from the recording medium; an A/D converter for converting the signal reproduced by the first means into a digital reproduced signal; a phase locked loop for re-sampling the digital reproduced signal at a re-sampling frequency to generate a re-sampling resultant signal, extracting a phase error from the digital reproduced signal, and controlling the re-sampling frequency in response to the extracted phase error; second means for detecting whether or not the digital reproduced signal corresponds to a zero-cross point, and generating 0-point information in response to a result of said detecting; an adaptive equalizer for subjecting the re-sampling resultant signal to waveform equalization in response to the 0-point information generated by the second means to generate an equalization-resultant signal; a maximum likelihood decoder for subjecting the equalization-resultant signal to maximum likelihood decoding to generate a first decoding-resultant signal and first likelihood information relating to the first decoding-resultant signal; a sync signal detector for detecting every sync signal in the first decoding-resultant signal; third means for measuring a time interval between adjacent sync signals detected by the sync signal detector; fourth means for determining whether or not the time interval measured by the third means is equal to a predetermined reference value; fifth means for detecting at least one of (1) when an absolute value of the phase error exceeds a prescribed threshold value and (2) when the absolute value of the phase error is maximized, and generating slip point information representing a time position corresponding to said detecting; sixth means for subjecting the first decoding-resultant signal and the first likelihood information to data length adjustment at the time position represented by the slip point information to generate a second decoding-resultant signal and second likelihood information in cases where the fourth means determines that the time interval measured by the third means is not equal to the predetermined reference value and the fifth means detects at least one of (1) when the absolute value of the phase error exceeds the prescribed threshold value and (2) when the absolute value of the phase error is maximized and; and a run length decoder for converting every "n" bits of the second decoding-resultant signal to "m" bits of a third decoding-resultant signal, and converting the second likelihood information to third likelihood information relating to the third decoding-resultant signal, where "m"<"n".

An eleventh aspect of this invention provides a reproducing apparatus comprising first means for reproducing a signal of a run-length-limited code from the recording medium; an A/D converter for converting the signal reproduced by the first means into a digital reproduced signal; a phase locked loop for re-sampling the digital reproduced signal at a re-sampling frequency to generate a re-sampling resultant signal, extracting a phase error from the digital reproduced signal, and controlling the re-sampling frequency in response to the extracted phase error; second means for detecting whether or not the re-sampling resultant signal corresponds to a zero-cross point, and generating 0-point information in response to a result of said detecting; an adaptive equalizer for subjecting the re-sampling resultant signal to waveform equalization in response to the 0-point information generated by the second means to generate an equalization-resultant signal; a maximum likelihood decoder for subjecting the equalization-resultant signal to maximum likelihood decoding to generate a first decoding-resultant signal and first likelihood information relating to the first decoding-resultant signal; a sync signal detector for detecting every sync signal in the first decoding-resultant signal; third means for measuring a time interval between adjacent sync signals detected by the sync signal detector; fourth means for determining whether or not the time interval measured by the third means is equal to a predetermined reference value; fifth means for detecting at least one of (1) when an absolute value of the phase error exceeds a prescribed threshold value and (2) when the absolute value of the phase error is maximized, and generating slip point information representing a time position corresponding to said detecting; sixth means for subjecting the first decoding-resultant signal and the first likelihood information to data length adjustment at the time position represented by the slip point information to generate a second decoding-resultant signal and second likelihood information in cases where the fourth means determines that the time interval measured by the third means is not equal to the predetermined reference value and the fifth means detects at least one of (1) when the absolute value of the phase error exceeds the prescribed threshold value and (2) when the absolute value of the phase error is maximized and; and a run length decoder for converting every "n" bits of the second decoding-resultant signal to "m" bits of a third decoding-resultant signal, and converting the second likelihood information to third likelihood information relating to the third decoding-resultant signal, where "m"<"n".

A twelfth aspect of this invention is based on the tenth aspect thereof, and provides a reproducing apparatus wherein the adaptive equalizer comprises a transversal filter for subjecting the re-sampling resultant signal to partial-response waveform equalization to generate the equalization-resultant signal, the partial-response waveform equalization depending on tap coefficients; a first delay circuit responsive to the 0-point information for outputting at least four successive samples of the 0-point information; a second delay circuit responsive to the equalization-resultant signal for outputting at least four successive samples of the equalization-resultant signal; a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code; means for calculating a difference between the temporary decision value of the equalization-resultant signal and an actual value thereof, and generating an error signal in response to the calculated difference; and means for controlling the tap coefficients of the transversal filter in response to the generated error signal; wherein the type of the partial-response waveform equalization is PR(a, b, b, b, a).

A thirteenth aspect of this invention is based on the eleventh aspect thereof, and provides a reproducing apparatus wherein the adaptive equalizer comprises a transversal filter for subjecting the re-sampling resultant signal to partial-response waveform equalization to generate the equalization-resultant signal, the partial-response waveform equalization depending on tap coefficients; a first delay circuit responsive to the 0-point information for outputting at least four successive samples of the 0-point information; a second delay circuit responsive to the equalization-resultant signal for outputting at least four successive samples of the equalization-resultant signal; a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code; means for calculating a difference between the temporary decision value of the equalization-resultant signal and an actual value thereof, and generating an error signal in response to the calculated difference; and means for controlling the tap coefficients of the transversal filter in response to the generated error signal; wherein the type of the partial-response waveform equalization is PR(a, b, b, b, a).

The present invention provides advantages indicated hereafter. In this invention, the transversal filter subjects an input signal to partial-response waveform equalization responsive to tap coefficients to generate an equalization-resultant signal. A temporary decision value of the equalization-resultant signal is calculated on the basis of a PR mode signal, at least four successive samples of the 0-point information, and at least four successive samples of the equalization-resultant signal. Thus, the calculated temporary decision value is prevented from being adversely affected by the level of a current sample of the equalization-resultant signal or the input signal. The PR mode signal designates a type of the partial-response waveform equalization as PR(a, b, b, b, a). An error signal is generated in response to the difference between the calculated temporary decision value and an actual value of the equalization-resultant signal. The tap coefficients of the transversal filter are controlled in response to the generated error signal. Accordingly, it is possible to prevent the partial-response waveform equalization from being adversely affected by the level of the current sample of the input signal or the equalization-resultant signal. The partial-response waveform equalization can be changed among different types. A convergence time related to the partial-response waveform equalization can be shorter than that in a prior-art system using fixed tap coefficients.

According to this invention, in cases where the 0-point information sample of interest does not correspond to a zero-cross point and the 0-point information samples immediately preceding and immediately following the 0-point information sample of interest correspond to zero-cross points, first target values of three successive ones among the successive samples of the equalization-resultant signal and second target values of the three successive ones among the successive samples of the equalization-resultant signal are provided. The first target values correspond to a first signal state transition and a first polarity of object one among the successive samples of the equalization-resultant signal which relates to the 0-point information sample of interest. The second target values correspond to a second signal state transition different from the first signal state transition and a second polarity of the object one among the successive samples of the equalization-resultant signal which is opposite to the first polarity. Calculation is made as to a first sum of the squares of Euclidean distances between the first target values of the three successive ones among the successive samples of the equalization-resultant signal and actual values thereof, and a second sum of the squares of Euclidean distances between the second target values of the three successive ones among the successive samples of the equalization-resultant signal and the actual values thereof. Smaller one of the first and second sums is determined. An actual polarity of the object one among the successive samples of the equalization-resultant signal is concluded to be one of the first and second polarities which relates to the smaller one of the first and second sums. The temporary decision value of the equalization-resultant signal is calculated on the basis of the concluded actual polarity of the object one among the successive samples of the equalization-resultant signal. Accordingly, the calculated temporary decision value can be accurate even when the equalization-resultant signal has a relatively small level and is positionally close to the zero-cross points.

In this invention, the error signal is fixed to a value of "0" when the temporary decision value is in a predetermined range at least a given value away from the zero level. Thus, the error signal which is unlikely can be nullified. Only the error signal which is likely can be effectively used. Therefore, even the equalization-resultant signal which has a great distortion can be converged on correct target values. As a result, the signal error rate can be improved.

In this invention, the input signal is of a run-length-limited code. The temporary decision value of the equalization-resultant signal is calculated on the basis of an RLL mode signal representing a type of the run-length-limited code which can be changed between RLL(1, X) and RLL(2, X). This invention can be provided by digital circuits high in reliability and small in circuit scale.

According to this invention, when at least four successive samples of the 0-point information are in a prescribed pattern corresponding to conditions where the polarity of an object sample of the equalization-resultant signal is vague, the temporary decision value of the equalization-resultant signal is calculated on the basis of the polarity of one among the successive samples of the equalization-resultant signal which neighbors the object sample. Therefore, even when the polarity of an object sample of the equalization-resultant signal is vague, the calculated temporary decision value can be accurate.

In this invention, the phase locked loop re-samples the digital reproduced signal to generate a re-sampling resultant signal, and extracts a phase error from the digital reproduced signal. The adaptive equalizer subjects the re-sampling resultant signal to waveform equalization to generate an equalization-resultant signal. The maximum likelihood decoder subjects the equalization-resultant signal to maximum likelihood decoding to generate a first decoding-resultant signal. The sync signal detector operates for detecting every sync signal in the first decoding-resultant signal. The time interval between adjacent detected sync signals is measured. The first decoding-resultant signal is subjected to data length adjustment at the time position represented by the slip point information to generate a second decoding-resultant signal in cases where the measured time interval differs from a predetermined reference value and the absolute value of the phase error exceeds the prescribed threshold value or the absolute value of the phase error is maximized. Therefore, in the event that a bit slip occurs, bit positions after the bit slip can be set to likely positions. Accordingly, the error rate can be remarkably improved.

BRIEF DESCRIPTION OF THE DRAWINGS

FIG. 17 is a time-domain diagram of the eye pattern indicated by a PR(1, 2, 2, 2, 1) equalization-resultant signal outputted from the adaptive equalization circuit in FIGS. 1 and 3.

FIG. 18 is a time-domain diagram of the eye pattern indicated by a PR(1, 3, 3, 3, 1) equalization-resultant signal outputted from the adaptive equalization circuit in FIGS. 1 and 3.

FIG. 19 is a block diagram of a portion of a reproducing apparatus according to a second embodiment of this invention.

FIG. 34 is a diagram of the contents of first decoding tables used by a run length decoder in FIG. 33.

FIG. 35 is a diagram of the contents of second decoding tables used by the run length decoder in FIG. 33.

FIG. 36 is a time-domain diagram of an example of sync positions, a bit slip occurrence position, and an erroneous range occurring in a prior-art system.

FIG. 37 is a time-domain diagram of an example of sync positions, a bit slip occurrence position, and an erroneous range occurring in the recording and reproducing apparatus according to the seventh embodiment of this invention.

FIG. 38 is a block diagram of the recording side of a recording and reproducing apparatus according to an eighth embodiment of this invention.

FIG. 39 is a block diagram of the reproducing side of the recording and reproducing apparatus in the eighth embodiment of this invention.

DETAILED DESCRIPTION OF THE INVENTION

First Embodiment

Figure 1:
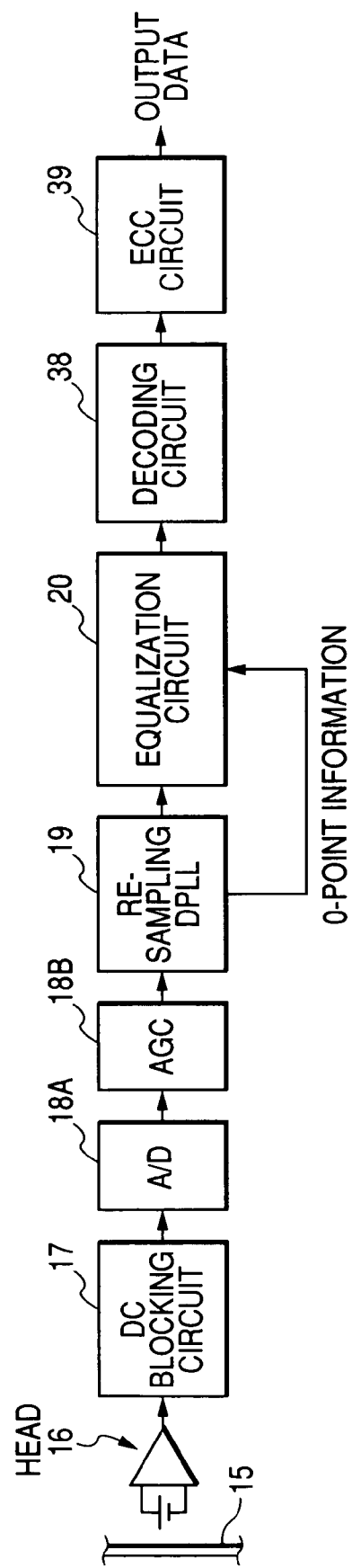
FIG. 1 is a block diagram of a reproducing apparatus according to a first embodiment of this invention.

FIG. 1 shows a reproducing apparatus according to a first embodiment of this invention. With reference to FIG. 1, an optical disc 15 stores a signal of a run-length-limited code at a predetermined high recording density. An optical head 16 reads out the signal of the run-length-limited code from the optical disc 15. The optical head 16 outputs the read-out signal to a direct-current blocking circuit (a DC blocking circuit) 17. The optical head 16 includes a photodetector and an amplifier following the photodetector.

The circuit 17 blocks a direct-current component (a DC component) of the read-out signal, and passes only alternating-current components (AC components) thereof. The output signal of the DC blocking circuit 17 is applied to an A/D (analog-to-digital) converter 18A. The A/D converter 18A changes the output signal of the DC blocking circuit 17 into a corresponding digital signal. Specifically, the A/D converter 18A periodically samples the output signal of the DC blocking circuit 17 in response to a fixed-frequency system clock signal, and converts every resultant sample into a digital sample. The A/D converter 18A outputs the digital signal to a digital AGC (automatic gain control) circuit 18B. The AGC circuit 18B subjects the output signal of the A/D converter 18A to automatic gain control (AGC) for providing a constant signal amplitude on a digital basis. The AGC circuit 18B outputs the resultant digital signal to a re-sampling DPLL section 19. The output signal of the AGC circuit 18B is referred to as a first digital signal. The position of the A/D converter 18A may be between the AGC circuit 18B and the re-sampling DPLL section 19, or between the optical head 16 and the DC blocking circuit 17.

The re-sampling DPLL section 19 converts the output signal (the first digital signal) of the AGC circuit 18B into a second digital signal. The re-sampling DPLL section 19 includes a digital PLL (phase locked loop) circuit having a closed loop. The digital PLL circuit re-samples the output signal of the AGC circuit 18B in response to a bit clock signal to get the second digital signal (the re-sampling resultant signal). A timing related to samples of the output signal of the A/D converter 18A or a timing related to samples of the output signal of the AGC circuit 18B is determined by the system clock signal. A timing related to samples of the second digital signal is determined by the bit clock signal. Samples of the second digital signal have a phase of 0° with respect to the bit clock signal. The re-sampling implemented by the digital PLL circuit includes at least one of interpolation and decimation designed to generate samples of the re-sampling-resultant signal from samples of the output signal of the AGC circuit 18B. The re-sampling DPLL section 19 outputs the second digital signal (the re-sampling-resultant signal) to an adaptive equalization circuit 20. The second digital signal is also referred to as the main digital signal or the main output signal of the re-sampling DPLL section 19.

The re-sampling DPLL section 19 includes an interpolator which estimates every sample at a phase point of 0° with respect to the bit clock signal from the output signal of the AGC circuit 18B. Thus, the interpolator generates a sequence of 0°-phase-point data samples. The re-sampling DPLL section 19 outputs the 0°-phase-point data samples to the adaptive equalization circuit 20 as the second digital signal (the main output signal). The re-sampling DPLL section 19 also includes a zero-cross detector for sensing every point (every zero-cross point) at which the sequence of 0°-phase-point data samples crosses a zero level (a 0 level). The zero-cross detector generates 0-point information which represents every sensed zero-cross point in the bit clock unit. Specifically, the zero-cross detector decides whether or not every 0°-phase-point data sample corresponds to a zero-cross point. The zero-cross detector generates 0-point information in response to the result of the decision. In the re-sampling DPLL section 19, the timing of the re-sampling or the frequency and phase of the re-sampling are locked in response to the sensed zero-cross points so that the levels represented by zero-cross-point-corresponding samples of the second digital signal will be equal to "0". The re-sampling DPLL section 19 outputs the 0-point information to the adaptive equalization circuit 20 as a sub output signal.

Figure 2:
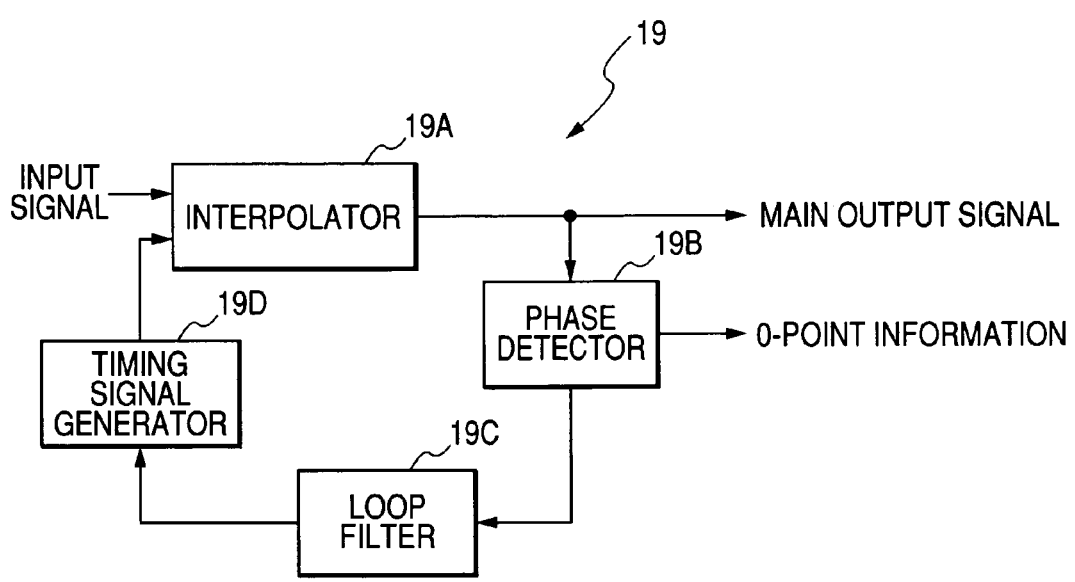
FIG. 2 is a block diagram of a re-sampling DPLL section in FIG. 1.

As shown in FIG. 2, the re-sampling DPLL section 19 includes an interpolator 19A, a phase detector 19B, a loop filter 19C, and a timing signal generator 19D which are connected in a closed loop in that order. The interpolator 19A receives the output signal of the AGC circuit 18B. The interpolator 19A receives data point phase information and the bit clock signal from the timing signal generator 19D. The interpolator 19A estimates 0°-phase-point data samples from samples of the output signal of the AGC circuit 18B through interpolation responsive to the data point phase information and the bit cock signal. Here, "phase" is defined relative to the bit clock signal. The interpolator 19A outputs the estimated 0°-phase-point data samples to the phase detector 19B.

In the re-sampling DPLL section 19, the phase detector 19B senses zero-cross points from the 0°-phase-point data samples. Furthermore, the phase detector 19B detects a phase error in response to each of the sensed zero-cross points. Specifically, the phase detector 19B senses a zero-cross point by referring to a current 0°-phase-point data sample and an immediately preceding 0°-phase-point data sample. When a zero-cross point is sensed, the phase detector 19B multiplies the polarity of the immediately preceding 0°-phase-point data sample by a mean of the current 0°-phase-point data sample and the immediately preceding 0°-phase-point data sample. The phase detector 19B uses the result of the multiplication as a phase error.

In the re-sampling DPLL section 19, the phase detector 19B generates 0-point information representing the sensed zero-cross points. The phase detector 19B outputs the 0-point information (the sub output signal) to the adaptive equalization circuit 20. The phase detector 19B generates a signal representing the phase error. The phase detector 19B outputs the phase error signal to the loop filter 19C. The loop filter 19C integrates the phase error signal. The loop filter 19C outputs the integration-resultant signal to the timing signal generator 19D. The timing signal generator 19D produces the data point phase information and the bit clock signal in response to the output signal of the loop filter 19C. The timing signal generator 19D feeds the data point phase information and the bit clock signal to the interpolator 19A. Also, the timing signal generator 19D feeds the bit clock signal to other devices and circuits within the reproducing apparatus.

With reference back to FIG. 1, the adaptive equalization circuit 20 subjects the main output signal of the re-sampling DPLL section 19 (that is, the second digital signal outputted from the re-sampling DPLL section 19) to automatic waveform equalization in response to the 0-point information fed from the re-sampling DPLL section 19. The automatic waveform equalization corresponds to a process of providing the signal in question with a partial-response (PR) characteristic. The adaptive equalization circuit 20 outputs the equalization-resultant signal to a decoding circuit 38. The decoding circuit 38 recovers original data from the output signal of the adaptive equalization circuit 20 through a viterbi decoding process. The decoding circuit 38 outputs the recovered data to an ECC (error checking and correcting) circuit 39.

The decoding circuit 38 includes a memory loaded with a plurality of candidate recovered data pieces. Also, the decoding circuit 38 includes a section for calculating branch metric values from samples of the output signal of the adaptive equalization circuit 20. Furthermore, the decoding circuit 38 includes a section for accumulating the branch metric values into path metric values respectively. In addition, the decoding circuit 38 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 39 extracts an error correction code from the recovered data outputted by the decoding circuit 38. The ECC circuit 39 corrects errors in the recovered data in response to the error correction code. The ECC circuit 39 outputs the resultant recovered data.

Figure 3:
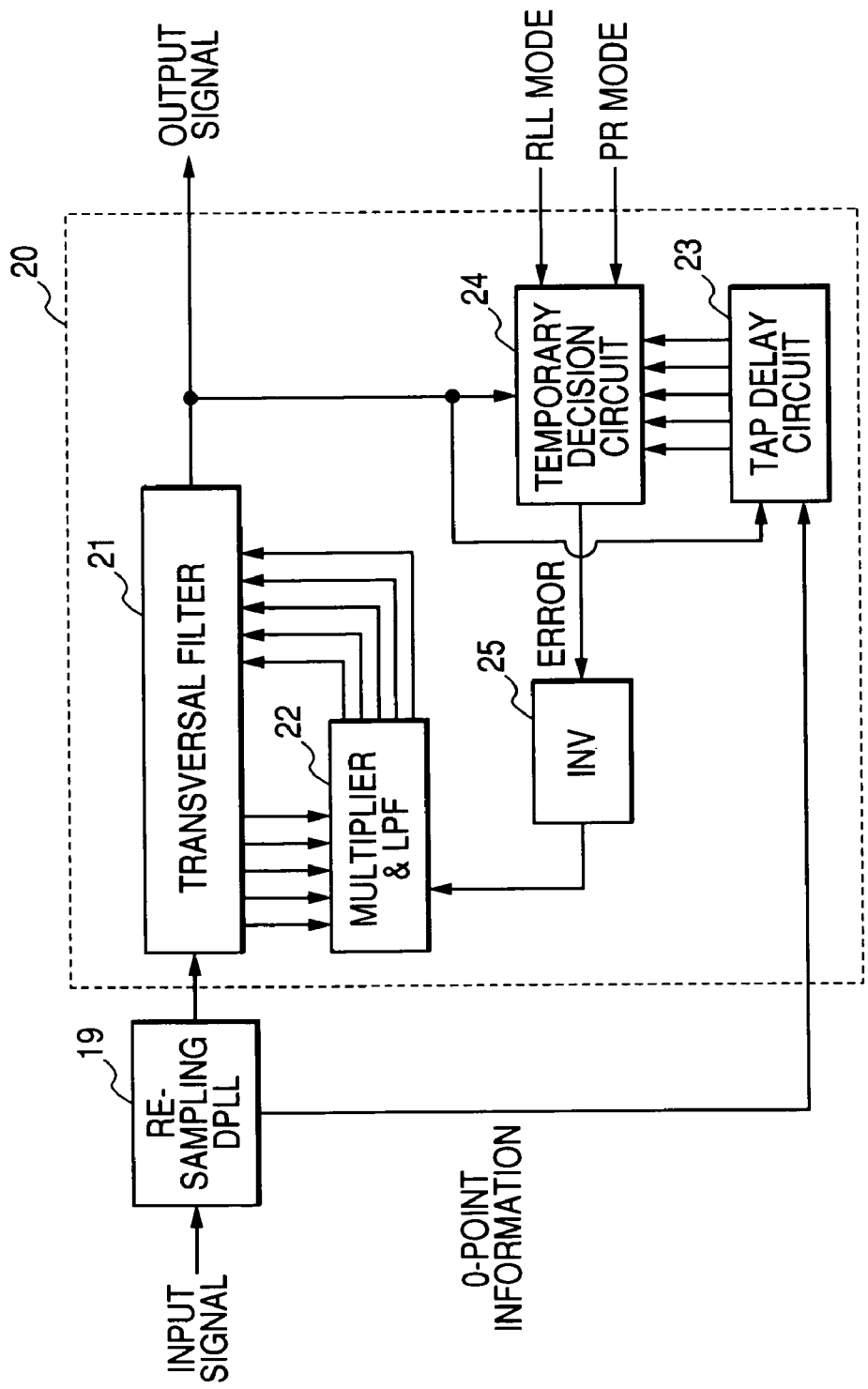
FIG. 3 is a block diagram of an adaptive equalization circuit in FIG. 1.

As shown in FIG. 3, the adaptive equalization circuit 20 includes a transversal filter 21, a multiplier and LPF (low pass filter) section 22, a tap delay circuit 23, a temporary decision circuit 24, and an inverter 25. The transversal filter 21 receives the main output signal (the second digital signal) from the re-sampling DPLL section 19. The transversal filter 21 is connected with the multiplier and LPF section 22, the tap delay circuit 23, the temporary decision circuit 24, and the decoding circuit 38 (see FIG. 1). The tap delay circuit 23 receives the 0-point information from the re-sampling DPLL section 19. The tap delay circuit 23 is connected with the temporary decision circuit 24. The temporary decision circuit 24 is connected with the inverter 25. The inverter 25 is connected with the multiplier and LPF section 22.

The transversal filter 21 subjects the main output signal of the re-sampling DPLL section 19 (that is, the second digital signal) to PR waveform equalization responsive to tap coefficients to get the equalization-resultant signal. The multiplier and LPF section 22 varies the tap coefficients in response to an output signal of the inverter 25. The tap delay circuit 23 defers the 0-point information by a plurality of different time intervals, and thereby converts the 0-point information into different tap delayed 0-point signals. The tap delay circuit 23 outputs the tap delayed 0-point signals to the temporary decision circuit 24. The tap delay circuit 23 receives the output signal of the transversal filter 21 (that is, the equalization-resultant signal). The tap delay circuit 23 defers the output signal of the transversal filter 21 by a plurality of different time intervals, and thereby converts the output signal of the transversal filter 21 into different tap delayed equalization-resultant signals. The tap delay circuit 23 outputs the tap delayed equalization-resultant signals to the temporary decision circuit 24. The temporary decision circuit 24 receives the output signal of the transversal filter 21. The temporary decision circuit 24 generates an error signal on the basis of the output signal of the transversal filter 21, the tap delayed 0-point signals from the tap delay circuit 23, the tap delayed equalization-resultant signals from the tap delay circuit 23, an RLL (run-length-limited) mode signal, and a PR (partial-response) mode signal. The temporary decision circuit 24 outputs the error signal to the inverter 25. The device 25 inverts the error signal in polarity. The inverter 25 causes negative feedback. The inverter 25 outputs the inversion-resultant error signal to the multiplier and LPF section 22.

Figure 4:
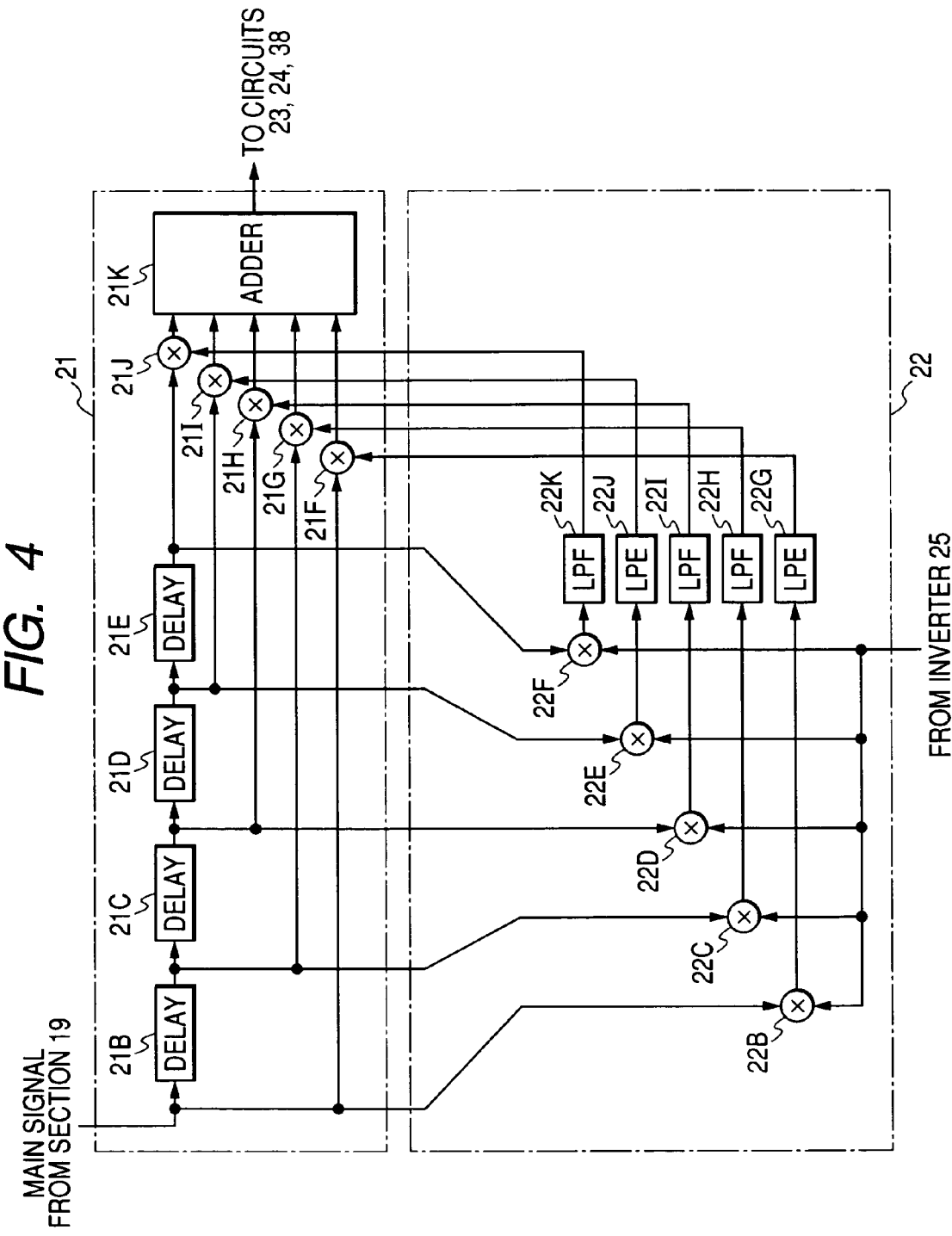
FIG. 4 is a block diagram of a portion of the adaptive equalization circuit in FIGS. 1 and 3.

As shown in FIG. 4, the transversal filter 21 includes delay circuits 21B, 21C, 21D, and 21E, multipliers 21F, 21G, 21H, 21I, and 21J, and an adder 21K.

The delay circuits 21B, 21C, 21D, and 21E are connected in cascade in that order. The input terminal of the delay circuit 21B is subjected to the main output signal of the re-sampling DPLL section 19 (that is, the second digital signal). Also, a first input terminal of the multiplier 21F is subjected to the main output signal of the DPLL section 19. The input terminal of the delay circuit 21B is connected to the multiplier and LPF section 22 as a first tap in the transversal filter 21. The output terminals of the delay circuits 21B, 21C, 21D, and 21E are connected to the multiplier and LPF section 22. Also, the output terminals of the delay circuits 21B, 21C, 21D, and 21E are connected to first input terminals of the multipliers 21G, 21H, 21I, and 21J, respectively. Second input terminals of the multipliers 21F, 21G, 21H, 21I, and 21J are connected to the multiplier and LPF section 22. The output terminals of the multipliers 21F, 21G, 21H, 21I, and 21J are connected to respective input terminals of the adder 21K. The output terminal of the adder 21K is connected to the tap delay circuit 23, the temporary decision circuit 24, and the decoding circuit 38.

As shown in FIG. 4, the multiplier and LPF section 22 includes multipliers 22B, 22C, 22D, 22E, and 22F, and low pass filters 22G, 22H, 22I, 22J, and 22K.

A first input terminal of the multiplier 22B is connected to the input terminal of the delay circuit 21B within the transversal filter 21, that is, the first tap within the transversal filter 21. Thus, the first input terminal of the multiplier 22B is subjected to the main output signal of the re-sampling DPLL section 19 (that is, the second digital signal). First input terminals of the multipliers 22C, 22D, 22E, and 22F are connected to the output terminals of the delay circuits 21B, 21C, 21D, and 21E within the transversal filter 21, respectively. In other words, the first input terminals of the multipliers 22C, 22D, 22E, and 22F are connected to the second, third, fourth, and fifth taps within the transversal filter 21, respectively. Second input terminals of the multipliers 22B, 22C, 22D, 22E, and 22F are connected to the output terminal of the inverter 25. The output terminals of the multipliers 22B, 22C, 22D, 22E, and 22F are connected to the input terminals of the low pass filters 22G, 22H, 22I, 22J, and 22K, respectively. The output terminals of the low pass filters 22G, 22H, 22I, 22J, and 22K are connected to the second input terminals of the multipliers 21F, 21G, 21H, 21I, and 21J within the transversal filter 21, respectively.

In the transversal filter 21, the main output signal (the second digital signal) from the re-sampling DPLL section 19 successively passes through the delay circuits 21B, 21C, 21D, and 21E while being deferred by them. Each of the delay circuits 21B, 21C, 21D, and 21E provides a predetermined signal delay corresponding to a 1-sample interval (a 1-bit-corresponding interval). The main output signal (the second digital signal) from the re-sampling DPLL section 19 is also applied to the multiplier 21F. The output signals of the delay circuits 21B, 21C, 21D, and 21E are applied to the multipliers 21G, 21H, 21I, and 21J, respectively. The multipliers 21F, 21G, 21H, 21I, and 21J receive output signals of the multiplier and LPF section 22 which represent tap coefficients respectively. The tap coefficients correspond to waveform equalization coefficients. The device 21F multiplies the main output signal (the second digital signal) from the re-sampling DPLL section 19 and the related tap coefficient, and outputs the multiplication-resultant signal to the adder 21K. The device 21G multiplies the output signal of the delay circuit 21B and the related tap coefficient, and outputs the multiplication-resultant signal to the adder 21K. The device 21H multiplies the output signal of the delay circuit 21C and the related tap coefficient, and outputs the multiplication-resultant signal to the adder 21K. The device 21I multiplies the output signal of the delay circuit 21D and the related tap coefficient, and outputs the multiplication-resultant signal to the adder 21K. The device 21J multiplies the output signal of the delay circuit 21E and the related tap coefficient, and outputs the multiplication-resultant signal to the adder 21K. The device 21K adds up the output signals of the multipliers 21F, 21G, 21H, 21I, and 21J into the equalization-resultant signal.

As previously mentioned, the multipliers 22B, 22C, 22D, 22E, and 22F in the multiplier and LPF section 22 receive the output signal of the inverter 25. As will be made clear later, the output signal of the inverter 25 indicates an amplitude error related to the output signal of the transversal filter 21. The input signal to the device 21B and the output signals from the devices 21B, 21C, 21D, and 21E within the transversal filter 21 are applied to the multipliers 22B, 22C, 22D, 22E, and 22F within the multiplier and LPF section 22 as tap output signals, respectively. The devices 22B, 22C, 22D, 22E, and 22F multiply the respective tap output signals of the transversal filter 21 by the amplitude error signal fed from the inverter 25. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thereby process the output signals of the multipliers 22B, 22C, 22D, 22E, and 22F into signals representing the tap coefficients, respectively. The low pass filters 22G, 22H, 22I, 22J, and 22K output the tap coefficient signals to the multipliers 21F, 21G, 21H, 21I, and 21J within the transversal filter 21, respectively.

Figure 5:
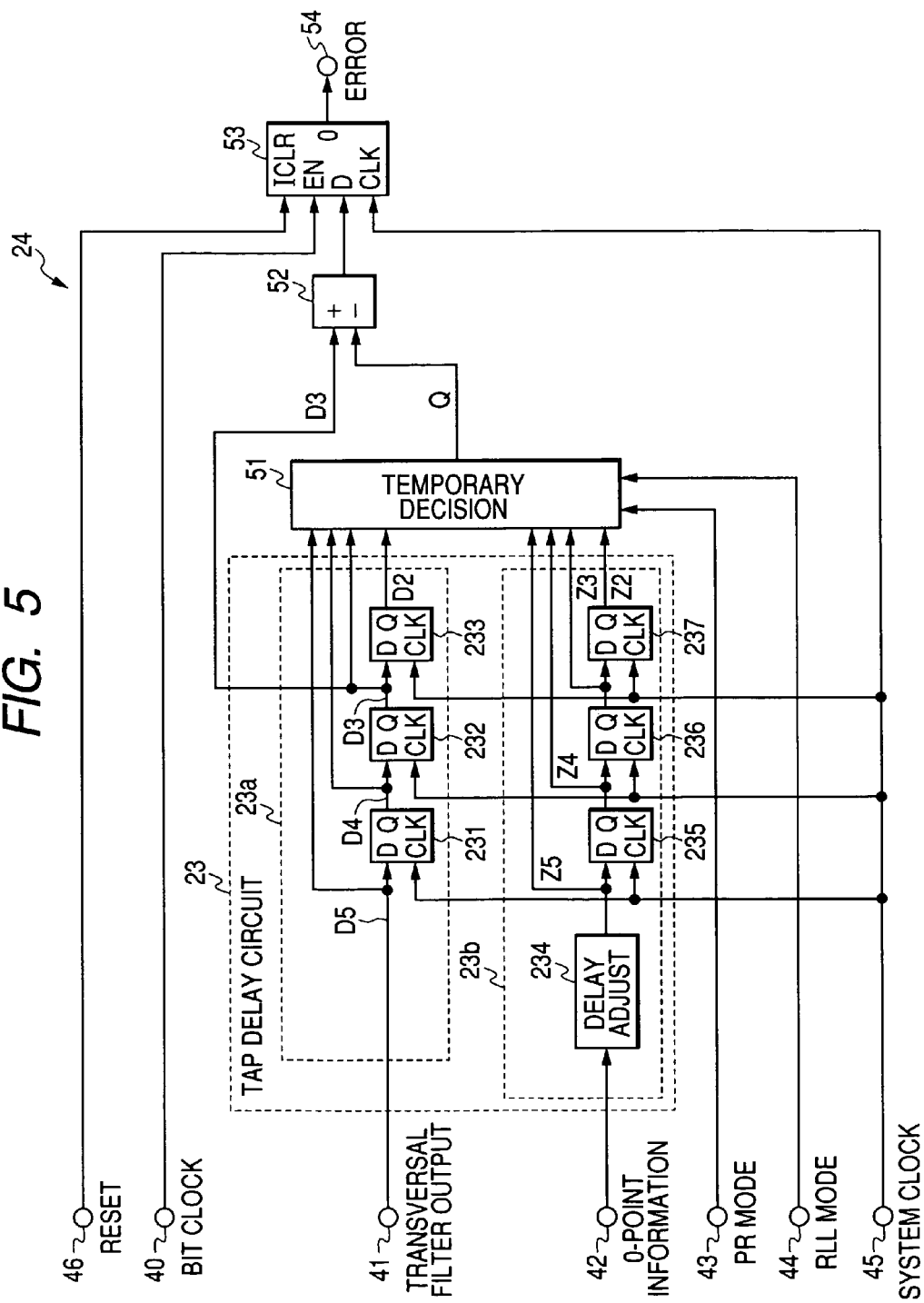
FIG. 5 is a block diagram of a temporary decision circuit and a tap delay circuit in FIG. 3.

As shown in FIG. 5, the temporary decision circuit 24 includes a temporary decision device 51, a subtracter 52, and a D flip-flop 53. The tap delay circuit 23 has portions 23a and 23b. The temporary decision device 51 is connected with the tap delay circuit portions 23a and 23b. The temporary decision device 51 and the tap delay circuit portion 23a are connected to the output terminal of the transversal filter 21 via a terminal 41. The tap delay circuit portion 23b is connected to the re-sampling DPLL section 19 via a terminal 42. A first input terminal of the subtracter 52 is connected to the tap delay circuit portion 23a. A second input terminal of the subtracter 52 is connected to an output terminal of the temporary decision device 51. The output terminal of the subtracter 52 is connected to the D input terminal of the D flip-flop 53. The output terminal of the D flip-flop 53 is connected to the input terminal of the inverter 25 via a terminal 54.

The temporary decision device 51 receives the equalization-resultant signal D5 from the transversal filter 21 via the terminal 41. The temporary decision device 51 receives output signals of the tap delay circuit portions 23a and 23b. The temporary decision device 51 receives the PR mode signal via a terminal 43. The PR mode signal will be mentioned in detail later. The temporary decision device 51 receives the RLL mode signal via a terminal 44. The RLL mode signal will be mentioned in detail later. The temporary decision device 51 includes a logic circuit which is designed to perform a temporary decision in response to the received signals according to a predetermined algorithm. The temporary decision device 51 may include a programmable signal processor. In this case, the predetermined algorithm is given as a program for controlling the signal processor. The temporary decision device 51 generates a signal representing the result of the temporary decision. The temporary decision device 51 outputs the temporary decision result signal to the subtracter 52. The subtracter 52 receives a delayed equalization-resultant signal D3 from the tap delay circuit portion 23a. The device 52 subtracts the temporary decision result signal from the delayed equalization-resultant signal D3, thereby generating an error signal (an amplitude error signal) corresponding to the difference therebetween. The subtracter 52 outputs the error signal to the D flip-flop 53. The system clock signal is applied to the clock terminal of the D flip-flop 53 via a terminal 45. The bit clock signal is applied to the enable terminal of the D flip-flop 53 via a terminal 40. Provided that the bit clock signal is in a high-level state, the D flip-flop 53 latches the error signal in synchronism with the system clock signal. Accordingly, the D flip-flop 53 latches the error signal for every period of the bit clock signal. The D flip-flop 53 outputs the latched error signal to the inverter 25 via the terminal 54. A reset signal is applied to the clear terminal of the D flip-flop 53 via a terminal 46.

As shown in FIG. 5, the tap delay circuit portion 23a includes D flip-flops 231, 232, and 233 which are connected in cascade in that order. The D input terminal of the D flip-flop 231 receives the equalization-resultant signal D5 from the transversal filter 21 via the terminal 41. The Q output terminals of the D flip-flops 231, 232, and 233 are connected to the temporary decision device 51. The system clock signal is applied to the clock terminals of the D flip-flops 231, 232, and 233 via the terminal 45. The bit clock signal is applied to the enable terminals of the D flip-flops 231, 232, and 233 via the terminal 40. The reset signal is applied to the clear terminals of the D flip-flops 231, 232, and 233 via the terminal 46.

In the tap delay circuit portion 23a, the D flip-flop 231 delays the equalization-resultant signal D5 by a 1-sample interval (a 1-bit-corresponding interval). The D flip-flop 231 outputs the resultant signal to the temporary decision device 51 and the D flip-flop 232 as a first delayed signal D4. The D flip-flop 232 delays the first delayed signal D4 by a 1-sample interval (a 1-bit-corresponding interval). The D flip-flop 232 outputs the resultant signal to the temporary decision device 51, the D flip-flop 233, and the subtracter 52 as a second delayed signal D3 (the delayed equalization-resultant signal D3). The D flip-flop 233 delays the second delayed signal D3 by a 1-sample interval (a 1-bit-corresponding interval). The D flip-flop 233 outputs the resultant signal to the temporary decision device 51 as a third delayed signal D2. The non-delayed signal D5 and the delayed signals D4, D3, and D2 are four successive samples or four successive 1-bit-corresponding segments of the equalization-resultant signal.

As shown in FIG. 5, the tap delay circuit portion 23b includes a delay adjuster 234 and D flip-flops 235, 236, and 237. The delay adjuster 234 receives the 0-point information from the re-sampling DPLL section 19 via the terminal 42. The output terminal of the delay adjuster 234 is connected to the D input terminal of the D flip-flop 235 and the temporary decision device 51. The D flip-flops 235, 236, and 237 are connected in cascade in that order. The Q output terminals of the D flip-flops 235, 236, and 237 are connected to the temporary decision device 51. The system clock signal is applied to the clock terminals of the D flip-flops 235, 236, and 237 via the terminal 45. The bit clock signal is applied to the enable terminals of the D flip-flops 235, 236, and 237 via the terminal 40. The reset signal is applied to the clear terminals of the D flip-flops 235, 236, and 237 via the terminal 46.

In the tap delay circuit portion 23b, the delay adjuster 234 operates to adjust delay time of the 0-point information. Specifically, the delay adjuster 234 defers the 0-point information by a fixed time interval or an adjustable time interval. The delay adjuster 234 outputs the resultant signal to the temporary decision device 51 and the D flip-flop 235 as a first delayed signal Z5. The D flip-flop 235 delays the first delayed signal Z5 by a 1-sample interval (a 1-bit-corresponding interval). The D flip-flop 235 outputs the resultant signal to the temporary decision device 51 and the D flip-flop 236 as a second delayed signal Z4. The D flip-flop 236 delays the second delayed signal Z4 by a 1-sample interval (a 1-bit-corresponding interval). The D flip-flop 236 outputs the resultant signal to the temporary decision device 51 and the D flip-flop 237 as a third delayed signal Z3. The D flip-flop 237 delays the third delayed signal Z3 by a 1-sample interval (a 1-bit-corresponding interval). The D flip-flop 237 outputs the resultant signal to the temporary decision device 51 as a fourth delayed signal Z2. The delayed signals Z5, Z4, Z3, and Z2 are four successive samples or four successive 1-bit-corresponding segments of the 0-point information. The successive samples Z5, Z4, Z3, and Z2 of the 0-point information correspond in timing to the successive samples D5, D4, D3, and D2 of the equalization-resultant signal, respectively.

Figure 6:
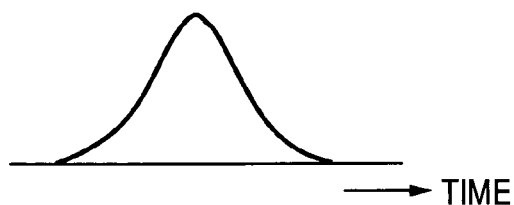
FIG. 6 is a time-domain diagram of an example of an isolated waveform.
Figure 7:
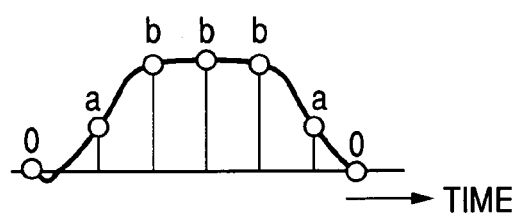
FIG. 7 is a time-domain diagram of a waveform (an equalization-resultant waveform) which results from equalization of the isolated waveform in FIG. 6.

Partial-response (PR) characteristics will be explained below. When an isolated waveform in FIG. 6 is subjected to equalization accorded with the characteristic of PR(a, b, b, b, a), the equalization-resultant waveform in FIG. 7 is provided. A waveform resulting from the PR(a, b, b, b, a)

equalization of a continuous wave takes one of ten different values, that is, "0", "a", "2a", "a+b", "2a+b", "2b", "a+2b", "3b", "a+3b", and "2a+3b". If a=1 and b=2, a waveform resulting from the PR(a, b, b, b, a) equalization of a continuous wave takes one of nine different values since 2a+b=2b.

Figure 8:
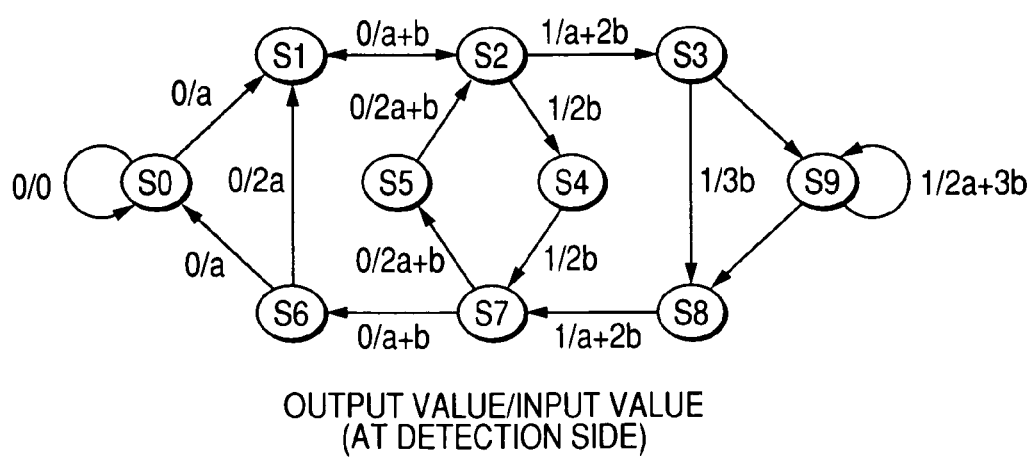
FIG. 8 is a diagram of signal state transitions regarding a partial-response (PR) characteristic and an RLL(1, X) code.

An encoder side operating in a recording mode is now considered. The state of a current sample of an original signal (an input value) and the state of a current sample of a reproduced signal (an output value) resulting from PR equalization are restricted by the states of previous samples. When the input signal is of the (1, 7) run-length-limited code, two successive samples of "1" will not occur in the input signal. FIG. 8 shows signal state transitions used by a detector side (a decoder side) in this case. Since the signal state transitions in FIG. 8 are used by the detector side, the input values and the output values therein are reversed.

In FIG. 8, S0-S9 denote signal states determined by immediately-preceding output values. Transitions from the state S2 will be taken as an example. When the input value is "a+2b", the output value becomes "1" and a transition from the state S2 to the state S3 occurs. When the input value is "2b", the output value becomes "1" and a transition from the state S2 to the state S4 occurs. Under normal conditions, regarding the state S2, the input value different from "a+2b" and "2b" does not occur. Thus, the input value different from "a+2b" and "2b" is an error.

Figures 9, 10:
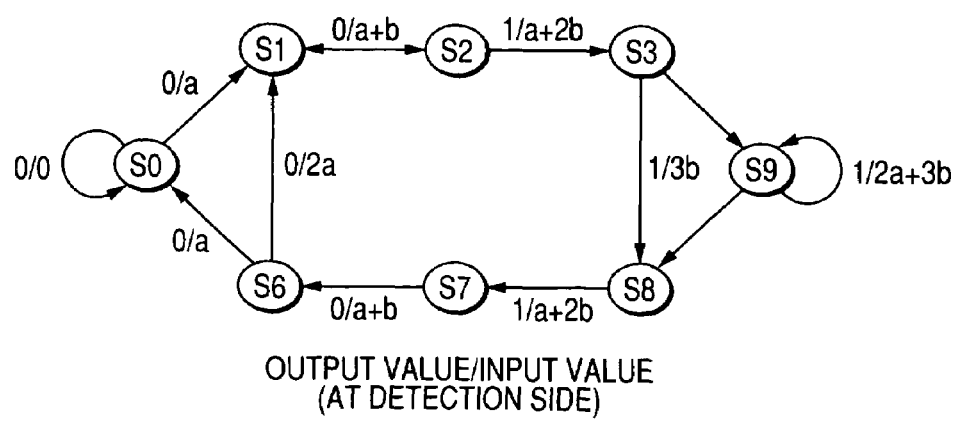
FIG. 9 is a diagram of the relation among PR(a, b, b, b, a) characteristics, RLL modes, and temporary decision result values.
FIG. 10 is a diagram of signal state transitions regarding a partial-response (PR) characteristic and an RLL(2, X) code.

FIG. 9 shows the relation among the PR mode, the RLL mode (the run-length-limited mode), and the decision result value outputted from the temporary decision device 51. The PR mode is represented by the PR mode signal inputted into the temporary decision device 51 via the terminal 43. The RLL mode is represented by the RLL mode signal inputted into the temporary decision device 51 via the terminal 44. The PR mode indicates the type of the PR waveform equalization performed by the adaptive equalization circuit 20. The RLL mode indicates the type of the run-length-limited code used by the digital signal recorded on the optical disc 15. In general, the RLL mode represented by the RLL mode signal can be changed between RLL(1, X) and RLL(2, X).

With reference to FIG. 9, the PR mode is of the type "PR(a, b, b, b, a)". Thus, the PR mode can be changed among PR(1, 2, 2, 2, 1), PR(1, 3, 3, 3, 1), and PR(1, 1, 1, 1, 1). Furthermore, the PR mode can be PR(3, 4, 4, 4, 3). The PR mode signal having a value of "1" denotes PR(1, 2, 2, 2, 1). The PR mode signal having a value of "2" denotes PR(1, 3, 3, 3, 1). The PR mode signal having a value of "3" denotes PR(1, 1, 1, 1, 1). The RLL mode can be changed between RLL(1, X) and RLL(2, X). Here, RLL(1, X) means run-length limiting rules such that the minimum inversion interval is equal to "2", and the maximum inversion interval is equal to a given value X depending on the modulation format. On the other hand, RLL(2, X) means run-length limiting rules such that the minimum inversion interval is equal to "3", and the maximum inversion interval is equal to a given value X depending on the modulation format.

In the case of RLL(1, X), the waveform resulting from the PR(a, b, b, b, a) equalization takes one of ten different values "0", "a", "2a", "a+b", "2a+b", "2b", "a+2b", "3b", "a+3b", and "2a+3b". In FIG. 9, the decision result values outputted from the temporary decision device 51 in correspondence with these values "0", "a", "2a", "a+b", "2a+b", "2b", "a+2b", "3b", "a+3b", and "2a+3b" are listed for PR(1, 2, 2, 2, 1) and PR(1, 3, 3, 3, 1).

In the case of RLL(2, X), the waveform resulting from the PR(a, b, b, b, a) equalization takes one of eight different values "0", "a", "2a", "a+b", "a+2b", "3b", "a+3b", and "2a+3b". In FIG. 9, the decision result values outputted from the temporary decision device 51 in correspondence with these values "0", "a" "2a", "a+b", "a+2b", "3b", "a+3b", and "2a+3b" are listed for PR(1, 2, 2, 2, 1), PR(1, 3, 3, 3, 1), and PR(1, 1, 1, 1, 1).

The decision result values for RLL(2, X) are similar to those for RLL(1, X) except for the following points. In the case of RLL(2, X), the equalization-resultant waveform takes neither the value "2a+b" nor the value "2b". Signal state transitions in FIG. 8 are replaced by those in FIG. 10. The transition from the state S2 to the state S4, the transition from the state S4 to the state S7, the transition from the state S7 to the state S5, and the transition from the state S5 to the state S2 which relate to the input values "2a+b" and "2b" are absent from FIG. 10. Accordingly, the decision result values corresponding to the input values "2a+b" and "2b" are absent from the case of RLL(2, X).

With reference back to FIG. 5, the equalization-resultant signal inputted from the transversal filter 21 via the terminal 41 is handled as the non-delayed signal D5 applied to the temporary decision device 51 and the tap delay circuit portion 23a. The non-delayed signal D5 propagates through the tap delay circuit portion 23a while being successively delayed by the D flip-flops 231, 232, and 233 therein. Thus, the tap delay circuit portion 23a defers the non-delayed signal D5 by a plurality of different time intervals, thereby generating the delayed signals D4, D3, and D2 which appear at the Q output terminals of the D flip-flops 231, 232, and 233 respectively. The tap delay circuit portion 23a applies the delayed signals D4, D3, and D2 to the temporary decision device 51. The non-delayed signal D5 and the delayed signals D4, D3, and D2 applied to the temporary decision device 51 are four successive samples of the equalization-resultant signal. The sample D3 is handled as a sample of interest or a sample occurring at the present moment. A sample of interest is also referred to as an object sample. The sample D2 is handled as one immediately preceding the present-moment sample (the sample of interest) D3. The sample D4 is handled as one immediately following the present-moment sample (the sample of interest) D3. The tap delay circuit portion 23a applies the present-moment signal D3 to the subtracter 52.

The 0-point information is fed from the re-sampling DPLL section 19 to the tap delay circuit portion 23b via the terminal 42. The 0-point information propagates through the tap delay circuit portion 23b while being successively delayed by the delay adjuster 234 and the D flip-flops 235, 236, and 237 therein. Thus, the tap delay circuit portion 23b defers the 0-point information by a plurality of different time intervals, thereby generating the delayed signals Z5, Z4, Z3, and Z2 which appear at the output terminals of the devices 234, 235, 236, and 237 respectively. The tap delay circuit portion 23b applies the delayed signals Z5, Z4, Z3, and Z2 to the temporary decision device 51. The delayed signals Z5, Z4, Z3, and Z2 are four successive samples of the 0-point information. The delay adjuster 234 is designed so that the samples Z5, Z4, Z3, and Z2 of the 0-point information will temporally correspond to the samples D5, D4, D3, and D2 of the equalization-resultant signal respectively.

According to a predetermined algorithm, the temporary decision device 51 performs a PR-equalization-based temporary decision in response to the samples D5, D4, D3, and D2 of the equalization-resultant signal and the samples Z5, Z4, Z3, and Z2 of the 0-point information. The PR-equalization-based temporary decision is equivalent to the setting of convergence targets. The temporary decision device 51 generates a signal representing the result of the PR-equalization-based temporary decision. The temporary decision device 51 outputs the temporary decision result signal to the subtracter 52. The subtracter 52 receives the present-moment signal D3 from the tap delay circuit portion 23a. The device 52 subtracts the temporary decision result signal from the present-moment signal D3, thereby generating an error signal corresponding to the difference therebetween. The subtracter 52 outputs the error signal to the D flip-flop 53. The D flip-flop 53 latches the error signal. The D flip-flop 53 feeds the latched error signal to the inverter 25 via the terminal 54.

With reference to FIGS. 3 and 4, the device 25 inverts the error signal in polarity. The inverter 25 outputs the inversion-resultant error signal to the multipliers 22B, 22C, 22D, 22E, and 22F in the multiplier and LPF section 22. The tap output signals of the transversal filter 21 are applied to the multipliers 22B, 22C, 22D, 22E, and 22F in the multiplier and LPF section 22, respectively. The devices 22B, 22C, 22D, 22E, and 22F multiply the respective tap output signals by the inversion-resultant error signal. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thus process the output signals of the multipliers 22B, 22C, 22D, 22E, and 22F into signals representing tap coefficients, respectively. The low pass filters 22G, 22H, 22I, 22J, and 22K output the tap coefficient signals to the multipliers 21F, 21G, 21H, 21I, and 21J within the transversal filter 21, respectively. The tap coefficients represented by the output signals of the low pass filters 22G, 22H, 22I, 22J, and 22K cause the equalization by the transversal filter 21 to nullify the error signal generated by the subtracter 52 within the temporary decision circuit 24. In this way, the tap coefficients used by the transversal filter 21 are controlled to nullify the error signal generated by the subtracter 52.

With reference to FIGS. 8 and 9, the input values (the equalization-resultant signal values) "0", "a", "2a", "a+b", "2a+b", "2b", "a+2b", "3b", "a+3b", and "2a+3b" are normalized or offset so that the zero level (the 0 level) will be between the value "2a+b" and the value "2b". The 0-point information whose value Z is "1" indicates a zero-cross point. The 0-point information value Z being "1" corresponds to the boundary between the value "2a+b" and the value "2b". In FIG. 8, the 0-point information value Z being "1" occurs in the transition from the state S2 to the state S3, the transition from the state S2 to the state S4, the transition from the state S7 to the state S6, or the transition from the state S7 to the state S5. In the case of PR(a, b, b, b, a), a zero-cross point directly corresponds to none of the values "0", "a", "2a", "a+b", "2a+b", "2b", "a+2b", "3b", "a+3b", and "2a+3b". Accordingly, the 0-point information value Z being "1" is handled as a flag indicating one of the values "a+2b", "2b", "2a+b", and "a+b" occurring immediately after a zero-cross point.

Instead of an equalization-resultant signal value (an input value) occurring immediately after a zero-cross point, that occurring immediately before a zero-cross point may be made to correspond to the 0-point information. In this case, the 0-point information value Z being "1" occurs in the transition from the state S1 to the state S2, the transition from the state S5 to the state S2, the transition from the state S8 to the state S7, or the transition from the state S4 to the state S7.

Since the normalization is performed so that the zero level will be between the value "2a+b" and the value "2b", the transitions in the right-hand half of FIG. 8 pass through the positive values while those in the left-hand half of FIG. 8 pass through the negative values. Therefore, a decision as to whether the zero-cross point is in a positive-going path or a negative-going path can be performed by referring to a value temporally preceding or following the zero-cross point.

In the case where the interval from one zero-cross point to the next zero-cross point is known, in the case where the number of transitions occurring for the interval from the state S3 to the state S6, the interval from the state S3 to the state S5, the interval from the state S4 to the state S5, or the interval from the state S4 to the state S6 is known, or in the case where the number of transitions occurring for the interval from the state S6 to the state S3, the interval from the state S6 to the state S4, the interval from the state S5 to the state S3, or the interval from the state S5 to the state S4 is known, the path is settled and values to be taken at respective sample points are define.

In FIG. 8, the values different from "a+2b", "2b", "2a+b", and "a+b" do not correspond to the zero-cross point. For the values different from "a+2b", "2b", "2a+b", and "a+b", the 0-point information value Z is equal to "0". It is understood from FIG. 8 that two or more zero-cross points (Z=1) will not occur in succession. In the case of RLL(1, X), at least one "0" point (Z=0 point) exists between two adjacent zero-cross points (Z=1). For example, the 0-point information value Z changes as 1→0→1 (the state changes as S4→S7→S5 or S5→S2→S4). In the case of RLL(2, X), at least two "0" points (Z=0 points) exist between two adjacent zero-cross points (Z=1) since the values "2a+b" and "2b" are absent.

Figure 11:
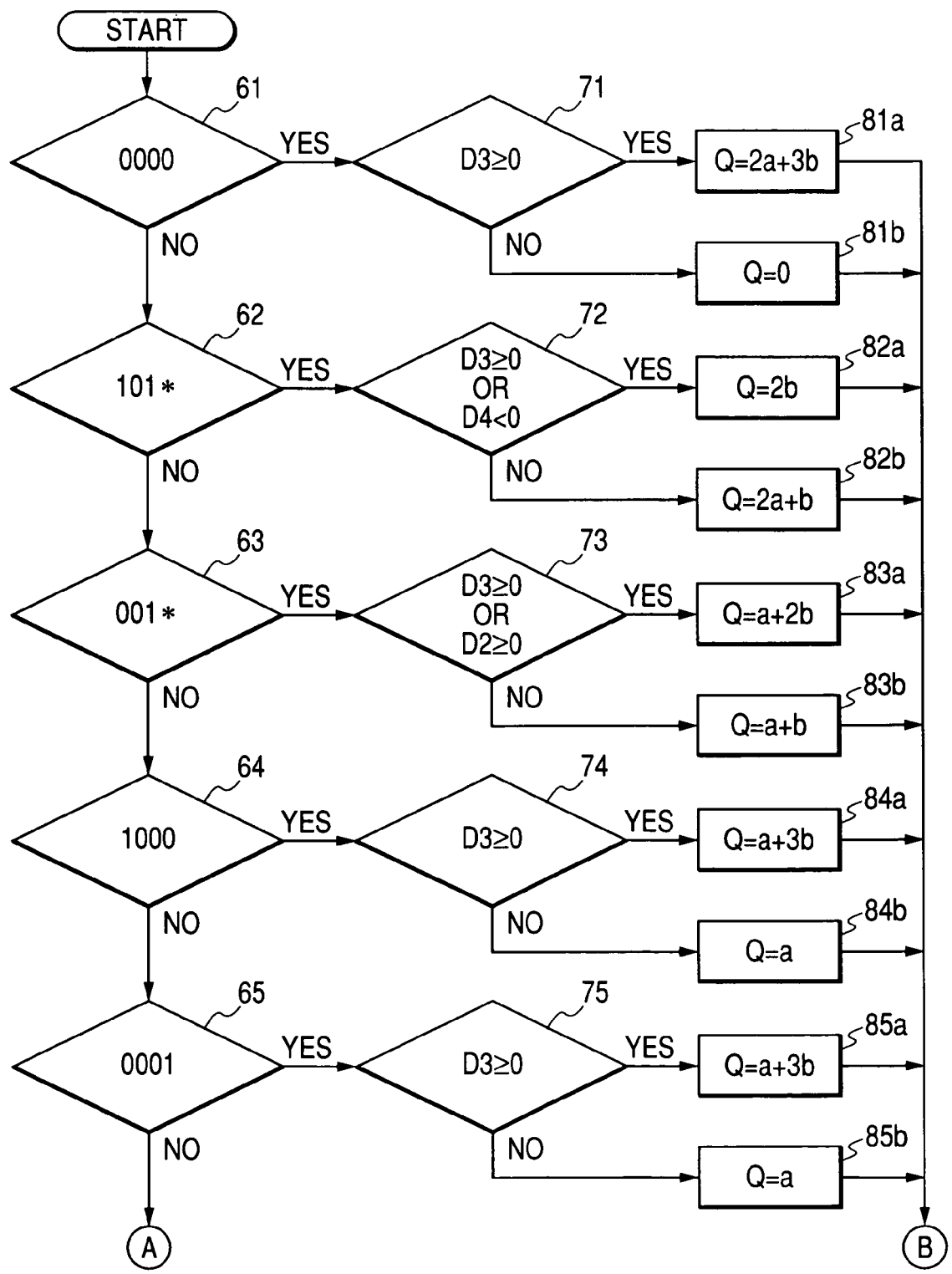
FIGS. 11 and 12 are a flowchart of an algorithm of temporary decision which is performed by a temporary decision device in FIG. 5 for RLL(1, X).
Figure 12:
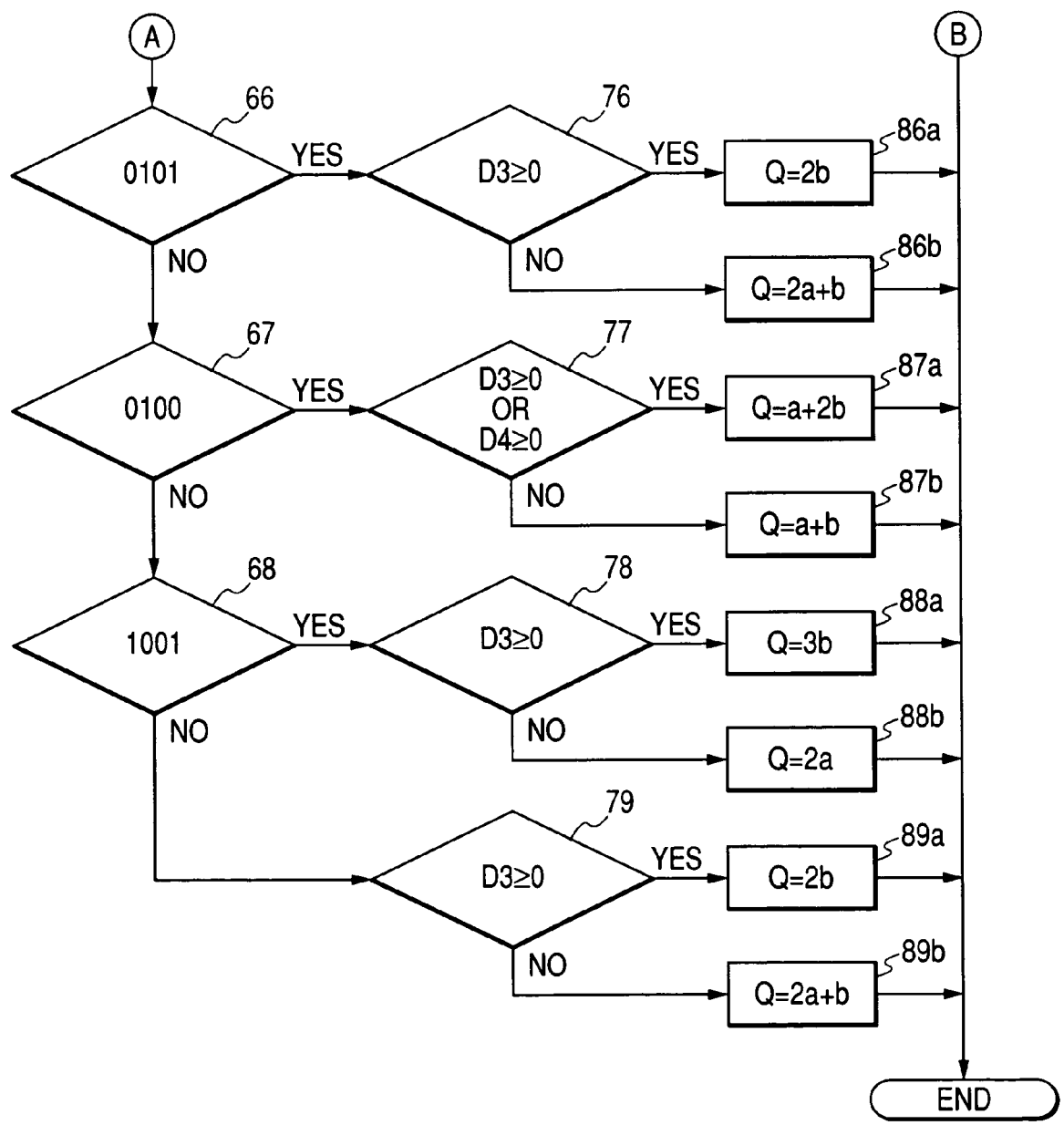

FIGS. 11 and 12 constitute a flowchart of the algorithm of the temporary decision which is performed by the temporary decision device 51 when the RLL mode represented by the RLL mode signal corresponds to RLL(1, X). The temporary decision is executed for every period of the bit clock signal.

As shown in FIG. 11, a first step 61 of the algorithm determines whether or not four successive 0-point information values Z represented by the output signals Z2, Z3, Z4, and Z5 of the tap delay circuit portion 23b are "0000". The second one of the four successive 0-point information values Z, that is, the 0-point information value Z represented by the output signal Z3 of the tap delay circuit portion 23b, is defined as corresponding to the present-moment signal D3. When the four successive 0-point information values Z are "0000", the algorithm advances from the step 61 to a step 71. Otherwise, the algorithm advances from the step 61 to a step 62.

The step 71 detects the polarity of the present-moment signal D3. Specifically, the step 71 determines whether or not the present-moment signal D3 is smaller than "0". When the present-moment signal D3 is equal to or greater than "0", the algorithm advances from the step 71 to a step 81a. When the present-moment signal D3 is smaller "0", the algorithm advances from the step 71 to a step 81b.

In the case where the four successive 0-point information values Z are "0000" and the present-moment signal D3 is equal to or greater than "0", the before-equalization signal waveform is fixed in a positive side for a long time interval. Thus, in this case, the step 81a calculates a temporary decision value (a temporary decision level) Q according to the equation "Q=2a+3b". After the step 81a, the current execution cycle of the temporary decision ends.

In the case where the four successive 0-point information values Z are "0000" and the present-moment signal D3 is smaller than "0", the before-equalization signal waveform is fixed in a negative side for a long time interval. Thus, in this case, the step 81b calculates the temporary decision value Q according to the equation "Q=0". After the step 81b, the current execution cycle of the temporary decision ends.

The step 62 determines whether or not the first, second, and third ones of the four successive 0-point information values Z represented by the output signals Z2, Z3, Z4, and Z5 of the tap delay circuit portion 23b are "101". When the first, second, and third ones of the four successive 0-point information values Z are "101", the algorithm advances from the step 62 to a step 72. Otherwise, the algorithm advances from the step 62 to a step 63. Only in the case of RLL(1, X), there is a chance that the first, second, and third ones of the four successive 0-point information values Z will be "101".

The step 72 detects the polarity of the present-moment signal D3. Specifically, the step 72 determines whether or not the present-moment signal D3 is smaller than "0". When the present-moment signal D3 is equal to or greater than "0", the algorithm advances from the step 72 to a step 82a. When the present-moment signal D3 is smaller "0", the algorithm advances from the step 72 to a step 82b.

Alternatively, the step 72 may detect the polarity of the signal D4 immediately following the present-moment signal D3. In this case, the step 72 determines whether or not the immediately-following signal D4 is smaller than "0". When the immediately-following signal D4 is smaller than "0", the algorithm advances from the step 72 to the step 82a. When the immediately-following signal D4 is equal to or greater than "0", the algorithm advances from the step 72 to the step 82b.

The step 82a calculates the temporary decision value Q according to the equation "Q=2b". After the step 82a, the current execution cycle of the temporary decision ends.

The step 82b calculates the temporary decision value Q according to the equation "Q=2a+b". After the step 82b, the current execution cycle of the temporary decision ends.

The step 63 determines whether or not the first, second, and third ones of the four successive 0-point information values Z represented by the output signals Z2, Z3, Z4, and Z5 of the tap delay circuit portion 23b are "001". When the first, second, and third ones of the four successive 0-point information values Z are "001", the algorithm advances from the step 63 to a step 73. Otherwise, the algorithm advances from the step 63 to a step 64.

The step 73 detects the polarity of the present-moment signal D3. Specifically, the step 73 determines whether or not the present-moment signal D3 is smaller than "0". When the present-moment signal D3 is equal to or greater than "0", the algorithm advances from the step 73 to a step 83a. When the present-moment signal D3 is smaller "0", the algorithm advances from the step 73 to a step 83b.

Alternatively, the step 73 may detect the polarity of the signal D2 immediately preceding the present-moment signal D3. In this case, the step 73 determines whether or not the immediately-preceding signal D2 is smaller than "0". When the immediately-preceding signal D2 is equal to or greater than "0", the algorithm advances from the step 73 to the step 83a. When the immediately-preceding signal D2 is smaller than "0", the algorithm advances from the step 73 to the step 83b.

The step 83a calculates the temporary decision value Q according to the equation "Q=a+2b". After the step 83a, the current execution cycle of the temporary decision ends.

The step 83b calculates the temporary decision value Q according to the equation "Q=a+b". After the step 83b, the current execution cycle of the temporary decision ends.

The step 64 determines whether or not the four successive 0-point information values Z represented by the output signals Z2, Z3, Z4, and Z5 of the tap delay circuit portion 23b are "1000". When the four successive 0-point information values Z are "1000", the algorithm advances from the step 64 to a step 74. Otherwise, the algorithm advances from the step 64 to a step 65.

The step 74 detects the polarity of the present-moment signal D3. Specifically, the step 74 determines whether or not the present-moment signal D3 is smaller than "0". When the present-moment signal D3 is equal to or greater than "0", the algorithm advances from the step 74 to a step 84a. When the present-moment signal D3 is smaller "0", the algorithm advances from the step 74 to a step 84b.

The step 84a calculates the temporary decision value Q according to the equation "Q=a+3b". After the step 84a, the current execution cycle of the temporary decision ends.

The step 84b calculates the temporary decision value Q according to the equation "Q=a". After the step 84b, the current execution cycle of the temporary decision ends.

The step 65 determines whether or not the four successive 0-point information values Z represented by the output signals Z2, Z3, Z4, and Z5 of the tap delay circuit portion 23b are "0001". When the four successive 0-point information values Z are "0001", the algorithm advances from the step 65 to a step 75. Otherwise, the algorithm advances from the step 65 to a step 66 in FIG. 12.

The step 75 detects the polarity of the present-moment signal D3. Specifically, the step 75 determines whether or not the present-moment signal D3 is smaller than "0". When the present-moment signal D3 is equal to or greater than "0", the algorithm advances from the step 75 to a step 85a. When the present-moment signal D3 is smaller "0", the algorithm advances from the step 75 to a step 85b.

The step 85a calculates the temporary decision value Q according to the equation "Q=a+3b". After the step 85a, the current execution cycle of the temporary decision ends.

The step 85b calculates the temporary decision value Q according to the equation "Q=a". After the step 85b, the current execution cycle of the temporary decision ends.

With reference to FIG. 12, the step 66 determines whether or not the four successive 0-point information values Z represented by the output signals Z2, Z3, Z4, and Z5 of the tap delay circuit portion 23b are "0101". When the four successive 0-point information values Z are "0101", the algorithm advances from the step 66 to a step 76. Otherwise, the algorithm advances from the step 66 to a step 67.

The step 76 detects the polarity of the present-moment signal D3. Specifically, the step 76 determines whether or not the present-moment signal D3 is smaller than "0". When the present-moment signal D3 is equal to or greater than "0", the algorithm advances from the step 76 to a step 86a. When the present-moment signal D3 is smaller "0", the algorithm advances from the step 76 to a step 86b.

The step 86a calculates the temporary decision value Q according to the equation "Q=2b". After the step 86a, the current execution cycle of the temporary decision ends.

The step 86b calculates the temporary decision value Q according to the equation "Q=2a+b". After the step 86b, the current execution cycle of the temporary decision ends.

The step 67 determines whether or not the four successive 0-point information values Z represented by the output signals Z2, Z3, Z4, and Z5 of the tap delay circuit portion 23b are "0100". When the four successive 0-point information values Z are "0100", the algorithm advances from the step 67 to a step 77. Otherwise, the algorithm advances from the step 67 to a step 68.

The step 77 detects the polarity of the present-moment signal D3. Specifically, the step 77 determines whether or not the present-moment signal D3 is smaller than "0". When the present-moment signal D3 is equal to or greater than "0", the algorithm advances from the step 77 to a step 87a. When the present-moment signal D3 is smaller "0", the algorithm advances from the step 77 to a step 87b.

Alternatively, the step 77 may detect the polarity of the signal D4 immediately following the present-moment signal D3. In this case, the step 77 determines whether or not the immediately-following signal D4 is smaller than "0". When the immediately-following signal D4 is equal to or greater than "0", the algorithm advances from the step 77 to the step 87a. When the immediately-following signal D4 is smaller than "0", the algorithm advances from the step 77 to the step 87b.

The step 87a calculates the temporary decision value Q according to the equation "Q=a+2b". After the step 87a, the current execution cycle of the temporary decision ends.

The step 87b calculates the temporary decision value Q according to the equation "Q=a+b". After the step 87b, the current execution cycle of the temporary decision ends.

The step 68 determines whether or not the four successive 0-point information values Z represented by the output signals Z2, Z3, Z4, and Z5 of the tap delay circuit portion 23b are "1001". When the four successive 0-point information values Z are "1001", the algorithm advances from the step 68 to a step 78. Otherwise, the algorithm advances from the step 68 to a step 79.

The step 78 detects the polarity of the present-moment signal D3. Specifically, the step 78 determines whether or not the present-moment signal D3 is smaller than "0". When the present-moment signal D3 is equal to or greater than "0", the algorithm advances from the step 78 to a step 88a. When the present-moment signal D3 is smaller "0", the algorithm advances from the step 78 to a step 88b.

The step 88a calculates the temporary decision value Q according to the equation "Q=3b". After the step 88a, the current execution cycle of the temporary decision ends.

The step 88b calculates the temporary decision value Q according to the equation "Q=2a". After the step 88b, the current execution cycle of the temporary decision ends.

The step 79 detects the polarity of the present-moment signal D3. Specifically, the step 79 determines whether or not the present-moment signal D3 is smaller than "0". When the present-moment signal D3 is equal to or greater than "0", the algorithm advances from the step 79 to a step 89a. When the present-moment signal D3 is smaller "0", the algorithm advances from the step 79 to a step 89b.

The step 89a calculates the temporary decision value Q according to the equation "Q=2b". After the step 89a, the current execution cycle of the temporary decision ends.

The step 89b calculates the temporary decision value Q according to the equation "Q=2a+b". After the step 89b, the current execution cycle of the temporary decision ends.

Figure 13:
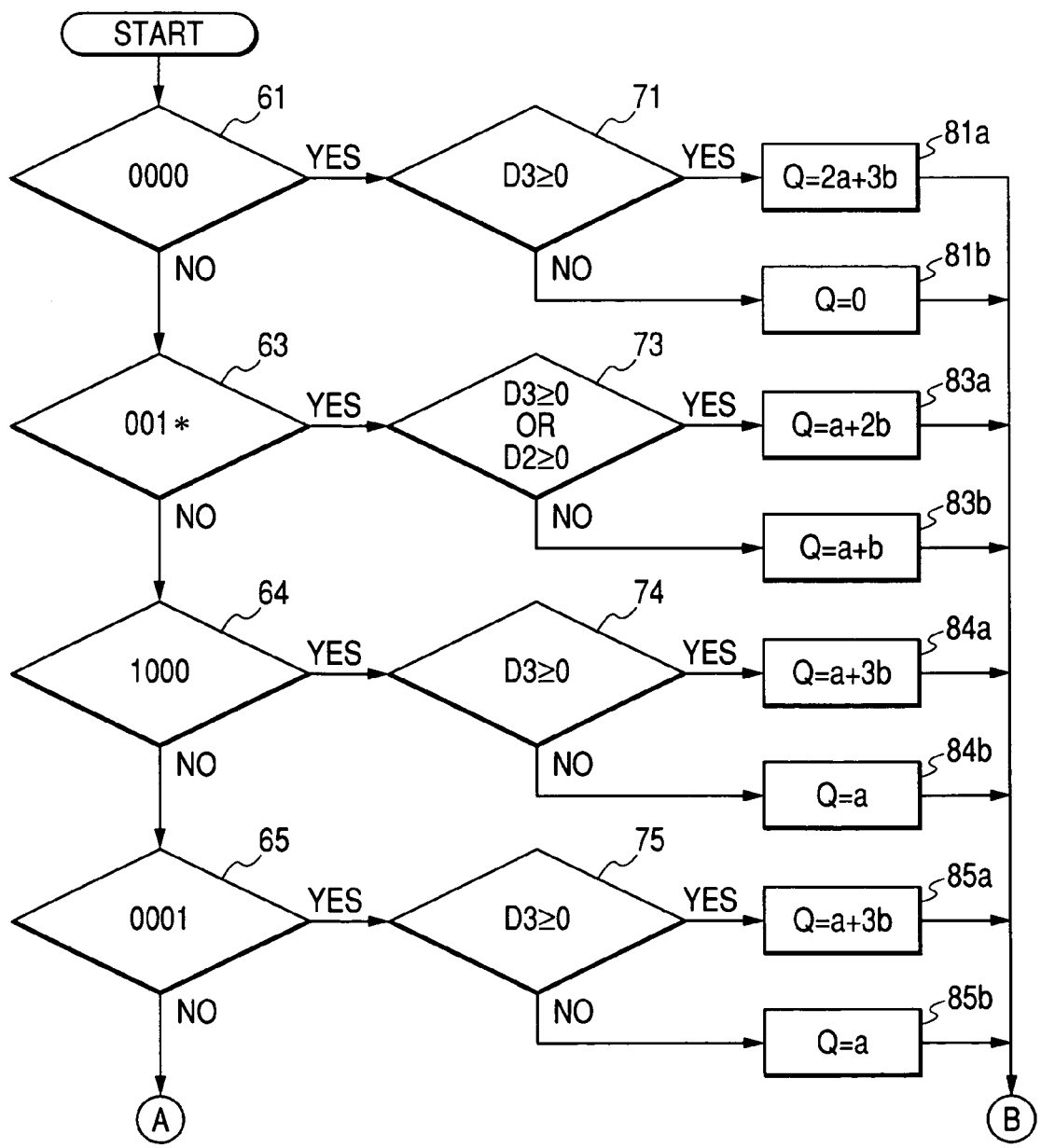
FIGS. 13 and 14 are a flowchart of an algorithm of temporary decision for RLL(2, X).
Figure 14:
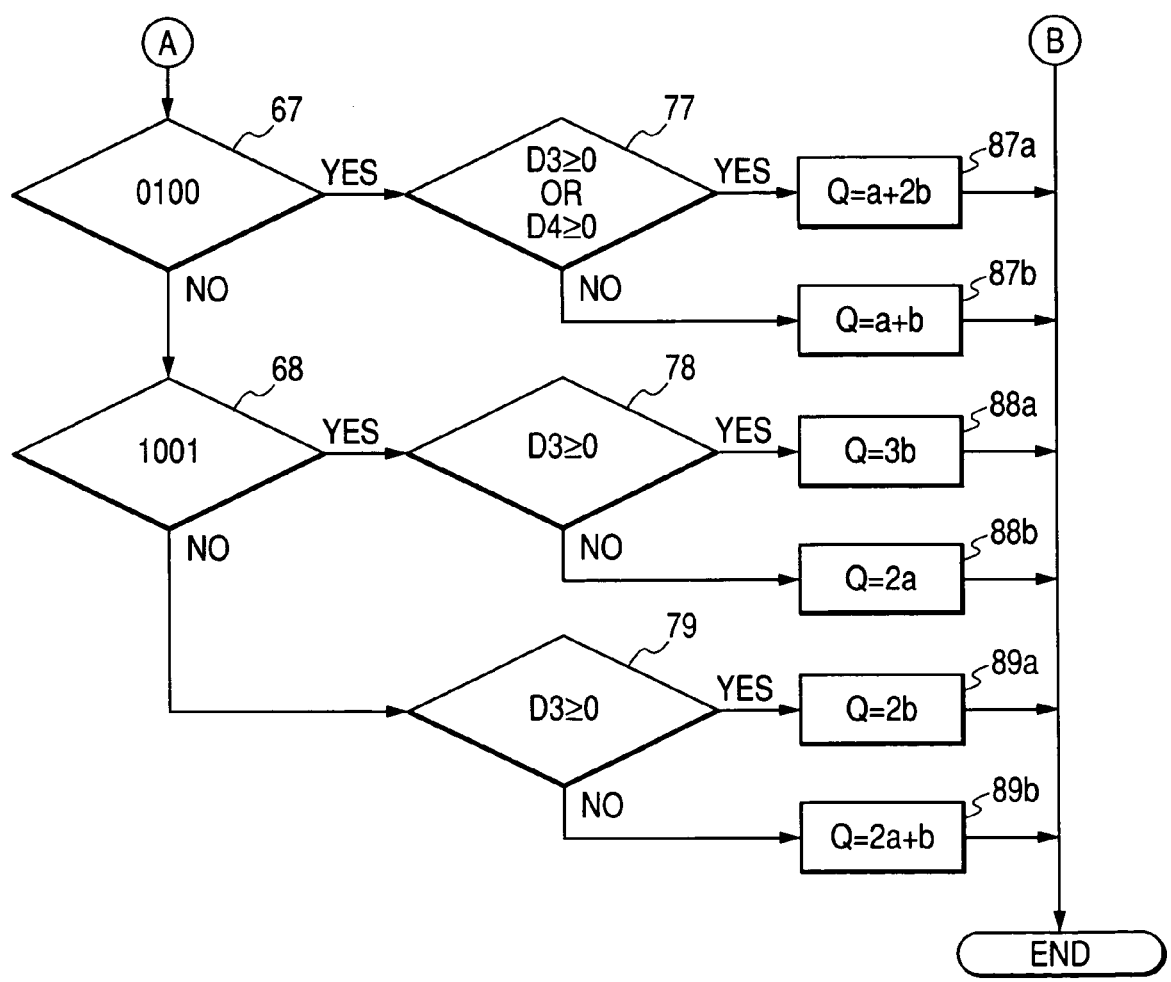

FIGS. 13 and 14 constitute a flowchart of the algorithm of the temporary decision which is performed by the temporary decision device 51 when the RLL mode represented by the RLL mode signal corresponds to RLL(2, X). The temporary decision algorithm in FIGS. 13 and 14 is similar to that in FIGS. 11 and 12 except for the following points. As previously mentioned, in the case of RLL(2, X), at least two "0" points (Z=0 points) exist between two adjacent zero-cross points (Z=1) since the values "2a+b" and "2b" are absent. Therefore, the step 62 for determining whether or not the first, second, and third ones of the four successive 0-point information values Z represented by the output signals Z2, Z3, Z4, and Z5 of the tap delay circuit portion 23b are "101", and the step 66 for determining whether or not the four successive 0-point information values Z represented by the output signals Z2, Z3, Z4, and Z5 of the tap delay circuit portion 23b are "0101" are omitted from the temporary decision algorithm in FIGS. 13 and 14. Furthermore, the steps 72, 82a, 82b, 76, 86a, and 86b following the steps 62 and 66 are omitted from the temporary decision algorithm in FIGS. 13 and 14.

The temporary decision device 51 outputs a signal representative of the temporary decision value (the temporary decision level) Q to the subtracter 52 in FIG. 5 as a temporary decision result signal. The temporary decision value Q is determined by the steps 81a-89a and 81b-89b in FIGS. 11 and 12 or those in FIGS. 13 and 14. The temporary decision value Q is updated on a sample-by-sample basis. The device 52 subtracts the temporary decision result signal from the present-moment signal D3, thereby generating an error signal corresponding to the difference therebetween. The subtracter 52 outputs the error signal to the D flip-flop 53. The D flip-flop 53 latches the error signal. The D flip-flop 53 feeds the latched error signal to the inverter 25 via the terminal 54. The device 25 inverts the error signal in polarity. The inverter 25 outputs the inversion-resultant error signal to the multipliers 22B, 22C, 22D, 22E, and 22F in the multiplier and LPF section 22. The tap output signals of the transversal filter 21 are applied to the multipliers 22B, 22C, 22D, 22E, and 22F in the multiplier and LPF section 22, respectively. The devices 22B, 22C, 22D, 22E, and 22F multiply the respective tap output signals by the inversion-resultant error signal. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thus process the output signals of the multipliers 22B, 22C, 22D, 22E, and 22F into signals representing tap coefficients, respectively. The low pass filters 22G, 22H, 22I, 22J, and 22K output the tap coefficient signals to the multipliers 21F, 21G, 21H, 21I, and 21J within the transversal filter 21, respectively. The tap coefficients represented by the output signals of the low pass filters 22G, 22H, 22I, 22J, and 22K cause the equalization by the transversal filter 21 to nullify the error signal generated by the subtracter 52 within the temporary decision circuit 24. In this way, the tap coefficients used by the transversal filter 21 are controlled to nullify the error signal generated by the subtracter 52.

Figure 15:
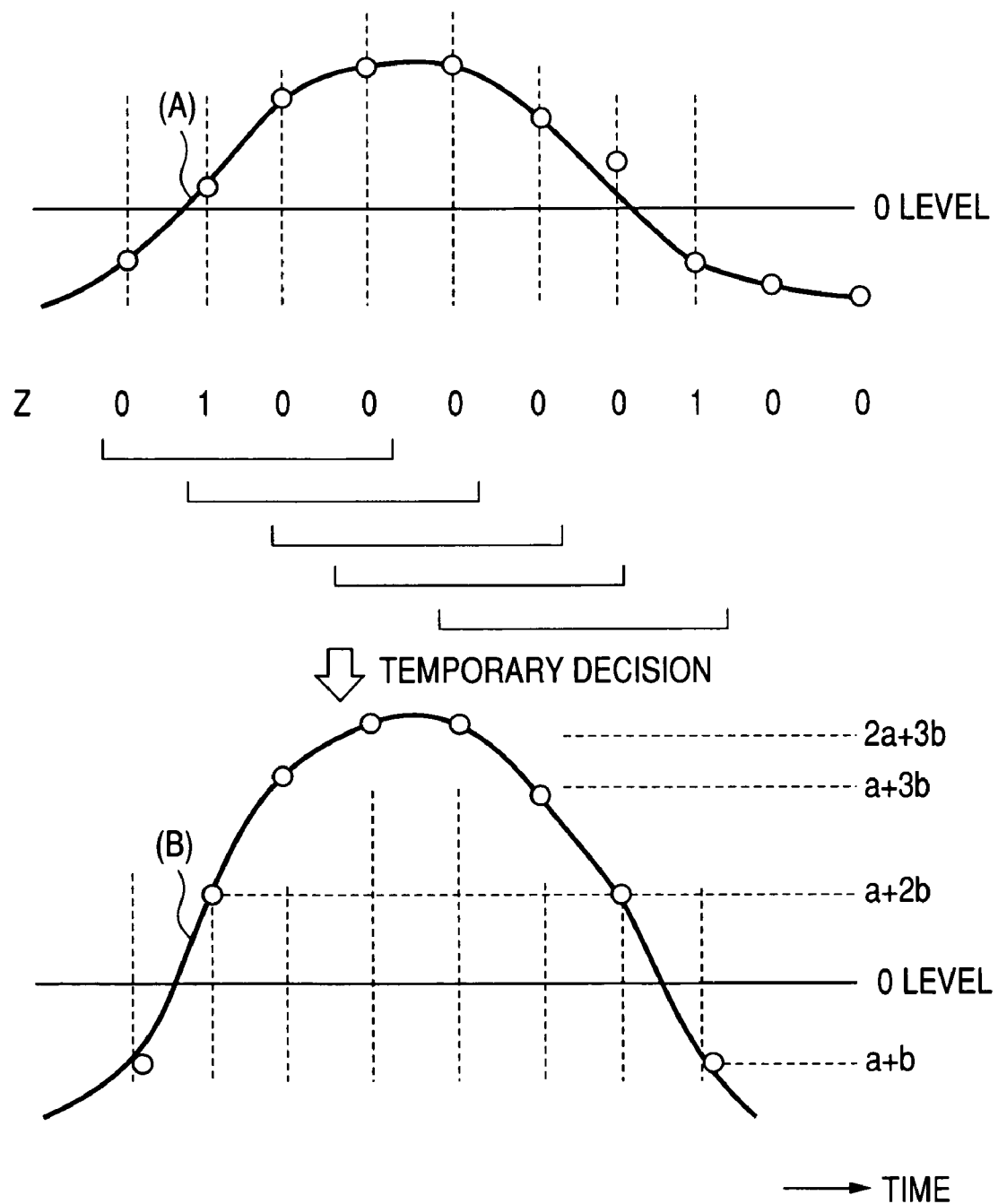
FIG. 15 is a time-domain diagram of a first example of a before-temporary-decision waveform and a temporary-decision-resultant waveform.

FIG. 15 shows a first example (A) of the waveform represented by the output signal of the transversal filter 21 which is fed via the tap delay circuit 23 to the temporary decision circuit 24 (see FIG. 3). The 0-point information is fed from the re-sampling DPLL section 19 to the temporary decision circuit 24 via the tap delay circuit 23. For the waveform (A) represented by the output signal of the transversal filter 21, the value Z of the 0-point information fed to the temporary decision circuit 24 changes as shown in FIG. 15. Sample points "○" on the waveform (A) are given for the PR equalization by the adaptive equalization circuit 20, and are in phase with original data points. As shown in FIG. 15, 0-point information values Z are generated coincidently with sample points "○", respectively.

According to the waveform (A), four successive 0-point information values change as "0100"→"1000"→"0000"→"0000"→"0001". FIG. 15 also shows a temporary-decision-resultant waveform (B) of sample points "○" which originates from the waveform (A). Sample points "○" on the waveform (B) are in phase with original data points.

In FIG. 15, the four successive 0-point information values Z are "0100" at the first stage. In this case, the four successive 0-point information values Z being "0100" are detected by the step 67 in FIG. 12, and the temporary decision is executed in response to the polarity of the present-moment signal D3 (or the polarity of the immediately-following signal D4) which is determined by the step 77 in FIG. 12. The second one of the four successive 0-point information values Z corresponds to the present-moment signal D3. Since the polarity of the present-moment signal D3 is positive as shown in FIG. 15, the temporary decision value Q is set to "a+2b" by the step 87a in FIG. 12. Thus, the temporary-decision-resultant waveform (B) reflects the temporary decision value Q equal to "a+2b".

In FIG. 15, the four successive 0-point information values Z are "1000" at the second stage. In this case, the four successive 0-point information values Z being "1000" are detected by the step 64 in FIG. 11, and the temporary decision is executed in response to the polarity of the present-moment signal D3 which is determined by the step 74 in FIG. 11. The second one of the four successive 0-point information values Z corresponds to the present-moment signal D3. Since the polarity of the present-moment signal D3 is positive as shown in FIG. 15, the temporary decision value Q is set to "a+3b" by the step 84a in FIG. 11. Thus, the temporary-decision-resultant waveform (B) reflects the temporary decision value Q equal to "a+3b".

In FIG. 15, the four successive 0-point information values Z are "0000" at the third stage. In this case, the four successive 0-point information values Z being "0000" are detected by the step 61 in FIG. 11, and the temporary decision is executed in response to the polarity of the present-moment signal D3 which is determined by the step 71 in FIG. 11. The second one of the four successive 0-point information values Z corresponds to the present-moment signal D3. Since the polarity of the present-moment signal D3 is positive as shown in FIG. 15, the temporary decision value Q is set to "2a+3b" by the step 81a in FIG. 11. Thus, the temporary-decision-resultant waveform (B) reflects the temporary decision value Q equal to "2a+3b".

In FIG. 15, the four successive 0-point information values Z are "0000" at the fourth stage. In this case, the four successive 0-point information values Z being "0000" are detected by the step 61 in FIG. 11, and the temporary decision is executed in response to the polarity of the present-moment signal D3 which is determined by the step 71 in FIG. 11. The second one of the four successive 0-point information values Z corresponds to the present-moment signal D3. Since the polarity of the present-moment signal D3 is positive as shown in FIG. 15, the temporary decision value Q is set to "2a+3b" by the step 81a in FIG. 11. Thus, the temporary-decision-resultant waveform (B) reflects the temporary decision value Q equal to "2a+3b".

In FIG. 15, the four successive 0-point information values Z are "0001" at the fifth stage. In this case, the four successive 0-point information values Z being "0001" are detected by the step 65 in FIG. 11, and the temporary decision is executed in response to the polarity of the present-moment signal D3 which is determined by the step 75 in FIG. 11. The second one of the four successive 0-point information values Z corresponds to the present-moment signal D3. Since the polarity of the present-moment signal D3 is positive as shown in FIG. 15, the temporary decision value Q is set to "a+3b" by the step 85a in FIG. 11. Thus, the temporary-decision-resultant waveform (B) reflects the temporary decision value Q equal to "a+3b".

Figure 16:
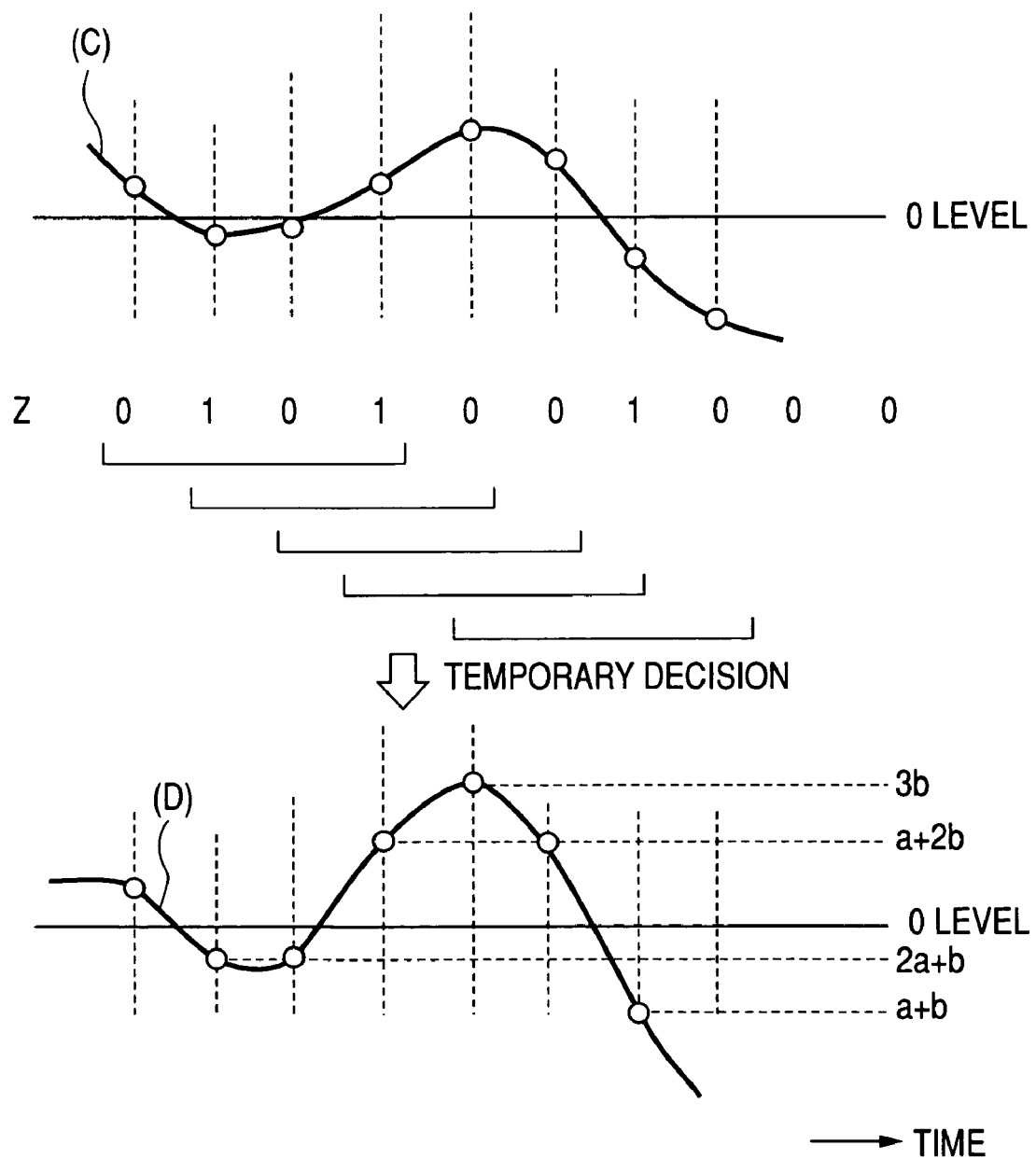
FIG. 16 is a time-domain diagram of a second example of a before-temporary-decision waveform and a temporary-decision-resultant waveform.

FIG. 16 shows a second example (C) of the waveform represented by the output signal of the transversal filter 21 which is fed via the tap delay circuit 23 to the temporary decision circuit 24 (see FIG. 3). The 0-point information is fed from the re-sampling DPLL section 19 to the temporary decision circuit 24 via the tap delay circuit 23. For the waveform (C) represented by the output signal of the transversal filter 21, the value Z of the 0-point information fed to the temporary decision circuit 24 changes as shown in FIG. 16. Sample points "○" on the waveform (C) are given for the PR equalization by the adaptive equalization circuit 20, and are in phase with original data points. As shown in FIG. 16, 0-point information values Z are generated coincidently with sample points "○", respectively.

According to the waveform (C), four successive 0-point information values change as "0101"→"1010"→"0100"→"1001"→"0010". FIG. 16 also shows a temporary-decision-resultant waveform (D) of sample points "○" which originates from the waveform (C). Sample points "○" on the waveform (D) are in phase with original data points.

In FIG. 16, the four successive 0-point information values Z are "0101" at the first stage. In this case, the four successive 0-point information values Z being "0101" are detected by the step 66 in FIG. 12, and the temporary decision is executed in response to the polarity of the present-moment signal D3 which is determined by the step 76 in FIG. 12. The second one of the four successive 0-point information values Z corresponds to the present-moment signal D3. Since the polarity of the present-moment signal D3 is negative as shown in FIG. 16, the temporary decision value Q is set to "2a+b" by the step 86b in FIG. 12. Thus, the temporary-decision-resultant waveform (D) reflects the temporary decision value Q equal to "2a+b".

In FIG. 16, the four successive 0-point information values Z are "1010" at the second stage. In this case, the four successive 0-point information values Z being "1010" are detected by the step 62 in FIG. 11, and the temporary decision is executed in response to the polarity of the immediately-following signal D4 (or the polarity of the present-moment signal D3) which is determined by the step 72 in FIG. 11. The third one of the four successive 0-point information values Z corresponds to the immediately-following signal D4. Since the polarity of the immediately-following signal D4 is positive as shown in FIG. 16, the temporary decision value Q is set to "2a+b" by the step 82b in FIG. 11. Thus, the temporary-decision-resultant waveform (D) reflects the temporary decision value Q equal to "2a+b".

In FIG. 16, the four successive 0-point information values Z are "0100" at the third stage. In this case, the four successive 0-point information values Z being "0100" are detected by the step 67 in FIG. 12, and the temporary decision is executed in response to the polarity of the present-moment signal D3 (or the polarity of the immediately-following signal D4) which is determined by the step 77 in FIG. 12. The second one of the four successive 0-point information values Z corresponds to the present-moment signal D3. Since the polarity of the present-moment signal D3 is positive as shown in FIG. 16, the temporary decision value Q is set to "a+2b" by the step 87a in FIG. 12. Thus, the temporary-decision-resultant waveform (D) reflects the temporary decision value Q equal to "a+2b".

In FIG. 16, the four successive 0-point information values Z are "1001" at the fourth stage. In this case, the four successive 0-point information values Z being "1001" are detected by the step 68 in FIG. 12, and the temporary decision is executed in response to the polarity of the present-moment signal D3 which is determined by the step 78 in FIG. 12. The second one of the four successive 0-point information values Z corresponds to the present-moment signal D3. Since the polarity of the present-moment signal D3 is positive as shown in FIG. 16, the temporary decision value Q is set to "3b" by the step 88a in FIG. 12. Thus, the temporary-decision-resultant waveform (D) reflects the temporary decision value Q equal to "3b".

In FIG. 16, the four successive 0-point information values Z are "0010" at the fifth stage. In this case, the four successive 0-point information values Z being "0010" are detected by the step 63 in FIG. 11, and the temporary decision is executed in response to the polarity of the present-moment signal D3 (or the polarity of the immediately-preceding signal D2) which is determined by the step 73 in FIG. 11. The second one of the four successive 0-point information values Z corresponds to the present-moment signal D3. Since the polarity of the present-moment signal D3 is positive as shown in FIG. 16, the temporary decision value Q is set to "a+2b" by the step 83a in FIG. 11. Thus, the temporary-decision-resultant waveform (D) reflects the temporary decision value Q equal to "a+2b".

In this way, the waveform equalization responds to four successive 0-point information values Z. In addition, the waveform equalization is executed toward target values determined directly from the state transition diagram of FIG. 8. Therefore, the waveform equalization is less adversely affected by the level represented by a current signal sample. Accordingly, the waveform equalization is reliable. Furthermore, the waveform equalization can be changed among different PR equalizations in response to the PR mode signal and the RLL mode signal. In addition, the waveform equalization provides a shorter convergence time since the probability of occurrence of a decision error is relatively low.

It should be noted that the present embodiment of this invention can be applied to RLL(2, X) since RLL(2, X) is substantially similar to RLL(1, X) in state transitions. The temporary decision algorithm in FIGS. 13 and 14 is used instead of that in FIGS. 11 and 12 when the present embodiment of this invention is applied to RLL(2, X).

Experiments were carried out. During the experiments, a test signal of RLL(1, X) was inputted into the reproducing apparatus of FIG. 1 while the applied PR mode signal has a value of "1" corresponding to PR(1, 2, 2, 2, 1). The test signal was processed by the reproducing apparatus of FIG. 1 into an equalization-resultant signal which appeared at the output terminal of the adaptive equalization circuit 20. FIG. 17 shows time-domain conditions of the equalization-resultant signal, that is, the eye pattern indicated by the equalization-resultant signal. In FIG. 17, the abscissa denotes time elapsed, and the ordinate denotes the quantization levels of signal samples. As shown in FIG. 17, samples of the equalization-resultant signal quickly converged on nine different target levels of "0", "1", "2", "3", "4", "5", "6", "7", and "8" which correspond to the values "0", "a", "2a", "a+b", "2a+b" ("2b"), "a+2b", "3b", "a+3b", and "2a+3b" respectively.

During the experiments, a test signal of RLL(1, X) was inputted into the reproducing apparatus of FIG. 1 while the applied PR mode signal has a value of "2" corresponding to PR(1, 3, 3, 3, 1). The test signal was processed by the reproducing apparatus of FIG. 1 into an equalization-resultant signal which appeared at the output terminal of the adaptive equalization circuit 20. FIG. 18 shows time-domain conditions of the equalization-resultant signal, that is, the eye pattern indicated by the equalization-resultant signal. In FIG. 18, the abscissa denotes time elapsed, and the ordinate denotes the quantization levels of signal samples. As shown in FIG. 18, samples of the equalization-resultant signal quickly converged on ten different target levels of "0", "1", "2", "4", "5", "6", "7", "9", "10", and "11" which correspond to the values "0", "a", "2a", "a+b", "2a+b", "2b", "a+2b", "3b", "a+3b", and "2a+3b" respectively.

Second Embodiment

FIG. 19 shows a portion of a reproducing apparatus according to a second embodiment of this invention. The reproducing apparatus in FIG. 19 is similar to the reproducing apparatus in FIGS. 1 and 3 except that a re-sampling DPLL section 19a and an adaptive equalization circuit 20b replace the re-sampling DPLL section 19 and the adaptive equalization circuit 20 (see FIG. 3) respectively.

With reference to FIG. 19, the re-sampling DPLL section 19a does not generate 0-point information. The re-sampling DPLL section 19a feeds a main digital signal (a second digital signal) to a transversal filter 21 within the adaptive equalization circuit 20b as the re-sampling DPLL section 19 (see FIG. 3) does.

The adaptive equalization circuit 20b is similar to the adaptive equalization circuit 20 (see FIG. 3) except for the following point. The adaptive equalization circuit 20b includes a zero detector 26. The input terminal of the zero detector 26 is connected to the output terminal of the transversal filter 21. The output terminal of the zero detector 26 is connected to an input terminal of a tap delay circuit 23.

The zero detector 26 senses every inversion of the polarity of the output signal of the transversal filter 21 by referring to two successive samples thereof. For every sensed polarity inversion, the zero detector 26 selects one from two related signal samples which is closer to "0", and outputs 0-point information to the tap delay circuit 23 in response to the selected signal sample.

Third Embodiment

Figure 20:
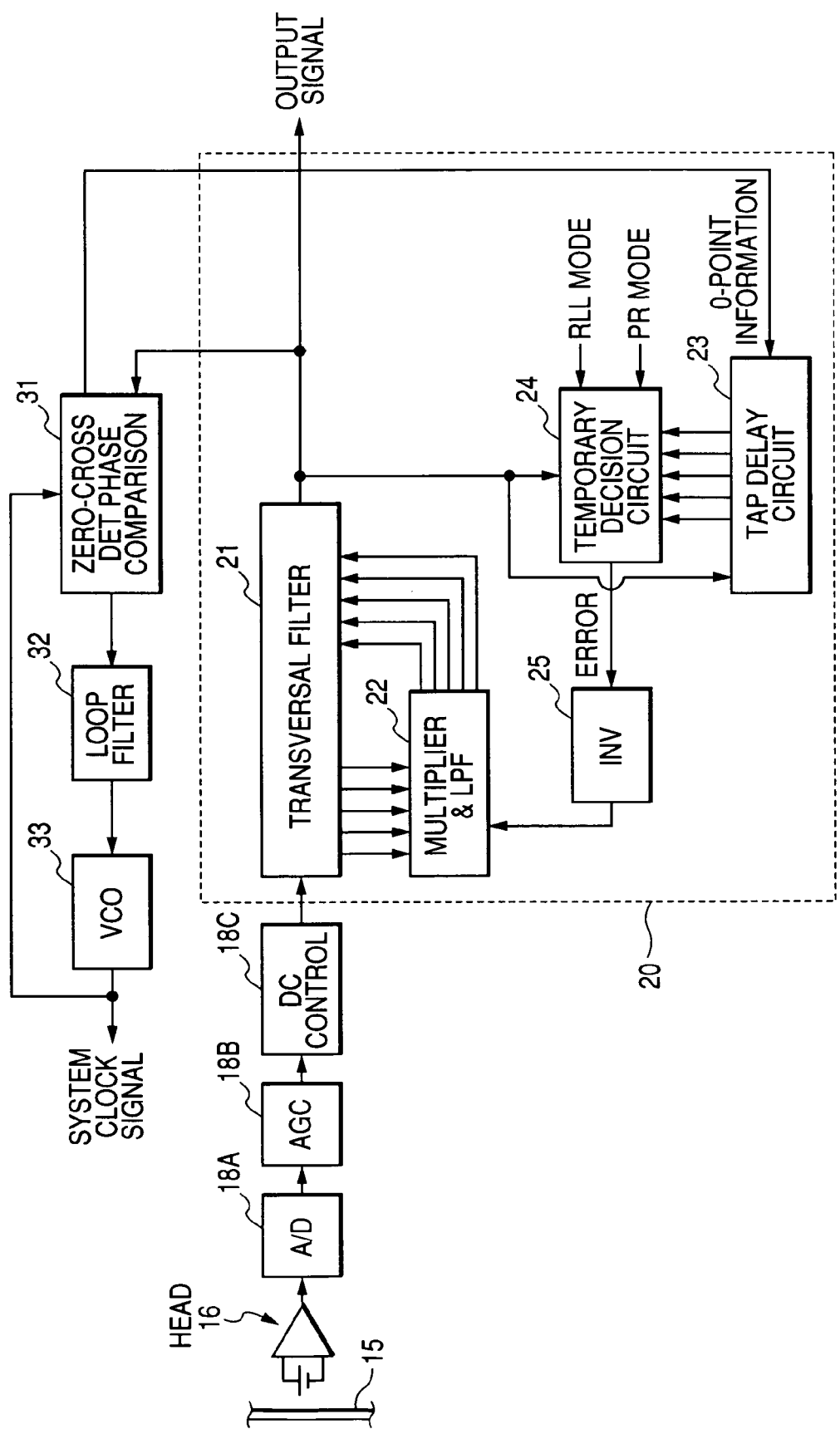
FIG. 20 is a block diagram of a portion of a reproducing apparatus according to a third embodiment of this invention.

FIG. 20 shows a portion of a reproducing apparatus according to a third embodiment of this invention. The reproducing apparatus in FIG. 20 is similar to the reproducing apparatus in FIGS. 1 and 3 except for design changes mentioned hereafter. The reproducing apparatus in FIG. 20 includes an A/D converter 18A, an AGC circuit 18B, and a DC controller 18C which follow an optical head 16 in that order. The output terminal of the DC controller 18C is connected to the input terminal of a transversal filter 21 within an adaptive equalization circuit 20.

The A/D converter 18A receives the output signal of the optical head 16. The A/D converter 18A changes the output signal of the optical head 16 into a corresponding digital signal. Specifically, the A/D converter 18A periodically samples the output signal of the optical head 16 in response to a system clock signal, and converts every resultant sample into a digital sample. The A/D converter 18A outputs the digital signal to the AGC circuit 18B. The AGC circuit 18B subjects the output signal of the A/D converter 18A to automatic gain control (AGC) for providing a constant signal amplitude on a digital basis. The AGC circuit 18B outputs the resultant digital signal to the DC controller 18C.

The DC controller 18C subjects the output signal of the AGC circuit 18B to ATC (automatic threshold control). The DC controller 18C outputs the control-resultant signal to the transversal filter 21 within the adaptive equalization circuit 20.

The reproducing apparatus in FIG. 20 includes a zero-cross detection and phase comparison circuit 31, a loop filter 32, and a voltage-controlled oscillator (VCO) 33 which are connected in a closed loop in that order. The circuit 31 detects every zero-cross point of the output signal of the transversal filter 21. The circuit 31 compares the phase of the detected zero-cross point and the phase of a system clock signal fed from the VCO 33, and generates a phase error signal in response to the result of the phase comparison. The circuit 31 outputs the phase error signal to the loop filter 32. The loop filter 32 converts the phase error signal into a control voltage.

The loop filter 32 outputs the control voltage to the VCO 33. The VCO 33 oscillates at a frequency determined by the control voltage, and thereby generates the system clock signal. The VCO outputs the system clock signal to the A/D converter 18A, the circuit 31, and other devices and circuits within the reproducing apparatus. The system clock signal may include a bit clock signal.

In addition, the circuit 31 generates 0-point information in response to the detected zero-cross point. The circuit 31 outputs the 0-point information to a tap delay circuit 23 within the adaptive equalization circuit 20.

Fourth Embodiment

Figure 21:
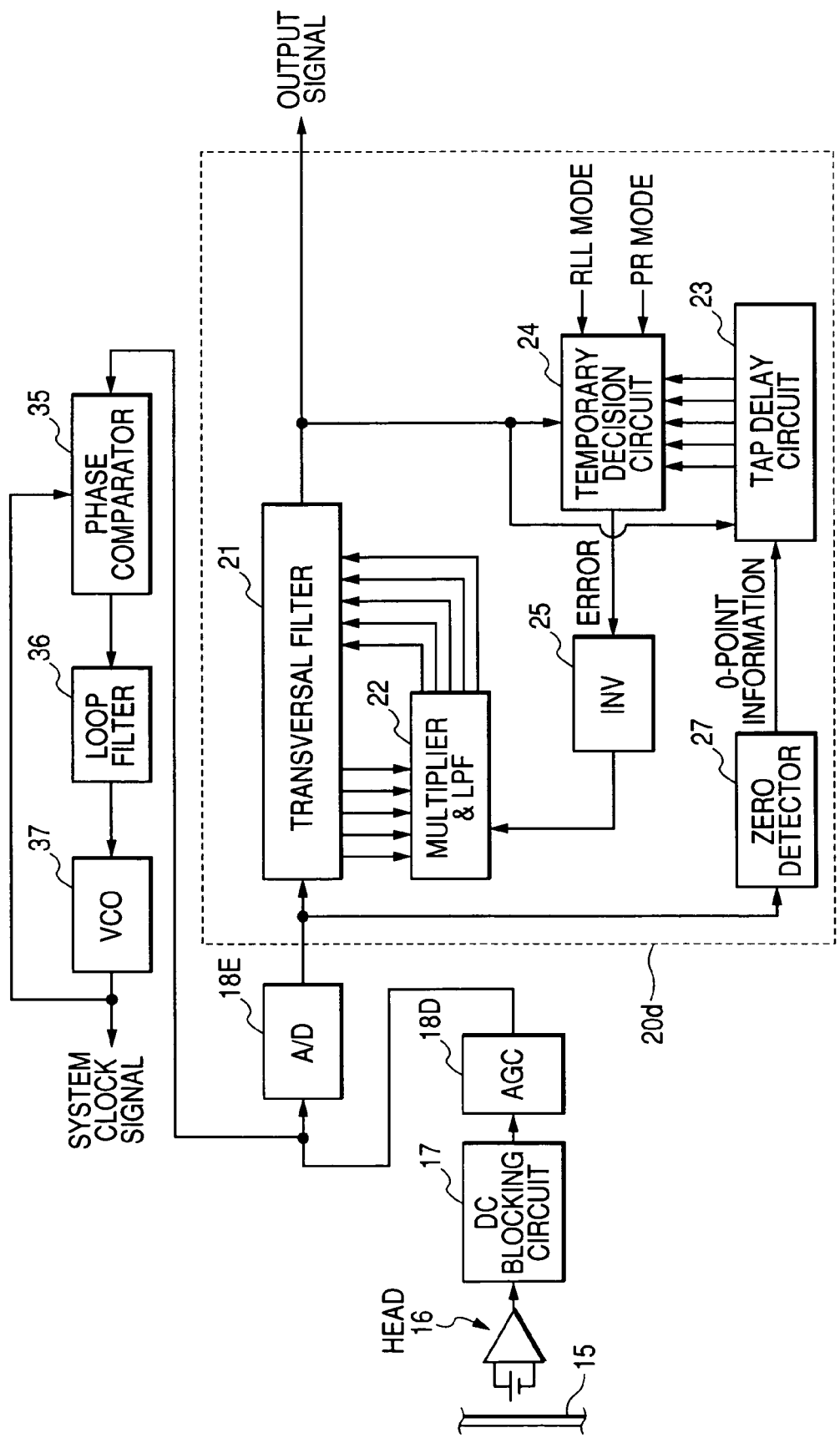
FIG. 21 is a block diagram of a portion of a reproducing apparatus according to a fourth embodiment of this invention.

FIG. 21 shows a portion of a reproducing apparatus according to a fourth embodiment of this invention. The reproducing apparatus in FIG. 21 is similar to the reproducing apparatus in FIGS. 1 and 3 except for design changes mentioned hereafter. The reproducing apparatus in FIG. 21 includes an AGC circuit 18D and an A/D converter 18E which successively follow a DC blocking circuit 17 in that order.

The reproducing apparatus in FIG. 21 includes an adaptive equalization circuit 20d instead of the adaptive equalization circuit 20 (see FIG. 3). The adaptive equalization circuit 20d is similar to the adaptive equalization circuit 20 except that a zero detector 27 is provided therein. The input terminal of the zero detector 27 is connected to the output terminal of the A/D converter 18E. The output terminal of the zero detector 27 is connected to an input terminal of a tap delay circuit 23. The input terminal of a transversal filter 21 is connected to the output terminal of the A/D converter 18E.

The AGC circuit 18D receives the output signal of the DC blocking circuit 17. The AGC circuit 18D subjects the output signal of the DC blocking circuit 17 to automatic gain control (AGC) for providing a constant signal amplitude on an analog basis. The AGC circuit 18D outputs the resultant signal to the A/D converter 18E.

It should be noted that at least one of the DC blocking circuit 17 and the AGC circuit 18D may be replaced by a pre-equalizer. In this case, the A/D converter 18E receives a pre-equalized signal.

The A/D converter 18E changes the output signal of the AGC circuit 18D into a corresponding digital signal. Specifically, the A/D converter 18E periodically samples the output signal of the AGC circuit 18D in response to a system clock signal, and converts every resultant sample into a digital sample. The A/D converter 18E outputs the digital signal to the transversal filter 21 and the zero detector 27 within the adaptive equalization circuit 20d.

The zero detector 27 senses every inversion of the polarity of the output signal of the A/D converter 18E by referring to two successive samples thereof. For every sensed polarity inversion, the zero detector 27 selects one from two related signal samples which is closer to "0", and outputs the selected signal sample to the tap delay circuit 23 as 0-point information.

The reproducing apparatus in FIG. 21 includes a phase comparator 35, a loop filter 36, and a voltage-controlled oscillator (VCO) 37 which are connected in a closed loop in that order. The phase comparator 35 receives the output signal of the AGC circuit 18D. The device 35 compares the phase of the output signal of the AGC circuit 18D and the phase of a system clock signal fed from the VCO 37, and generates a phase error signal in response to the result of the phase comparison. The phase comparator 35 outputs the phase error signal to the loop filter 36. The loop filter 36 converts the phase error signal into a control voltage. The loop filter 36 applies the control voltage to the VCO 37. The VCO 37 oscillates at a frequency determined by the control voltage, and thereby generates the system clock signal. The VCO 37 outputs the system clock signal to the A/D converter 18E, the phase comparator 35, and other devices and circuits within the reproducing apparatus. The system clock signal may include a bit clock signal.

Fifth Embodiment

Figure 22:
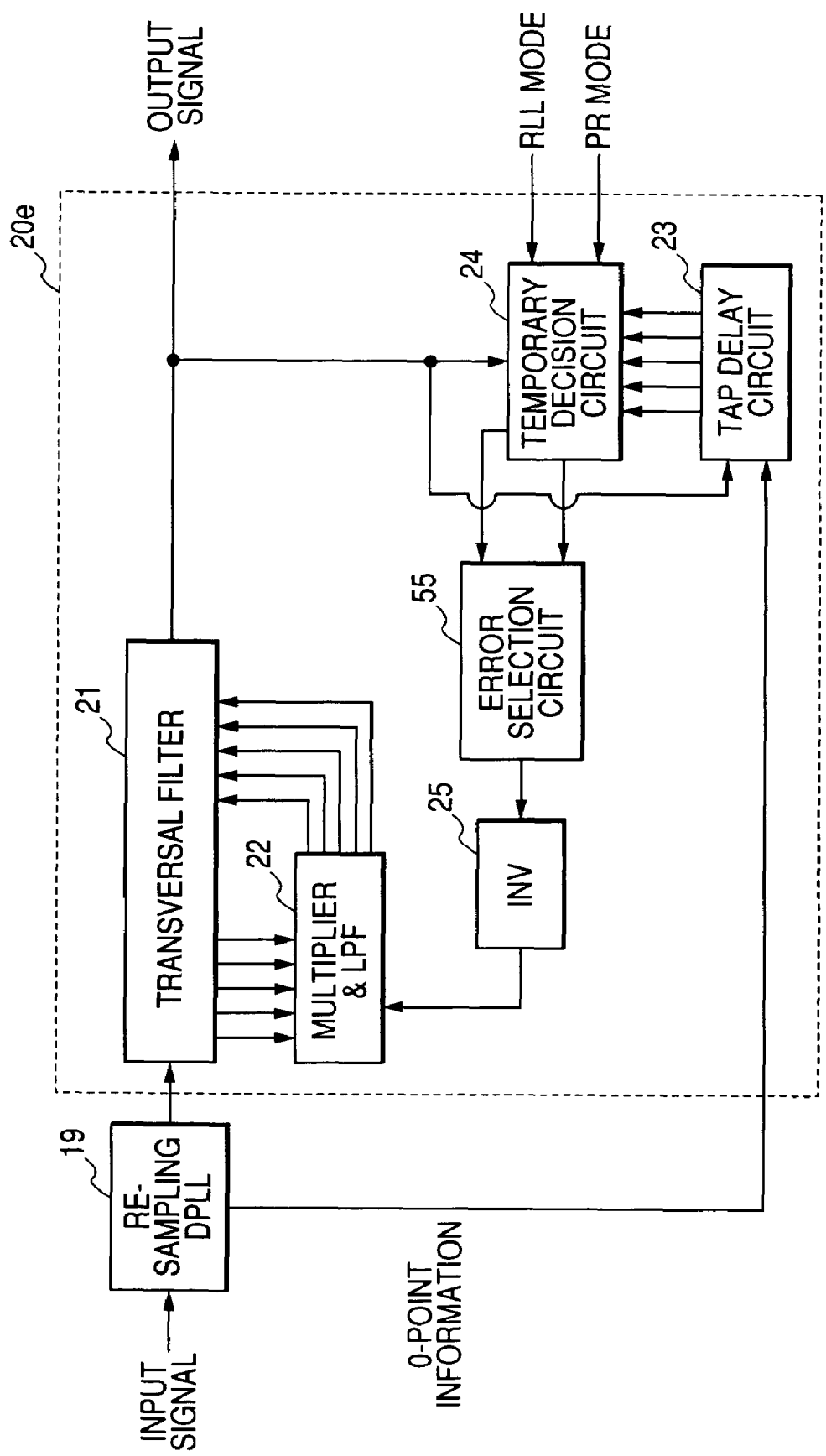
FIG. 22 is a block diagram of a portion of a reproducing apparatus according to a fifth embodiment of this invention.

FIG. 22 shows a portion of a reproducing apparatus according to a fifth embodiment of this invention. The reproducing apparatus in FIG. 22 is similar to the reproducing apparatus in FIGS. 1 and 3 except that an adaptive equalization circuit 23e replaces the adaptive equalization circuit 20 (see FIG. 3). The adaptive equalization circuit 20e includes an error selection circuit 55 connected between a temporary decision circuit 24 and an inverter 25. Regarding other points, the adaptive equalization circuit 20e is similar to the adaptive equalization circuit 20 (see FIG. 3).

Figure 23:
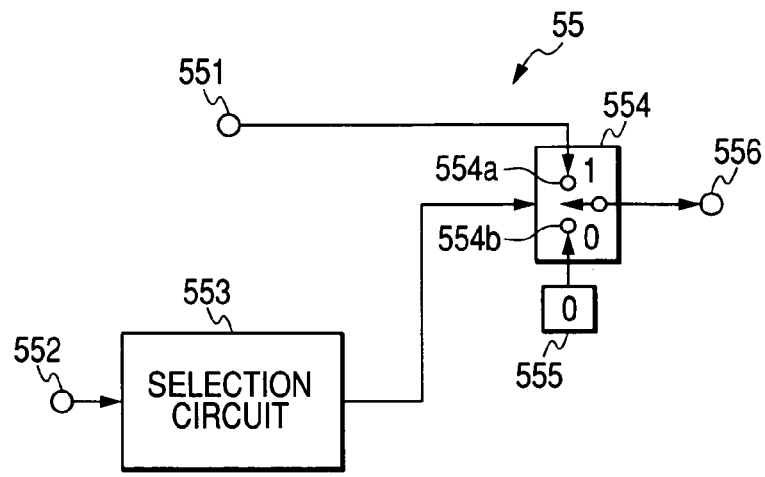
FIG. 23 is a block diagram of an error selection circuit in FIG. 22.

As shown in FIG. 23, the error selection circuit 55 includes a selection circuit 553, a switch 554, and a "0" generator 555. The selection circuit 553 receives the temporary decision result signal from the temporary decision device 51 (see FIG. 5) within the temporary decision circuit 24 via a terminal 552.

According to a first example, the selection circuit 553 operates as follows. When the temporary decision result signal corresponds to one of the values "0" and "2a+3b" which are significantly remote from the zero level, the selection circuit 553 outputs a "0" signal to a control terminal of the switch 554. On the other hand, when the temporary decision result signal corresponds to none of the values "0" and "2a+3b", the selection circuit 553 outputs a "1" signal to the control terminal of the switch 554.

According to a second example, the selection circuit 553 operates as follows. When the temporary decision result signal corresponds to one of the values "0", "a", "a+3b", and "2a+3b" which are significantly remote from the zero level, the selection circuit 553 outputs the "0" signal to the control terminal of the switch 554. On the other hand, when the temporary decision result signal corresponds to none of the values "0", "a", "a+3b", and "2a+3b", the selection circuit 553 outputs the "1" signal to the control terminal of the switch 554.

According to a third example, the selection circuit 553 operates as follows. When the temporary decision result signal corresponds to one of the values "0", "a", "2a", "3b", "a+3b", and "2a+3b" which are significantly remote from the zero level, the selection circuit 553 outputs the "0" signal to the control terminal of the switch 554. On the other hand, when the temporary decision result signal corresponds to none of the values "0", "a", "2a", "3b", "a+3b", and "2a+3b", the selection circuit 553 outputs the "1" signal to the control terminal of the switch 554.

A first input side 554a of the switch 554 receives the error signal from the D flip-flop 53 (see FIG. 5) within the temporary decision circuit 24 via a terminal 551. The "0" generator 555 continuously outputs a "0" signal to a second input side 554b of the switch 554. The switch 554 selects one from the error signal and the "0" signal in response to the output signal of the selection circuit 553, and passes the selected signal to the inverter 25 via a terminal 556 as a final error signal. Specifically, the switch 554 selects the error signal when the output signal of the selection circuit 553 is "1". The switch 554 selects the "0" signal from the "0" generator 555 when the output signal of the selection circuit 553 is "0".

Figure 24:
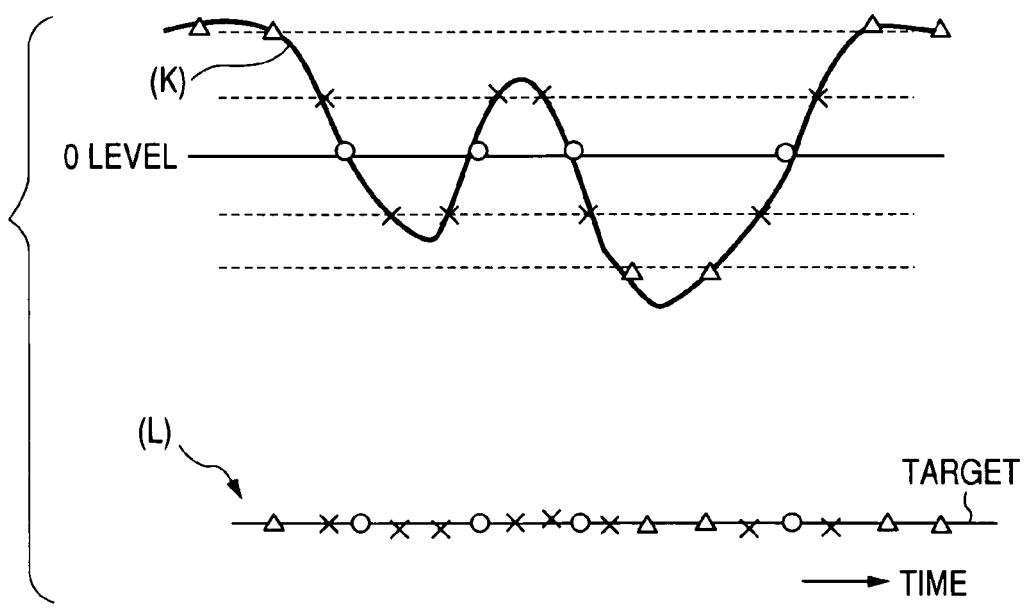
FIG. 24 is a time-domain diagram of a first example of an equalization-resultant waveform and an error signal.

FIG. 24 shows an example (K) of the waveform represented by RLL signal samples resulting from correct PR(1, 2, 2, 2, 1) equalization performed by the adaptive equalization circuit 20 (see FIGS. 1 and 3) which does not have the error selection circuit 55. Regarding the equalization-resultant waveform (K), sample points corresponding to a target value equal to "0" are denoted by the circles. Sample points corresponding to smaller-degree non-zero target values are denoted by the crosses. Sample points corresponding to greater-degree non-zero target values are denoted by the triangles. FIG. 24 also shows an error signal (L) generated in correspondence with the equalization-resultant waveform (K). The error signal (L) only slightly deviates from a target.

Figure 25:
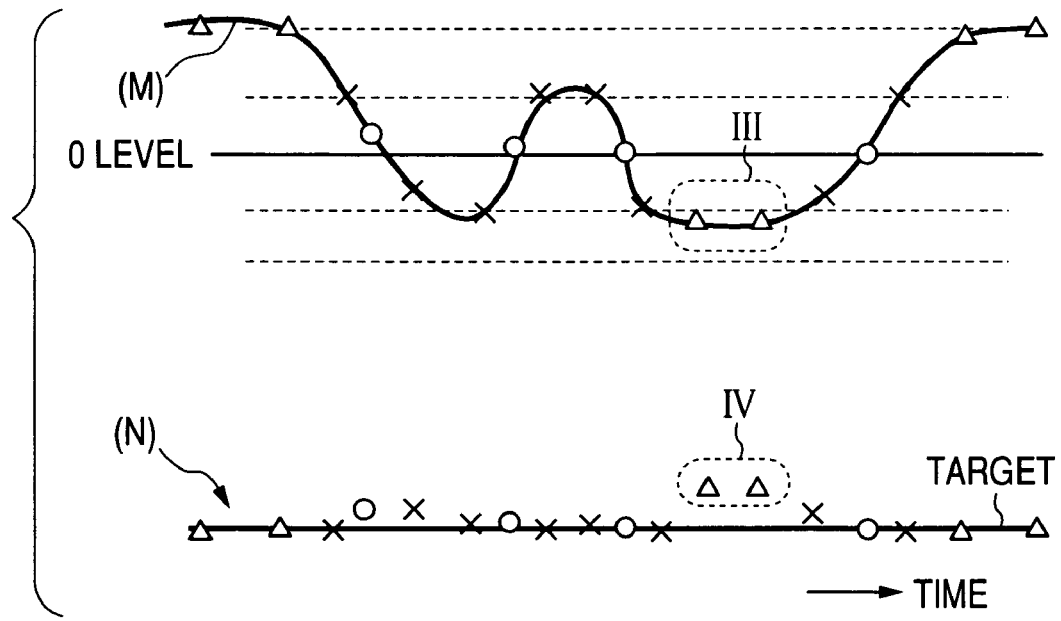
FIG. 25 is a time-domain diagram of a second example of an equalization-resultant waveform and an error signal.

FIG. 25 shows an example (M) of the waveform represented by RLL signal samples resulting from PR(1, 2, 2, 2, 1) equalization performed by the adaptive equalization circuit 20 (see FIGS. 1 and 3) which does not have the error selection circuit 55. The equalization-resultant waveform (M) is similar to the equalization-resultant waveform (K) in FIG. 24 except a time range III where waveform values (sample values) are relatively remote from zero-cross points. Regarding the equalization-resultant waveform (M), sample points corresponding to a target value equal to "0" are denoted by the circles. Sample points corresponding to smaller-degree non-zero target values are denoted by the crosses. Sample points corresponding to greater-degree non-zero target values are denoted by the triangles. The equalization-resultant waveform (M) has a distortion in the time range III where sample points significantly deviate from a target value. FIG. 25 also shows an error signal (N) generated in correspondence with the equalization-resultant waveform (M). In a time range IV corresponding to the time range III, the error signal (N) significantly deviates from a target.

The error selection circuit 55 in FIGS. 22 and 23 corrects such an unreliable error signal into a reliable error signal (a final error signal). When the temporary decision result signal corresponds to none of the values significantly remote from the zero level, the selection circuit 553 within the error selection circuit 55 outputs the "1" signal to the control terminal of the switch 554 so that the switch 554 selects the error signal from the temporary decision circuit 24. Thus, in this case, the error signal from the temporary decision circuit 24 is used as the final error signal. On the other hand, when the temporary decision result signal corresponds to one of the values significantly remote from the zero level, the selection circuit 553 outputs the "0" signal to the control terminal of the switch 554 so that the switch 554 selects the "0" signal from the "0" generator 555. Thus, in this case, the error signal from the temporary decision circuit 24 is not used while the final error signal is fixed to "0".

Figure 26:
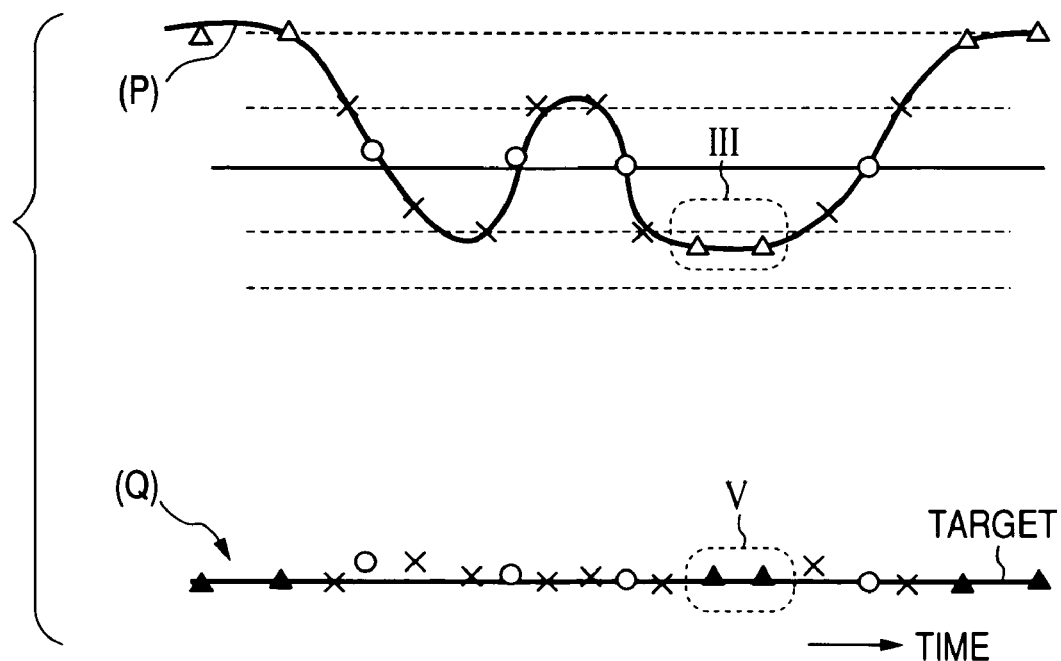
FIG. 26 is a time-domain diagram of a third example of an equalization-resultant waveform and an error signal.

FIG. 26 shows an example (P) of the waveform represented by RLL signal samples resulting from PR(1, 2, 2, 2, 1) equalization performed by the adaptive equalization circuit 20e (see FIG. 22) which has the error selection circuit 55. The equalization-resultant waveform (P) is similar to the equalization-resultant waveform (K) in FIG. 24 except a time range III where waveform values (sample values) are relatively remote from zero-cross points. Regarding the equalization-resultant waveform (P), sample points corresponding to a target value equal to "0" are denoted by the circles. Sample points corresponding to smaller-degree non-zero target values are denoted by the crosses. Sample points corresponding to greater-degree non-zero target values are denoted by the triangles. The equalization-resultant waveform (P) has a distortion in the time range III where sample points significantly deviate from a target value. The error selection circuit 55 compensates for such a signal distortion which occurs in a time range where waveform values (sample values) are relatively remote from zero-cross points. FIG. 26 also shows a final error signal (Q) generated by the error selection circuit 55 in correspondence with the equalization-resultant waveform (P). In a time range V corresponding to the time range III, the error selection circuit 55 prevents significant deviation of the final error signal (Q) from a target.

Preferably, DC signal components deviating from the partial-response target values are integrated for the partial-response target values respectively, and new target values in viterbi decoding at a later stage are generated on the basis of the integration results. Thereby, viterbi decoding can implement more accurate detection.

Sixth Embodiment

Sixth embodiment of this invention is similar to the first embodiment thereof except for the following points. A reproducing apparatus in the sixth embodiment of this invention includes a temporary decision device 51A instead of the temporary decision device 51 (see FIG. 5). The temporary decision device 51A will be explained later.

The sixth embodiment of this invention has an improvement over the first embodiment thereof which relates to the step 62 in FIG. 11. As previously mentioned, the step 62 determines whether or not the first, second, and third ones of the four successive 0-point information values Z are "101". Only in the case of RLL(1, X), there is a chance that the first, second, and third ones of the four successive 0-point information values Z will be "101". This pattern of the 0-point information values Z appears when the values of the samples D2, D3, and D4 are close to the zero level. Mostly, this pattern of the 0-point information values Z occurs upon either a transition from the state S4 to the state S7 or a transition from the state S5 to the state S2 (see FIG. 8).

In the sixth embodiment of this invention, first and second sample-value reference patterns (first and second sample-value target patterns) are prepared to accurately decide the polarity of the present-moment sample D3, that is, accurately decide whether the 101x-pattern of the 0-point information values Z corresponds to a transition from the state S4 to the state S7 or a transition from the state S5 to the state S2.

Figure 27:
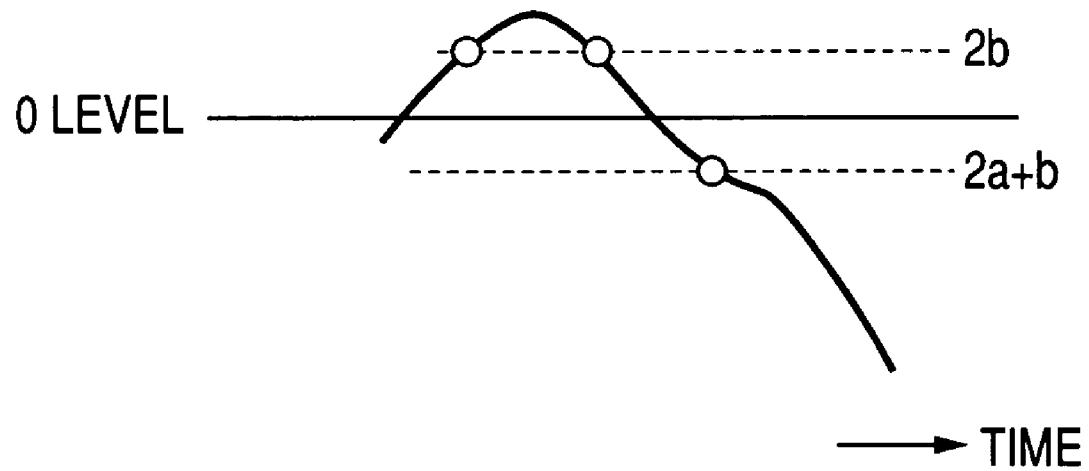
FIG. 27 is a time-domain diagram of a first reference pattern being a sequence of reference sample values.
Figure 28:
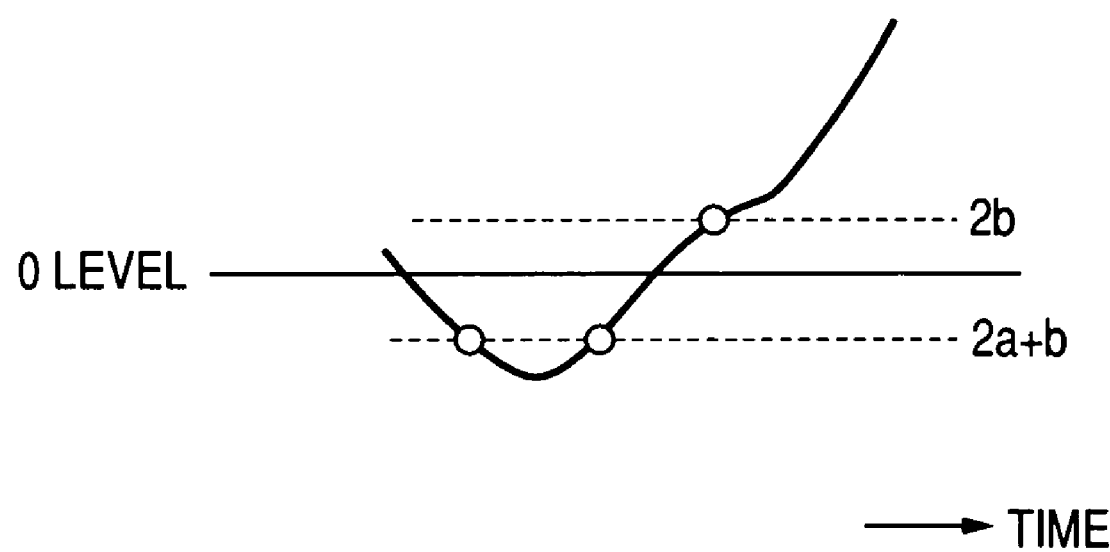
FIG. 28 is a time-domain diagram of a second reference pattern being a sequence of reference sample values.

As shown in FIG. 27, the first reference pattern is a sequence of the reference sample values "2b", "2b", and "2a+b" which corresponds to the state transition S2→S4→S7→S5 and the positive polarity of the present-moment sample D3. As shown in FIG. 28, the second reference pattern is a sequence of the reference sample values "2a+b", "2a+b", and "2b" which corresponds to the state transition S7→S5→S2→S4 and the negative polarity of the present-moment sample D3.

The sum UD1 of the squares of the Euclidian distances between the actual samples D2, D3, and D4 and the reference samples (the values "2b", "2b", and "2a+b") in the first reference pattern is calculated according to the following equation.

$$UD1=\{D2-(2b)\}^2+\{D3-(2b)\}^2+\{D4-(2a+b)\}^2$$

The sum UD2 of the squares of the Euclidian distances between the actual samples D2, D3, and D4 and the reference samples (the values "2a+b", "2a+b", and "2b") in the second reference pattern is calculated according to the following equation.

$$UD2=\{D2-(2a+b)\}^2+\{D3-(2a+b)\}^2+\{D4-(2b)\}^2$$

The calculated Euclidian distance square sums UD1 and UD2 are compared. When the result of the comparison indicates that the Euclidian distance square sum UD1 is equal to or smaller than the Euclidian distance square sum UD2, the temporary decision value Q is set to the value "2b". On the other hand, when the result of the comparison indicates that the Euclidian distance square sum UD1 is greater than the Euclidian distance square sum UD2, the temporary decision value Q is set to the value "2a+b".

It should be noted that other possible state transitions such as S2→S4→S7→S6 and S7→S5→S2→S3 are negligible in the above-mentioned polarity decision using the Euclidian distance square sums UD1 and UD2.

According to the sixth embodiment of this invention, even in the case where the values of the samples D2, D3, and D4 are close to the zero level, the polarity of the present-moment sample D3 can be accurately decided so that the temporary decision value Q can be correctly calculated.

Figure 29:
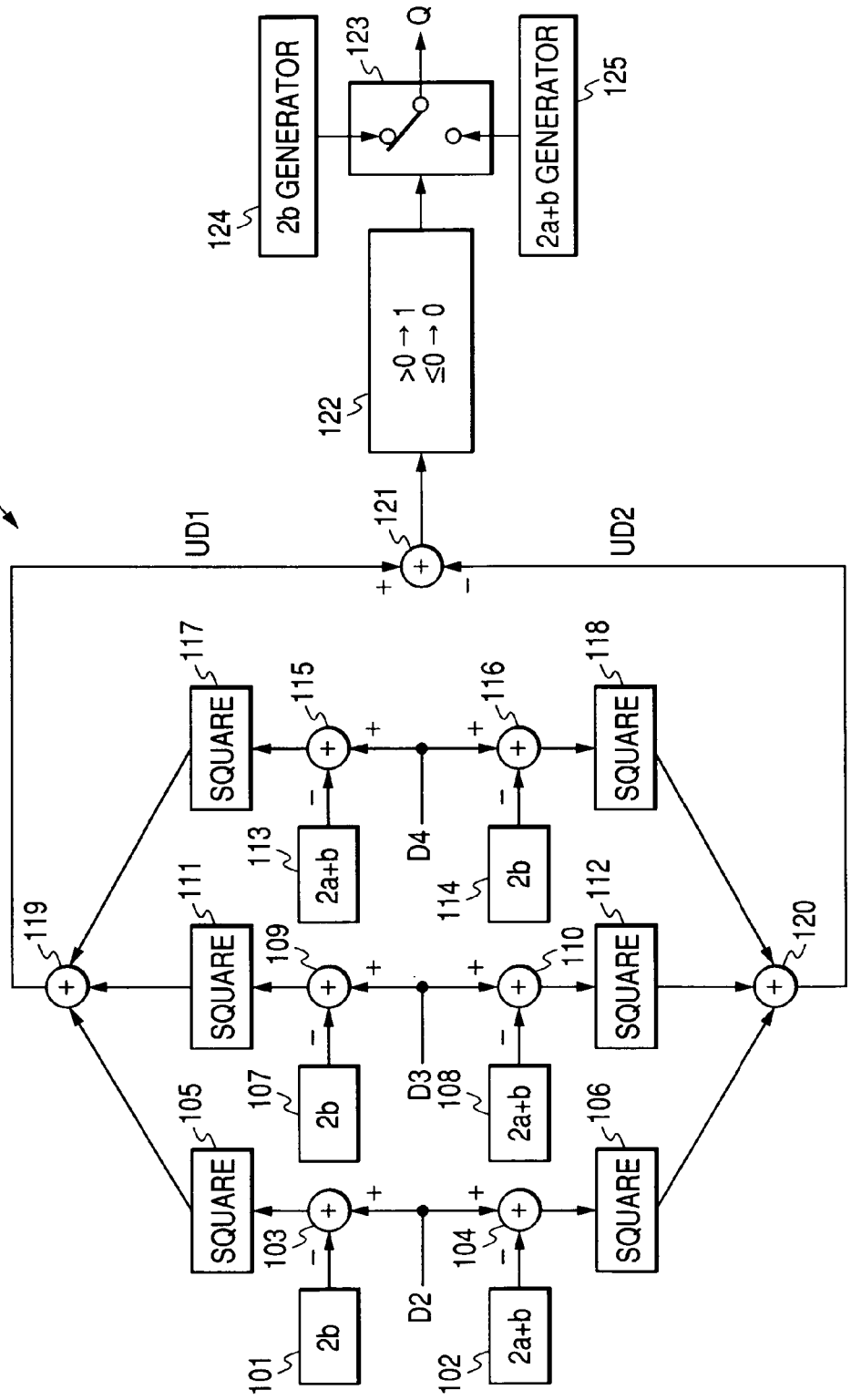
FIG. 29 is a block diagram of a portion of a temporary decision device in a reproducing apparatus according to a sixth embodiment of this invention.

FIG. 29 shows a portion of the temporary decision device 51A which is activated when the successive samples Z2, Z3, and Z4 of the 0-point information are "1", "0", and "1" respectively. As shown in FIG. 29, the temporary decision device 51A includes signal generators 101, 102, 107, 108, 113, 114, 124, and 125, subtracters 103, 104, 109, 110, 115, 116, and 121, calculators 105, 106, 111, 112, 117, and 118, adders 119 and 120, a decision circuit 122, and a switch circuit 123.

The actual signal D2 is applied to the subtracter 103. The signal generator 101 outputs a signal representative of the value "2b" to the subtracter 103. The device 103 subtracts the "2b" signal from the actual signal D2 to get a signal representative of "D2−(2b)". The subtracter 103 outputs the "D2−(2b)" signal to the calculator 105. The calculator 105 computes the square of "D2−(2b)" to get a signal representative of the Euclidean distance square "$\{D2-(2b)\}^2$" equal to the first part of the Euclidian distance square sum UD1.

The actual signal D3 is applied to the subtracter 109. The signal generator 107 outputs a signal representative of the value "2b" to the subtracter 109. The device 109 subtracts the "2b" signal from the actual signal D3 to get a signal representative of "D3−(2b)". The subtracter 109 outputs the "D3−(2b)" signal to the calculator 111. The calculator 111 computes the square of "D3−(2b)" to get a signal representative of the Euclidean distance square "$\{D3-(2b)\}^2$" equal to the second part of the Euclidian distance square sum UD1.

The actual signal D4 is applied to the subtracter 115. The signal generator 113 outputs a signal representative of the value "2a+b" to the subtracter 115. The device 115 subtracts the "2a+b" signal from the actual signal D4 to get a signal representative of "D4−(2a+b)". The subtracter 115 outputs the "D4−(2a+b)" signal to the calculator 117. The calculator 117 computes the square of "D4−(2a+b)" to get a signal representative of the Euclidean distance square "$\{D4-(2a+b)\}^2$" equal to the third part of the Euclidian distance square sum UD1.

The adder 119 receives the "$\{D2-(2b)\}^2$" signal from the calculator 105 which is equal to the first part of the Euclidean distance square sum UD1. The adder 119 receives the "$\{D3-(2b)\}^2$" signal from the calculator 111 which is equal to the second part of the Euclidean distance square sum UD1. The adder 119 receives the "$\{D4-(2a+b)\}^2$" signal from the calculator 117 which is equal to the third part of the Euclidean distance square sum UD1. The device 119 adds the "$\{D2-(2b)\}^2$" signal, the "$\{D3-(2b)\}^2$" signal, and the "$\{D4-(2a+b)\}^2$" signal to get a signal representative of the Euclidean distance square sum UD1.

The actual signal D2 is applied to the subtracter 104. The signal generator 102 outputs a signal representative of the value "2a+b" to the subtracter 104. The device 104 subtracts the "2a+b" signal from the actual signal D2 to get a signal representative of "D2−(2a+b)". The subtracter 104 outputs the "D2−(2a+b)" signal to the calculator 106. The calculator 106 computes the square of "D2−(2a+b)" to get a signal representative of the Euclidean distance square "$\{D2-(2a+b)\}^2$" equal to the first part of the Euclidian distance square sum UD2.

The actual signal D3 is applied to the subtracter 110. The signal generator 108 outputs a signal representative of the value "2a+b" to the subtracter 110. The device 110 subtracts the "2a+b" signal from the actual signal D3 to get a signal representative of "D3−(2a+b)". The subtracter 110 outputs the "D3−(2a+b)" signal to the calculator 112. The calculator 112 computes the square of "D3−(2a+b)" to get a signal representative of the Euclidean distance square "$\{D3-(2a+b)\}^2$" equal to the second part of the Euclidian distance square sum UD2.

The actual signal D4 is applied to the subtracter 116. The signal generator 114 outputs a signal representative of the value "2b" to the subtracter 116. The device 116 subtracts the "2b" signal from the actual signal D4 to get a signal representative of "D4−(2b)". The subtracter 116 outputs the "D4÷(2b)" signal to the calculator 118. The calculator 118 computes the square of "D4−(2b)" to get a signal representative of the Euclidean distance square "$\{D4-(2b)\}^2$" equal to the third part of the Euclidian distance square sum UD2.

The adder 120 receives the "$\{D2-(2a+b)\}^2$" signal from the calculator 106 which is equal to the first part of the Euclidean distance square sum UD2. The adder 120 receives the "$\{D3-(2a+b)\}^2$" signal from the calculator 112 which is equal to the second part of the Euclidean distance square sum UD2. The adder 120 receives the "$\{D4-(2b)\}^2$" signal from the calculator 118 which is equal to the third part of the Euclidean distance square sum UD2. The device 120 adds the "$\{D2-(2a+b)\}^2$" signal, the "$\{D3-(2a+b)\}^2$" signal, and the "$\{D4-(2b)\}^2$" signal to get a signal representative of the Euclidean distance square sum UD2.

The subtracter 121 receives the UD1 signal from the adder 119. The subtracter 121 receives the UD2 signal from the adder 120. The device 121 subtracts the Euclidean distance square sum UD2 from the Euclidean distance square sum UD1 to get a subtraction result "UD1−UD2". The subtracter 121 informs the decision circuit 122 of the subtraction result "UD1−UD2". The decision circuit 122 compares the subtraction result "UD1−UD2" with "0" to determine whether or not the subtraction result "UD1−UD2" is positive. When the subtraction result "UD1−UD2" is positive, that is, when UD1>UD2, the decision circuit 122 outputs a signal of "1" to the switch circuit 123. On the other hand, when the subtraction result "UD1−UD2" is not positive, that is, when UD1≦UD2, the decision circuit 122 outputs a signal of "0" to the switch circuit 123.

The signal generator 124 outputs a signal representative of the value "2b" to the switch circuit 123. The signal generator 125 outputs a signal representative of the value "2a+b" to the switch circuit 123. The switch circuit 123 responds to the output signal of the decision circuit 122. When the output signal of the decision circuit 122 is "1", that is, when UD1>UD2, the switch circuit 123 selects the "2a+b" signal and passes it as an indication of the temporary decision value Q. Thus, in this case, the temporary decision value Q is set to the value "2a+b". When the output signal of the decision circuit 122 is "0", that is, when UD1≦UD2, the switch circuit 123 selects the "2b" signal and passes it as an indication of the temporary decision value Q. Thus, in this case, the temporary decision value Q is set to the value "2b".

Seventh Embodiment

Figure 30:
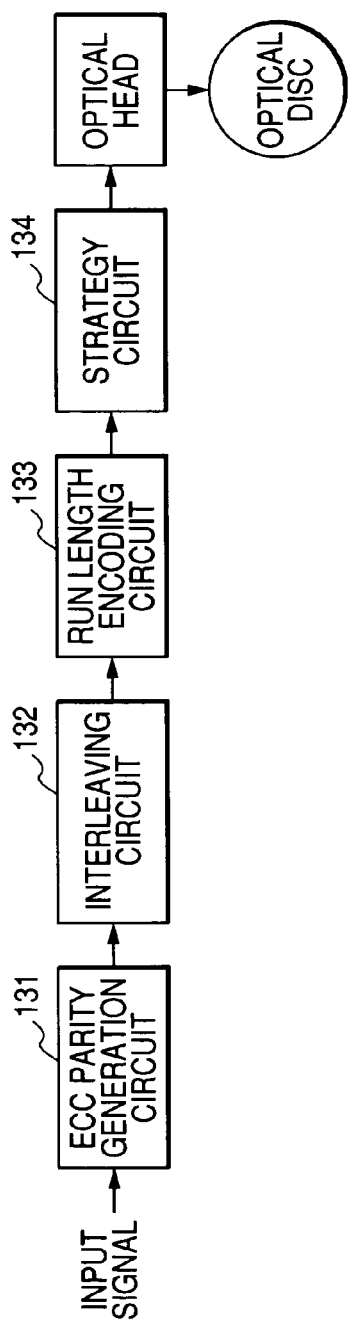
FIG. 30 is a block diagram of the recording side of a recording and reproducing apparatus according to a seventh embodiment of this invention.

A recording and reproducing apparatus in a seventh embodiment of this invention is provided with measures against signal errors caused by bit slips. FIG. 30 shows the recording side of the apparatus in the seventh embodiment of this invention.

As shown in FIG. 30, the recording side of the apparatus includes an ECC parity generation circuit 131, an interleaving circuit 132, a run length encoding circuit 133, and a strategy circuit 134 which are sequentially connected in that order. The strategy circuit 134 is followed by an optical head which can act on an optical disc.

Digital information to be recorded is fed to the ECC parity generation circuit 131. The ECC parity generation circuit 131 produces parity signals in response to the digital information. The parity signals include, for example, turbo code signals or LDPC (low-density parity-check code) signals. The ECC parity generation circuit 131 adds the parity signals to the digital information to get parity-added digital information. The ECC parity generation circuit 131 outputs the parity-added digital information to the interleaving circuit 132. The interleaving circuit 132 subjects the parity-added digital information to interleaving to get interleaved digital information. The interleaving circuit 132 outputs the interleaved digital information to the run length encoding circuit 133.

The run length encoding circuit 133 implements the run length encoding of the interleaved digital information. Specifically, the run length encoding circuit 133 converts the interleaved digital information into a sequence of words of a run length limited code through given modulation such as 1-7 pp modulation or 8-15 modulation. The sequence of words of the run length limited code is under DSV (digital sum variation) control. The run length encoding circuit 133 outputs the sequence of words of the run length limited code to the strategy circuit 134. The strategy circuit 134 converts the sequence of words of the run length limited code into a high-frequency pulse train for modulation of a laser beam. The strategy circuit 134 feeds the high-frequency pulse train to the optical head. The optical head applies the laser beam to the optical disc and modulates the laser beam in accordance with the high-frequency pulse train, thereby recording the sequence of words of the run length limited code on the optical disc. As a result, the digital information fed to the ECC parity generation circuit 131 is recorded on the optical disc.

Figure 31:
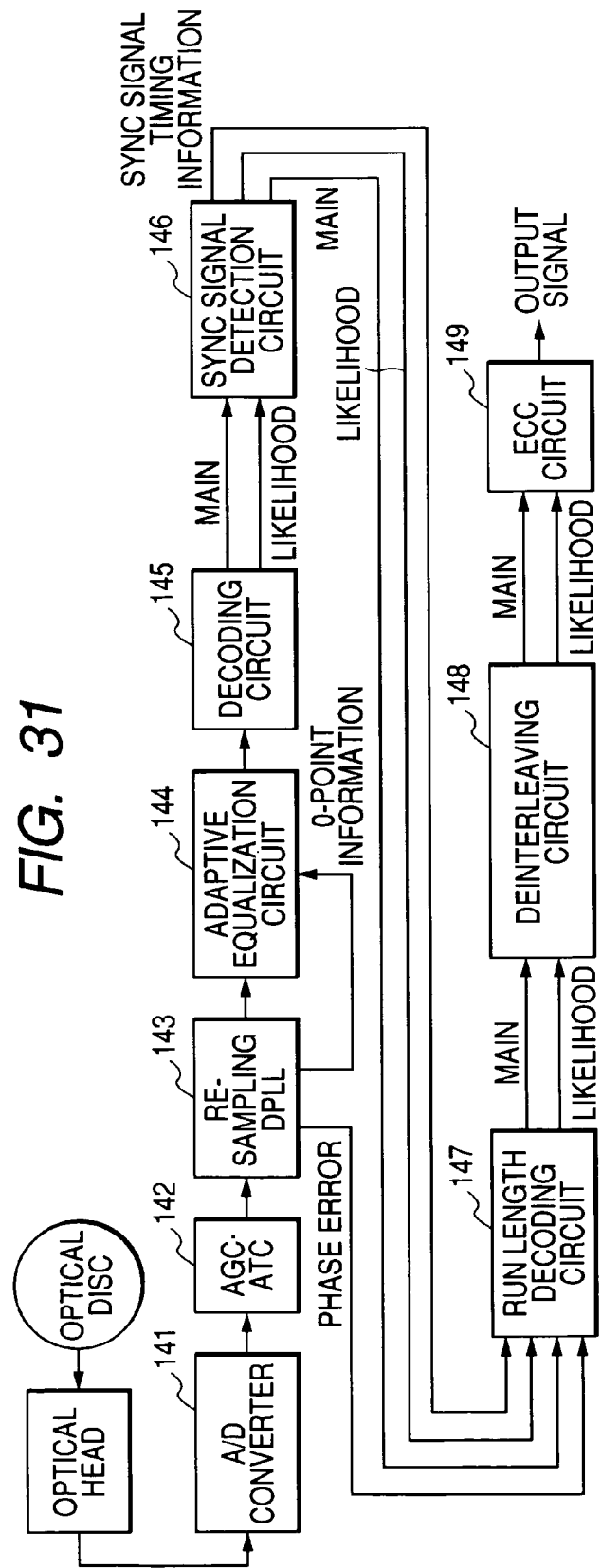
FIG. 31 is a block diagram of the reproducing side of the recording and reproducing apparatus in the seventh embodiment of this invention.

FIG. 31 shows the reproducing side of the apparatus in the seventh embodiment of this invention. As shown in FIG. 31, the reproducing side of the apparatus includes an A/D converter 141, an AGC and ATC circuit 142, a re-sampling DPLL section 143, an adaptive equalization circuit 144, a decoding circuit 145, a sync signal detection circuit 146, a run length decoding circuit 147, a deinterleaving circuit 148, and an ECC circuit 149 which are sequentially connected in that order. The A/D converter 141 follows the optical head which can act on an optical disc.

The optical head reads out a recorded signal from the optical disc. The optical head outputs the read-out signal to the A/D converter 141. The A/D converter 141 changes the output signal of the optical head into a corresponding digital signal. Specifically, the A/D converter 141 periodically samples the output signal of the optical head in response to a fixed-frequency master clock signal (a fixed-frequency system clock signal), and converts every resultant sample into a digital sample. The A/D converter 141 outputs the digital signal to the AGC and ATC circuit 142. The AGC and ATC circuit 142 subjects the output signal of the A/D converter 141 to automatic gain control (AGC) for providing a constant signal amplitude and also automatic threshold control (ATC) including proper direct-current (DC) control of threshold values used for two-value comparison. The AGC and ATC circuit 142 outputs the resultant signal to the re-sampling DPLL section 143.

The re-sampling DPLL section 143 converts the output signal (the first digital signal) of the AGC and ATC circuit 142 into a second digital signal. The re-sampling DPLL section 143 includes a digital PLL (phase locked loop) circuit having a closed loop. The digital PLL circuit re-samples the output signal of the AGC and ATC circuit 142 in response to a bit clock signal to get the second digital signal (the re-sampling resultant signal). A timing related to samples of the output signal of the AGC and ATC circuit 142 is determined by the system clock signal. A timing related to samples of the second digital signal is determined by the bit clock signal. Preferably, samples of the second digital signal have a phase of 0° with respect to the bit clock signal. The re-sampling implemented by the digital PLL circuit includes at least one of interpolation and decimation designed to generate samples of the re-sampling-resultant signal from samples of the output signal of the AGC and ATC circuit 142. The re-sampling DPLL section 143 outputs the second digital signal (the re-sampling-resultant signal) to a transversal filter within the adaptive equalization circuit 144. The second digital signal is also referred to as the main digital signal or the main output signal of the re-sampling DPLL section 143.

The re-sampling DPLL section 143 includes an interpolator which estimates every sample at a given phase point (for example, a phase point of 0°) with respect to the bit clock signal from the output signal of the AGC and ATC circuit 142. Thus, the interpolator generates a sequence of given-phase-point data samples. The interpolator outputs the sequence of given-phase-point data samples to the transversal filter within the adaptive equalization circuit 144 as the main digital signal (the second digital signal or the re-sampling-resultant signal). The re-sampling DPLL section 143 also includes a zero-cross detector for sensing every point (every zero-cross point) at which the sequence of given-phase-point data samples crosses a zero level (a 0 level). The zero-cross detector generates 0-point information which represents every sensed zero-cross point in the bit clock unit. Specifically, the zero-cross detector decides whether or not every phase-point data sample corresponds to a zero-cross point. The zero-cross detector generates 0-point information in response to the result of the decision. Furthermore, the zero-cross detector generates a phase error in response to every sensed zero-cross point. In the re-sampling DPLL section 143, the timing of the re-sampling or the frequency and phase of the re-sampling are locked in response to the levels represented by zero-cross-point-corresponding samples of the second digital signal so that the phase error will be equal to "0". The re-sampling DPLL section 143 outputs the 0-point information to the adaptive equalization circuit 20 as a first sub output signal. The re-sampling DPLL section 143 outputs a signal representative of the phase error to the run length decoding circuit 147 as a second sub output signal.

Figure 32:
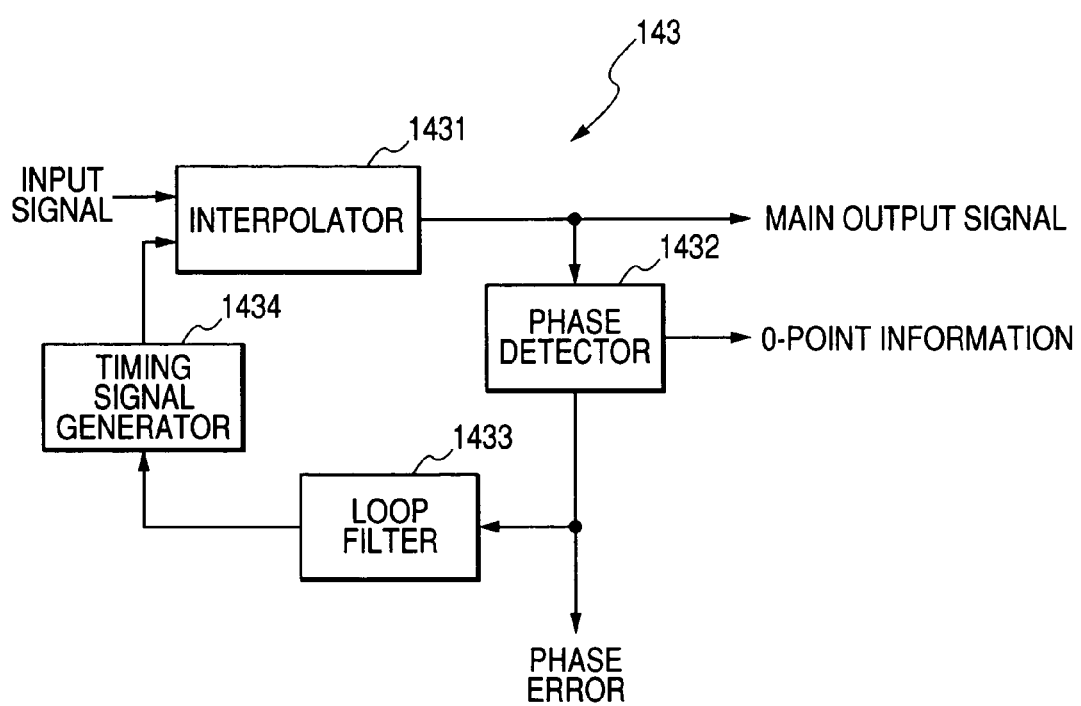
FIG. 32 is a block diagram of a re-sampling DPLL section in FIG. 31.

As shown in FIG. 32, the re-sampling DPLL section 143 includes an interpolator 1431, a phase detector 1432, a loop filter 1433, and a timing signal generator 1434 which are connected in a closed loop in that order. The interpolator 1431 receives the output signal of the AGC and ATC circuit 142. The interpolator 1431 receives data point phase information and the bit clock signal from the timing signal generator 1434. The interpolator 1431 estimates given-phase-point data samples from samples of the output signal of the AGC and ATC circuit 142 through interpolation responsive to the data point phase information and the bit cock signal. Here, "phase" is defined relative to the bit clock signal. The interpolator 1431 outputs the estimated given-phase-point data samples to the transversal filter within the adaptive equalization circuit 144 as the main digital signal (the second digital signal or the re-sampling-resultant signal). The interpolator 1431 also outputs the estimated given-phase-point data samples to the phase detector 1432.

In the re-sampling DPLL section 143, the phase detector 1432 senses zero-cross points from the given-phase-point data samples. Furthermore, the phase detector 1432 detects a phase error in response to a data value of the re-sampling resultant signal which occurs at each of the sensed zero-cross points. In addition, the phase detector 1432 generates 0-point information representing the sensed zero-cross points. The phase detector 1432 outputs the 0-point information (the first sub output signal) to the adaptive equalization circuit 144. The phase detector 1432 generates a signal representing the phase error. The phase detector 1432 outputs the phase error signal (the second sub output signal) to the run length decoding circuit 147. The phase detector 1432 outputs the phase error signal also to the loop filter 1433. The loop filter 1433 integrates the phase error signal. The loop filter 1433 outputs the integration-resultant signal to the timing signal generator 1434. The timing signal generator 1434 produces the data point phase information and the bit clock signal in response to the output signal of the loop filter 1433. The timing signal generator 1434 feeds the data point phase information and the bit clock signal to the interpolator 1431.

With reference back to FIG. 31, the adaptive equalization circuit 144 subjects the main output signal of the re-sampling DPLL section 143 (that is, the second digital signal outputted from the re-sampling DPLL section 143) to automatic waveform equalization in response to the 0-point information fed from the re-sampling DPLL section 143. The automatic waveform equalization corresponds to a process of providing the signal in question with a partial-response (PR) characteristic. The adaptive equalization circuit 144 outputs the equalization-resultant signal to the decoding circuit 145. The adaptive equalization circuit 144 may be similar to the adaptive equalization circuit 20 in FIGS. 1 and 3. The decoding circuit 145 subjects the equalization-resultant signal to viterbi decoding (maximum likelihood decoding) which includes SOVA decoding, MAP decoding, or APP decoding. The decoding circuit 145 outputs the decoding-resultant signal to the sync signal detection circuit 146 as a main signal being a reproduced signal of recorded digital information. The decoding circuit 145 generates likelihood information about the decoding-resultant signal (the main signal). The decoding circuit 145 outputs the likelihood information to the sync signal detection circuit 146 as a sub signal.

The decoding circuit 145 includes a memory loaded with a plurality of candidate recovered data pieces. Also, the decoding circuit 145 includes a section for calculating branch metric values from samples of the output signal of the adaptive equalization circuit 144. Furthermore, the decoding circuit 145 includes a section for accumulating the branch metric values into path metric values respectively. The path metric values relate to the candidate recovered data pieces, respectively. In addition, the decoding circuit 145 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory to the sync signal detection circuit 146 as the main signal (the decoding-resultant signal). The minimum path metric value is used to generate the likelihood information about the decoding-resultant signal. The likelihood information is outputted to the sync signal detection circuit 146 as the sub signal.

Preferably, the viterbi decoding includes a soft decision, and the decoding-resultant signal is outputted from the decoding circuit 145 together with the likelihood information. The viterbi decoding may include a hard decision producing a 2-value (binary) decoding-resultant signal.

The sync signal detection circuit 146 detects every sync signal in the main signal from the decoding circuit 145. The sync signal detection circuit 146 generates sync-signal-related timing information in response to every detected sync signal. Thus, the sync-signal-related timing information represents every detected sync signal. The sync signal detection circuit 146 outputs the sync-signal-related timing information to the run length decoding circuit 147. In addition, the sync signal detection circuit 146 passes the main signal and the sub signal (the likelihood information) from the decoding circuit 145 to the run length decoding circuit 147.

Figure 33:
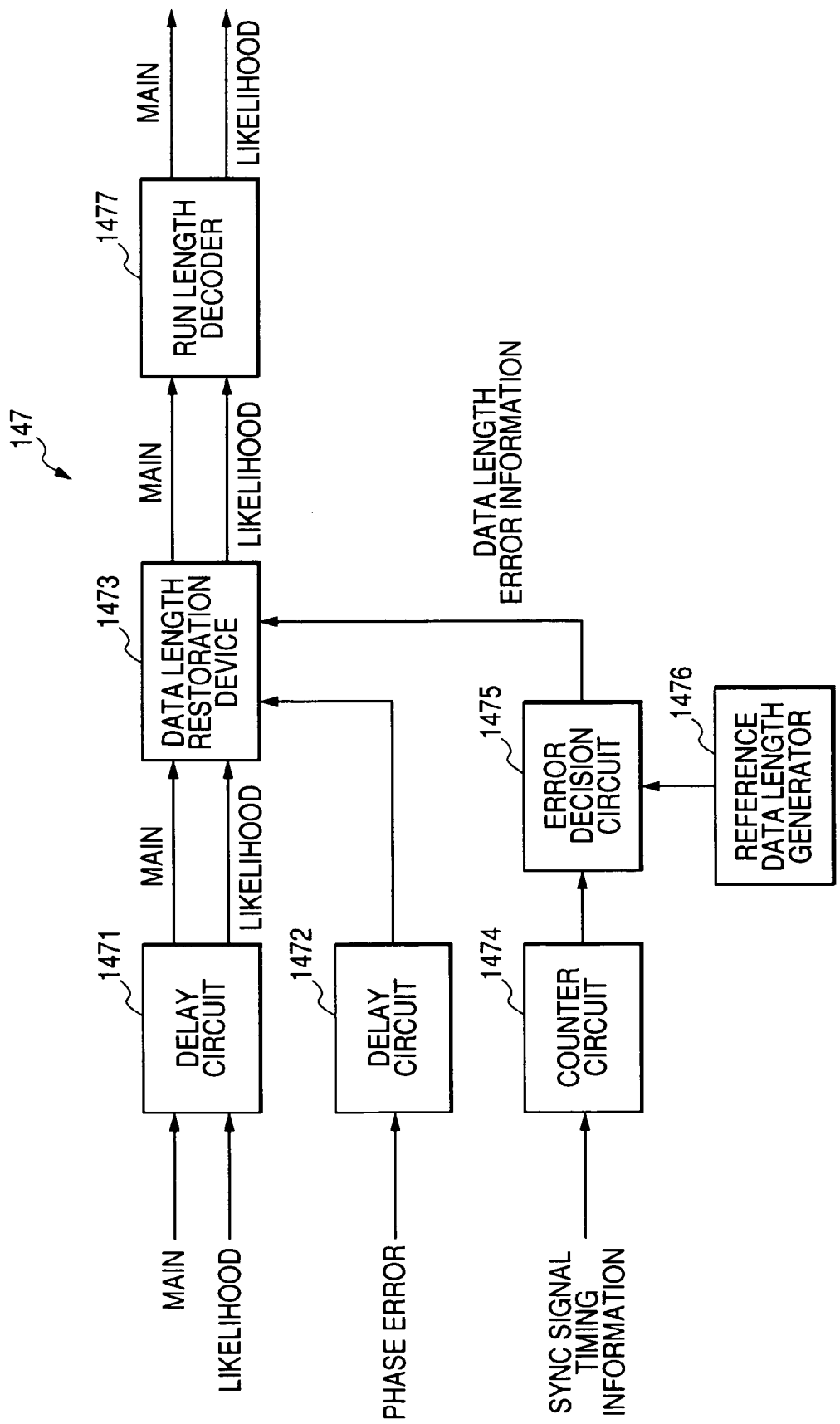
FIG. 33 is a block diagram of a run length decoding circuit in FIG. 31.

As shown in FIG. 33, the run length decoding circuit 147 includes delay circuits 1471 and 1472, a data length restoration device 1473, a counter circuit 1474, an error decision circuit 1475, a reference data length generator 1476, and a run length decoder 1477.

The main signal and the likelihood information (the sub signal) from the sync signal detection circuit 146 are deferred by the delay circuit 1471 before being fed to the data length restoration device 1473. The phase error signal from the re-sampling DPLL section 143 is deferred by the delay circuit 1472 before being fed to the data length restoration device 1473. The counter circuit 1474 receives the sync-signal-related timing information from the sync signal detection circuit 146. The counter circuit 1474 measures the time interval between two adjacent sync signals represented by the sync-signal-related timing information. Specifically, the counter circuit 1474 counts fixed-frequency clock pulses during the time interval between two adjacent sync signals. The counter circuit 1474 notifies the error decision circuit 1475 of the count result, that is, the measured time interval between two adjacent sync signals.

The reference data length generator 1476 outputs a signal representative of a predetermined reference data length to the error decision circuit 1475. The error decision circuit 1475 compares the reference data length and the count result (the measured time interval between two adjacent sync signals) to determine whether or not they are equal. The error decision circuit 1475 generates data length error information representing whether or not the reference data length and the count result are equal. The data length of the main signal and the likelihood information is normal when the reference data length and the count result are equal. The data length of the main signal and the likelihood information is abnormal when the reference data length and the count result are not equal. The error decision circuit 1475 feeds the data length error information to the data length restoration device 1473.

The data length restoration device 1473 responds to the phase error signal from the delay circuit 1472. Specifically, the data length restoration device 1473 detects when the absolute value of the phase error exceeds a prescribed threshold value. Furthermore, the data length restoration device 1473 detects when the absolute value of the phase error is maximized or when the phase error is maximized. The data length restoration device 1473 generates slip point information representing a time position at which the absolute value of the phase error exceeds the prescribed threshold value or the phase error (the absolute value of the phase error) is maximized. In the case where the data length error information represents that the reference data length and the count result are not equal, at a time position represented by the slip point information, the data length restoration device 1473 subjects the main signal and the likelihood information to data length adjustment to restore the normal data length of the main signal and the likelihood information. The data length restoration device 1473 feeds the resultant main signal and the resultant likelihood information to the run length decoder 1477. The data length adjustment by the data length restoration device 1473 includes interpolation or decimation.

The run length decoder 1477 subjects the main signal and the likelihood information to run length decoding and likelihood conversion to get the decoding-resultant main signal and the conversion-resultant likelihood information. The run length decoder 1477 outputs the decoding-resultant main signal and the conversion-resultant likelihood information to the deinterleaving circuit 148. The signal processing by the run length decoder 1477 includes not only RLL decoding but also LLR (likelihood ratio of a posteriori probability) conversion. Thus, an LLR corresponding to each channel bit is inputted while an LLR corresponding to each decoding-resultant data bit is outputted.

In the case where the run length encoding circuit 133 in the recording side of the apparatus (see FIG. 30) implements 1-7 pp modulation for the run length encoding of the interleaved digital information, the run length decoder 1477 is designed to operate as mentioned hereafter. The 1-7 pp modulation includes encoding conversion from 2 bits to 3 bits. In this case, the run length decoder 1477 serves to decode 3 input bits into 2 data bits for the main signal. Furthermore, the run length decoder 1477 performs the following operation steps.

For the decoding of 3 input bits of interest into 2 data bits, the run length decoder 1477 refers to not only the 3 input bits of interest but also 3 input bits preceding the 3 input bits of interest and 3 input bits following the 3 input bits of interest. The 3 bits of interest, the 3 input bits preceding the 3 input bits of interest, and the 3 input bits following the 3 input bits of interest constitute a 9-bit sliding window. These 9 input bits are denoted by {C0, C1, C2, C3, C4, C5, C6, C7, C8} where C3, C4, and C5 indicate the 3 input bits of interest.

The run length decoder 1477 includes a memory loaded with information representing first, second, third, and fourth decoding tables shown in FIG. 34. The first, second, third, and fourth decoding tables indicate the assignment of states of the 9 input bits {C0, C1, C2, C3, C4, C5, C6, C7, C8} to states of 2 decoding-resultant data bits (dk, dk+1). Specifically, each of the first, second, third, and fourth decoding tables contains 20 different patterns (states) of the 9 input bits {C0, C1, C2, C3, C4, C5, C6, C7, C8}. The first decoding table is assigned to 2 decoding-resultant data bits (dk, dk+1) of "00". In other words, all the patterns in the first decoding table are assigned to 2 decoding-resultant data bits (dk, dk+1) of "00". The second decoding table is assigned to 2 decoding-resultant data bits (dk, dk+1) of "01". In other words, all the patterns in the second decoding table are assigned to 2 decoding-resultant data bits (dk, dk+1) of "01". The third decoding table is assigned to 2 decoding-resultant data bits (dk, dk+1) of "10". In other words, all the patterns in the third decoding table are assigned to 2 decoding-resultant data bits (dk, dk+1) of "10". The fourth decoding table is assigned to 2 decoding-resultant data bits (dk, dk+1) of "11". In other words, all the patterns in the fourth decoding table are assigned to 2 decoding-resultant data bits (dk, dk+1) of "11". The run length decoder 1477 executes the decoding of the 3 input bits of interest into 2 decoding-resultant data bits by using the first, second, third, and fourth decoding tables. In more detail, the run length decoder 1477 finds one of the patterns in the decoding tables which is the same as the current pattern of the 9 input bits {C0, C1, C2, C3, C4, C5, C6, C7, C8} including the 3 input bits of interest. Then, the run length decoder 1477 refers to the decoding tables and detects the state of 2 decoding-resultant data bits (dk, dk+1) to which the found pattern is assigned. Subsequently, the run length decoder 1477 outputs 2 decoding-resultant data bits (dk, dk+1) in the detected state as a decoding result corresponding to the 3 input bits of interest.

It should be noted that prescribed ones selected from the patterns in the decoding tables may be shortened to 7 bits denoted by {C1, C2, C3, C4, C5, C6, C7}, that is, 3 bits of interest, 2 bits preceding the 3 bits of interest, and 2 bits following the 3 bits of interest.

The run length decoder 1477 calculates the LLR of the decoding-resultant data bit "dk" and the LLR of the decoding-resultant data bit "dk+1" according to the following equations.

$$L^{RLL}(dk) = \log \frac{\sum_{j \in S1(k)} \exp\left[\sum_{m=0}^{8} 0.5 L_m^{chan}(2C_m^j - 1)\right]}{\sum_{j \in S0(k)} \exp\left[\sum_{m=0}^{8} 0.5 L_m^{chan}(2C_m^j - 1)\right]}$$

-continued $$L^{RLL}(dk+1) = \log \frac{\sum_{j \in S1(k+1)} \exp\left[\sum_{m=0}^{8} 0.5 L_m^{chan}(2C_m^j - 1)\right]}{\sum_{j \in S0(k+1)} \exp\left[\sum_{m=0}^{8} 0.5 L_m^{chan}(2C_m^j - 1)\right]}$$

where:

$j \in S1(k)$: {C0, C1, C2, C3, C4, C5, C6, C7, C8} corresponding to dk(j)=1;

$j \in S0(k)$: {C0, C1, C2, C3, C4, C5, C6, C7, C8} corresponding to dk(j)=0;

$L^{chan}$: LLR corresponding to a channel bit; and $L^{RLL}$: LLR corresponding to a decoding-resultant data bit.

The run length decoder 1477 generates the conversion-resultant likelihood information in accordance with the calculated LLR of the decoding-resultant data bit "dk" and the calculated LLR of the decoding-resultant data bit "dk+1".

In the case where the run length encoding circuit 133 in the recording side of the apparatus (see FIG. 30) implements 8-15 modulation for the run length encoding of the interleaved digital information, the run length decoder 1477 is designed to operate as mentioned hereafter. The 8-15 modulation includes encoding conversion from 8 bits to 15 bits. In this case, the run length decoder 1477 serves to decode 15 input bits into 8 data bits for the main signal. Furthermore, the run length decoder 1477 performs the following operation steps.

For the decoding of 15 input bits of interest into 8 data bits, the run length decoder 1477 refers to not only the 15 input bits of interest but also 15 input bits preceding the 15 input bits of interest and 15 input bits following the 15 input bits of interest. The 15 bits of interest, the 15 input bits preceding the 15 input bits of interest, and the 15 input bits following the 15 input bits of interest constitute a 45-bit sliding window. These 45 input bits are denoted by {C0, C1, C2, . . . , C44} where C15, C16, . . . , and C29 indicate the 15 input bits of interest.

The run length decoder 1477 includes a memory loaded with information representing a plurality of decoding tables shown in FIG. 35. The decoding tables indicate the assignment of states of the 45 input bits {C0, C1, C2, . . . , C44} to states of 8 decoding-resultant data bits (dk, dk+1, dk+2, . . . , dk+7). Specifically, each of the decoding tables contains different patterns (states) of the 45 input bits {C0, C1, C2, . . . , C44}. The decoding tables are assigned to different patterns (states) of 8 decoding-resultant data bits (dk, dk+1, dk+2, . . . , dk+7), respectively. In other words, all the patterns in each of the decoding tables are assigned to a same state of 8 decoding-resultant data bits (dk, dk+1, dk+2, . . . , dk+7). The run length decoder 1477 executes the decoding of the 15 input bits of interest into 8 decoding-resultant data bits by using the decoding tables. In more detail, the run length decoder 1477 finds one of the patterns in the decoding tables which is the same as the current pattern of the 45 input bits {C0, C1, C2, . . . , C44} including the 15 input bits of interest. Then, the run length decoder 1477 refers to the decoding tables and detects the state of 8 decoding-resultant data bits (dk, dk+1, dk+2, . . . , dk+7) to which the found pattern is assigned. Subsequently, the run length decoder 1477 outputs 8 decoding-resultant data bits (dk, dk+1, dk+2, . . . , dk+7) in the detected state as a decoding result corresponding to the 15 input bits of interest.

The run length decoder 1477 calculates the LLR of each of the decoding-resultant data bits "dk", "dk+1", "dk+2", . . . , and "dk+7" according to the following equations.

$$L^{RLL}(dk) = \log \frac{\sum_{j \in S1(k)} \exp\left[\sum_{m=0}^{44} 0.5 L_m^{chan}(2C_m^j - 1)\right]}{\sum_{j \in S0(k)} \exp\left[\sum_{m=0}^{44} 0.5 L_m^{chan}(2C_m^j - 1)\right]}$$

$$L^{RLL}(dk+1) = \log \frac{\sum_{j \in S1(k+1)} \exp\left[\sum_{m=0}^{44} 0.5 L_m^{chan}(2C_m^j - 1)\right]}{\sum_{j \in S0(k+1)} \exp\left[\sum_{m=0}^{44} 0.5 L_m^{chan}(2C_m^j - 1)\right]}$$

subsequent equations similar to the above, where:

$j \in S1(k)$: {C0, C1, C2, C3, . . . , C44} corresponding to dk(j)=1;

$j \in S0(k)$: {C0, C1, C2, C3, . . . , C44} corresponding to dk(j)=0;

$L^{chan}$: LLR corresponding to a channel bit; and $L^{RLL}$: LLR corresponding to a decoding-resultant data bit.

Alternatively, the run length decoder 1477 may calculate the LLR of each of the decoding-resultant data bits "dk", "dk+1", "dk+2", . . . , and "dk+7" according to the following equations.

$$L^{RLL}(dk) = \max_{j \in S1(k)}\left[\sum_{m=0}^{m\max} 0.5 L_m^{chan}(2C_m^j - 1)\right] - \max_{j \in S0(k)}\left[\sum_{m=0}^{m\max} 0.5 L_m^{chan}(2C_m^j - 1)\right]$$

$$L^{RLL}(dk+1) = \max_{j \in S1(k+1)}\left[\sum_{m=0}^{m\max} 0.5 L_m^{chan}(2C_m^j - 1)\right] - \max_{j \in S0(k+1)}\left[\sum_{m=0}^{m\max} 0.5 L_m^{chan}(2C_m^j - 1)\right]$$

subsequent equations similar to the above:

where "mmax" denotes an integer equal to the number of bits in the sliding window minus "1". Generally, mmax=44. It should be noted that only prescribed ones selected from the 15 bits preceding the 15 bits of interest and the 15 bits following the 15 bits of interest may be referred to.

Thus, the LLR of a decoding-resultant data bit is equal to the summation of the LLR's of input bits in patterns causing the decoding-resultant data bit to be "1" minus the summation of the LLR's of input bits in patterns causing the decoding-resultant data bit to be "0".

The run length decoder 1477 generates the conversion-resultant likelihood information in accordance with the calculated LLR's of the decoding-resultant data bits "dk", "dk+1", "dk+2", . . . , and "dk+7".

With reference back to FIG. 31, the deinterleaving circuit 148 receives the decoding-resultant main signal and the decoding-resultant likelihood information from the run length decoder 147. The deinterleaving circuit 148 subjects the decoding-resultant main signal and the decoding-resultant likelihood information to deinterleaving to get a deinterleaved main signal and deinterleaved likelihood information. The deinterleaving circuit 148 feeds the deinterleaved main signal and the deinterleaved likelihood information to the ECC circuit 149. The ECC circuit 149 subjects the deinterleaved main signal to error correction responsive to parity signals contained therein, thereby recovering original digital information. The ECC circuit 149 outputs the recovered digital information.

FIG. 36 shows prior-art conditions where a sync signal SY1 is reproduced and then a bit slip occurs at a time position SL, and bits after the bit slip are out of normal time positions. According to a prior-art technology, all bits between the bit slip and a next sync signal SY2 are out of normal time positions, and constitute an erroneous range ER1.

FIG. 37 shows conditions occurring in the seventh embodiment of this invention. With reference to FIG. 37, a sync signal SY1 is reproduced and then a bit slip occurs at a time position SL. An error occurrence time position is detected and bit time positions after the bit slip are decided while the time position of a next reproduced sync signal SY2 is used as a reference. Accordingly, there occurs an erroneous range ER2 remarkably narrower than the prior-art erroneous range ER1. The narrower erroneous range ER2 increases the performance of error correction by the ECC circuit 149.

Eighth Embodiment

An eighth embodiment of this invention is similar to the seventh embodiment thereof except for design changes mentioned hereafter. FIG. 38 shows the recording side of a recording and reproducing apparatus in the eighth embodiment of this invention.

As shown in FIG. 38, the recording side of the apparatus includes an ECC parity generation circuit 151, a run length encoding circuit 152, an ECC parity generation circuit 153, and a strategy circuit 154 which are sequentially connected in that order. The strategy circuit 154 is followed by an optical head which can act on an optical disc.

Digital information to be recorded is fed to the ECC parity generation circuit 151. The ECC parity generation circuit 151 produces parity signals in response to the digital information. The parity signals include, for example, RS code signals or LDPC signals. The ECC parity generation circuit 151 adds the parity signals to the digital information to get parity-added digital information. The ECC parity generation circuit 151 outputs the parity-added digital information to the run length encoding circuit 152.

The run length encoding circuit 152 implements the run length encoding of the parity-added digital information. Specifically, the run length encoding circuit 152 converts the parity-added digital information into a sequence of words of a run length limited code. The sequence of words of the run length limited code is under DSV control. The run length encoding circuit 152 outputs the sequence of words of the run length limited code to the ECC parity generation circuit 153. The sequence of words of the run length limited code is also referred to as the RLL code word sequence.

The ECC parity generation circuit 153 produces parity signals in response to the RLL code word sequence. The parity signals include, for example, RS code signals or LDPC signals. The ECC parity generation circuit 153 adds the parity signals to the RLL code word sequence to get a parity-added RLL code word sequence. The ECC parity generation circuit 153 outputs the parity-added RLL code word sequence to the strategy circuit 154. The strategy circuit 154 converts the parity-added RLL code word sequence into a high-frequency pulse train for modulation of a laser beam. The strategy circuit 154 feeds the high-frequency pulse train to the optical head. The optical head applies the laser beam to the optical disc and modulates the laser beam in accordance with the high-frequency pulse train, thereby recording the parity-added RLL code word sequence on the optical disc. As a result, the digital information fed to the ECC parity generation circuit 151 is recorded on the optical disc.

FIG. 39 shows the reproducing side of the apparatus in the eighth embodiment of this invention. As shown in FIG. 39, the reproducing side of the apparatus includes a data length restoration circuit 156, an ECC circuit 157, a run length decoding circuit 158, and an ECC circuit 159 which are sequentially connected in that order. The data length restoration circuit 156 follows a sync signal detection circuit 146.

The data length restoration circuit 156 receives, from a re-sampling DPLL section 143, a signal representative of a phase error. The data length restoration circuit 156 receives sync-signal-related timing information, a main signal, and a sub signal (likelihood information) from the sync signal detection circuit 146.

Figure 40:
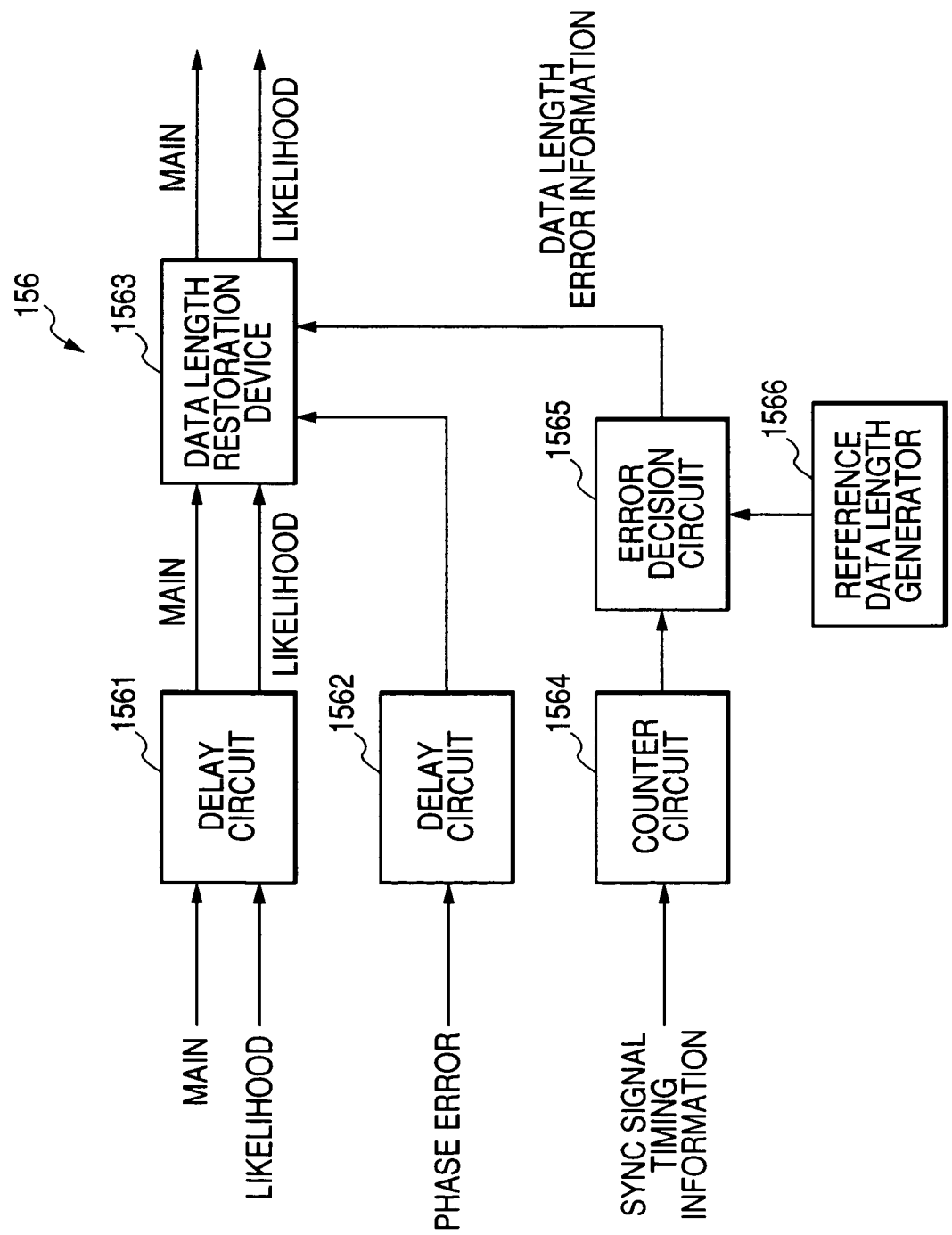
FIG. 40 is a block diagram of a data length restoration circuit in FIG. 39.

As shown in FIG. 40, the data length restoration circuit 156 includes delay circuits 1561 and 1562, a data length restoration device 1563, a counter circuit 1564, an error decision circuit 1565, and a reference data length generator 1566.

The main signal and the likelihood information (the sub signal) from the sync signal detection circuit 146 are deferred by the delay circuit 1561 before being fed to the data length restoration device 1563. The phase error signal from the re-sampling DPLL section 143 is deferred by the delay circuit 1562 before being fed to the data length restoration device 1563. The counter circuit 1564 receives the sync-signal-related timing information from the sync signal detection circuit 146. The counter circuit 1564 measures the time interval between two adjacent sync signals represented by the sync-signal-related timing information. Specifically, the counter circuit 1564 counts fixed-frequency clock pulses during the time interval between two adjacent sync signals. The counter circuit 1564 notifies the error decision circuit 1565 of the count result, that is, the measured time interval between two adjacent sync signals.

The reference data length generator 1566 outputs a signal representative of a predetermined reference data length to the error decision circuit 1565. The error decision circuit 1565 compares the reference data length and the count result (the measured time interval between two adjacent sync signals) to determine whether or not they are equal. The error decision circuit 1565 generates data length error information representing whether or not the reference data length and the count result are equal. The data length of the main signal and the likelihood information is normal when the reference data length and the count result are equal. The data length of the main signal and the likelihood information is abnormal when the reference data length and the count result are not equal. The error decision circuit 1565 feeds the data length error information to the data length restoration device 1563.

The data length restoration device 1563 responds to the phase error signal from the delay circuit 1562. Specifically, the data length restoration device 1563 detects when the absolute value of the phase error exceeds a prescribed threshold value. Furthermore, the data length restoration device 1563 detects when the absolute value of the phase error is maximized or when the phase error is maximized. The data length restoration device 1563 generates slip point information representing a time position at which the absolute value of the phase error exceeds the prescribed threshold value or the phase error (the absolute value of the phase error) is maximized. In the case where the data length error information represents that the reference data length and the count result are not equal, at a time position represented by the slip point information, the data length restoration device 1563 subjects the main signal and the likelihood information to data length adjustment to restore the normal data length of the main signal and the likelihood information. The data length restoration device 1563 feeds the resultant main signal and the resultant likelihood information to the ECC circuit 157. The data length adjustment by the data length restoration device 1563 includes interpolation or decimation.

With reference back to FIG. 39, the ECC circuit 157 subjects the main signal and the likelihood information (the sub signal) to error correction responsive to related parity signals contained therein. As a result, the ECC circuit 157 generates an error-corrected main signal and an error-corrected sub signal (error-corrected likelihood information). The ECC circuit 157 feeds the error-corrected main signal and the error-corrected likelihood information to the run length decoding circuit 158. The ECC circuit 157 mates with the ECC parity generation circuit 153 in the recording side of the apparatus. The run length decoding circuit 158 subjects the error-corrected main signal and the error-corrected likelihood information to run length decoding and likelihood conversion to get the decoding-resultant main signal and the decoding-resultant likelihood information respectively. The run length decoding circuit 158 outputs the decoding-resultant main signal and the decoding-resultant likelihood information to the ECC circuit 159. The ECC circuit 159 subjects the decoding-resultant main signal to error correction responsive to parity signals contained therein, thereby recovering original digital information. The ECC circuit 159 outputs the recovered digital information. The ECC circuit 159 mates with the ECC parity generation circuit 151 in the recording side of the apparatus.

Ninth Embodiment

Figure 41:
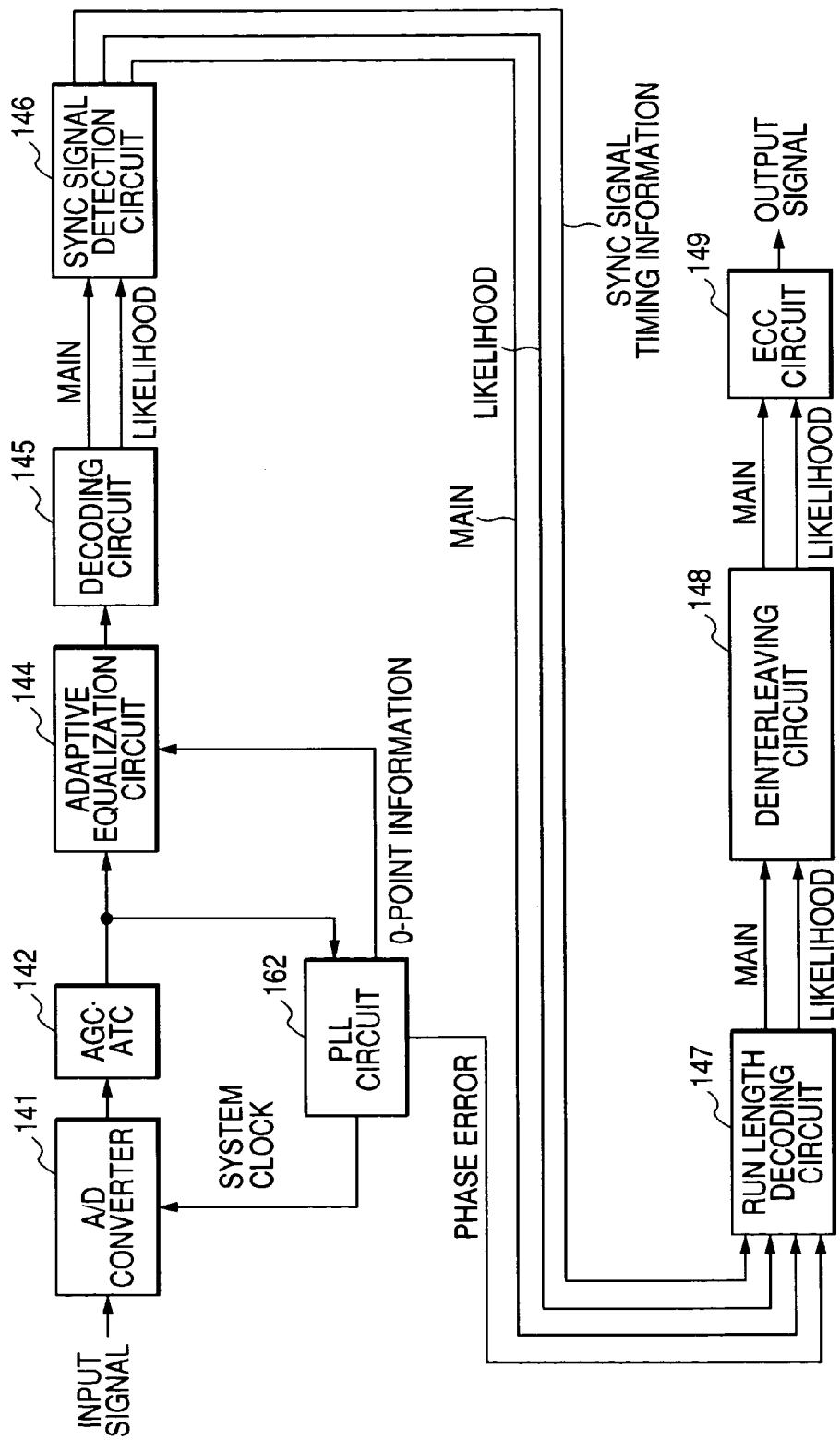
FIG. 41 is a block diagram of the reproducing side of a recording and reproducing apparatus in a ninth embodiment of this invention.

A ninth embodiment of this invention is similar to the seventh embodiment thereof except for design changes mentioned hereafter. FIG. 41 shows the reproducing side of a recording and reproducing apparatus in the ninth embodiment of this invention.

As shown in FIG. 41, the reproducing side of the apparatus includes a PLL circuit 161. The re-sampling DPLL section 143 (see FIG. 31) is omitted from the reproducing side of the apparatus, and the AGC and ATC circuit 142 and the adaptive equalization circuit 144 are directly connected.

The output signal of the AGC and ATC circuit 142 is fed to the adaptive equalization circuit 144 and the PLL circuit 161. The PLL circuit 161 recovers a system clock signal (a sync clock signal) from the output signal of the AGC and ATC circuit 142. The PLL circuit 161 applies the system clock signal to the A/D converter 141. The A/D converter 141 implements signal sampling in response to the system clock signal. The PLL circuit 161 generates 0-point information and a signal representative of a phase error in response to the output signal of the AGC and ATC circuit 142. The PLL circuit 161 feeds the 0-point information to the adaptive equalization circuit 144. The PLL circuit 161 feeds the phase error signal to the run length decoding circuit 147.

Tenth Embodiment

Figure 42:
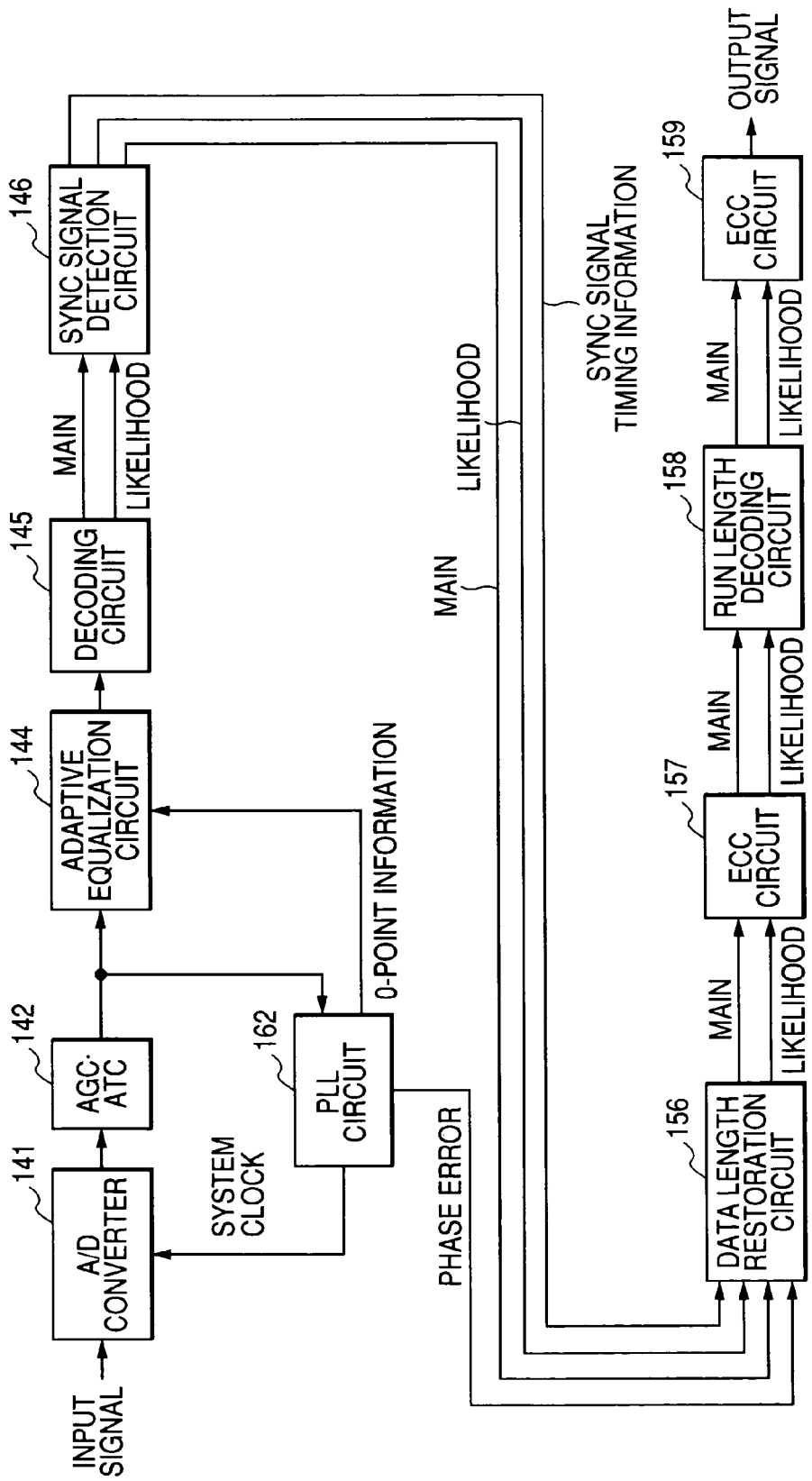
FIG. 42 is a block diagram of the reproducing side of a recording and reproducing apparatus in a tenth embodiment of this invention.

A tenth embodiment of this invention is similar to the eighth embodiment thereof except for design changes mentioned hereafter. FIG. 42 shows the reproducing side of a recording and reproducing apparatus in the tenth embodiment of this invention.

As shown in FIG. 42, the reproducing side of the apparatus includes a PLL circuit 162. The re-sampling DPLL section 143 (see FIG. 39) is omitted from the reproducing side of the apparatus, and the AGC and ATC circuit 142 and the adaptive equalization circuit 144 are directly connected.

The output signal of the AGC and ATC circuit 142 is fed to the adaptive equalization circuit 144 and the PLL circuit 162. The PLL circuit 162 recovers a system clock signal (a sync clock signal) from the output signal of the AGC and ATC circuit 142. The PLL circuit 162 applies the system clock signal to the A/D converter 141. The A/D converter 141 implements signal sampling in response to the system clock signal. The PLL circuit 162 generates 0-point information and a signal representative of a phase error in response to the output signal of the AGC and ATC circuit 142. The PLL circuit 162 feeds the 0-point information to the adaptive equalization circuit 144. The PLL circuit 162 feeds the phase error signal to the data length restoration circuit 156.

Eleventh Embodiment

An eleventh embodiment of this invention is similar to the seventh embodiment or the ninth embodiment thereof except for the data length restoration device 1473. In the eleventh embodiment of this invention, the data length restoration device 1473 includes memories loaded with the main signal and the likelihood information. With respect to the main signal and the likelihood information in the memories, the data length restoration device 1473 controls addresses (pointers) related to the memories to implement signal processing which is similar or equivalent to data length adjustment including interpolation or decimation.

Twelfth Embodiment

A twelfth embodiment of this invention is similar to the eighth embodiment or the tenth embodiment thereof except for the data length restoration device 1563. In the twelfth embodiment of this invention, the data length restoration device 1563 includes memories loaded with the main signal and the likelihood information. With respect to the main signal and the likelihood information in the memories, the data length restoration device 1563 controls addresses (pointers) related to the memories to implement signal processing which is similar or equivalent to data length adjustment including interpolation or decimation.

Thirteenth Embodiment

A thirteenth embodiment of this invention is similar to one of the seventh, eighth, ninth, and tenth embodiments thereof except that the setting of the likelihood information to an unlikely value (equal to "0") is performed at the time of the execution of increasing the data length (carrying out the data interpolation).

Fourteenth Embodiment

A fourteenth embodiment of this invention is similar to one of the seventh, eighth, ninth, and tenth embodiments thereof except that the adaptive equalization circuit 144 uses one of the adaptive equalization circuits 20, 20b, 20c, 20d, and 20e. It should be noted that each of the adaptive equalization circuits 20b, 20c, and 20d generates the 0-point information by itself.

What is claimed is:

1. A reproducing apparatus comprising:
    first means for reproducing a signal of a run-length-limited code from a recording medium;
    a transversal filter for subjecting the signal reproduced by the first means to partial-response waveform equalization to generate an equalization-resultant signal, the partial-response waveform equalization depending on tap coefficients;
    second means for detecting whether or not the signal reproduced by the first means corresponds to a zero-cross point, and generating 0-point information in response to a result of said detecting;
    a first delay circuit responsive to the 0-point information generated by the second means for outputting at least four successive samples of the 0-point information;
    a second delay circuit responsive to the equalization-resultant signal generated by the transversal filter for outputting at least four successive samples of the equalization-resultant signal;
    a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code;
    third means for calculating a difference between the temporary decision value of the equalization-resultant signal and an actual value thereof, and generating an error signal in response to the calculated difference; and
    fourth means for controlling the tap coefficients of the transversal filter in response to the error signal generated by the third means;
    wherein the type of the partial-response waveform equalization is PR(a, b, b, b, a).

2. A reproducing apparatus as recited in claim 1, wherein the temporary decision device comprises:
    means for designating a positionally-intermediate one among the successive samples of the 0-point information as a sample of interest;
    means for determining whether or not the 0-point information sample of interest does not correspond to a zero-cross point and the 0-point information samples immediately preceding and immediately following the 0-point information sample of interest correspond to zero-cross points;
    means for, in cases where it is determined that the 0-point information sample of interest does not correspond to a zero-cross point and the 0-point information samples immediately preceding and immediately following the 0-point information sample of interest correspond to zero-cross points, providing first target values of three successive ones among the successive samples of the equalization-resultant signal and providing second target values of the three successive ones among the successive samples of the equalization-resultant signal, the first target values corresponding to a first signal state transition and a first polarity of object one among the successive samples of the equalization-resultant signal which relates to the 0-point information sample of interest, the second target values corresponding to a second signal state transition different from the first signal state transition and a second polarity of the object one among the successive samples of the equalization-resultant signal which is opposite to the first polarity;
    means for calculating a first sum of the squares of Euclidean distances between the first target values of the three successive ones among the successive samples of the equalization-resultant signal and actual values thereof;
    means for calculating a second sum of the squares of Euclidean distances between the second target values of the three successive ones among the successive samples of the equalization-resultant signal and the actual values thereof;
    means for determining smaller one of the first and second sums;
    means for concluding an actual polarity of the object one among the successive samples of the equalization-resultant signal to be one of the first and second polarities which relates to the smaller one of the first and second sums; and
    means for calculating the temporary decision value of the equalization-resultant signal on the basis of the concluded actual polarity of the object one among the successive samples of the equalization-resultant signal.

3. A reproducing apparatus as recited in claim 1, wherein the temporary decision device comprises:
    means for designating a positionally-intermediate one among the successive samples of the 0-point information as a sample of interest;
    means for determining whether or not the 0-point information sample of interest does not correspond to a zero-cross point and the 0-point information samples immediately preceding and immediately following the 0-point information sample of interest correspond to zero-cross points;
    means for determining whether or not the 0-point information sample of interest does not correspond to a zero-cross point and only the 0-point information sample immediately following the 0-point information sample of interest corresponds to a zero-cross point;
    means for determining whether or not the 0-point information sample of interest corresponds to a zero-cross point and none of the others of the successive samples of the 0-point information corresponds to a zero-cross point; and
    means for calculating the temporary decision value of the equalization-resultant signal on the basis of a polarity of one among the successive samples of the equalization-resultant signal which positionally neighbors an equalization-resultant signal sample corresponding to the 0-point information sample of interest in cases where it is determined that the 0-point information sample of interest does not correspond to a zero-cross point and the 0-point information samples immediately preceding and immediately following the 0-point information sample of interest correspond to zero-cross points, in cases where the 0-point information sample of interest does not correspond to a zero-cross point and only the 0-point information sample immediately following the 0-point information sample of interest corresponds to a zero-cross point, and in cases where the 0-point information sample of interest corresponds to a zero-cross point and none of the others of the successive samples of the 0-point information corresponds to a zero-cross point.

4. A reproducing apparatus as recited in claim 1, further comprising:
an A/D converter for sampling the signal reproduced by the first means in response to a system clock signal to generate a sampled signal, and converting the sampled signal into a digital signal; and
means for re-sampling the digital signal generated by the A/D converter at a desired bit rate to generate a re-sampling resultant signal, and feeding the re-sampling resultant signal to the transversal filter.

5. A reproducing apparatus as recited in claim 1, further comprising means for determining whether or not the temporary decision value is in a predetermined range at least a given value away from a zero level, and means for fixing the error signal to a value of "0" when it is determined that the temporary decision value is in the predetermined range.

6. A reproducing apparatus as recited in claim 1, wherein the type of the partial-response waveform equalization is PR(1, 1, 1, 1, 1).

7. A reproducing apparatus comprising:
first means for reproducing a signal of a run-length-limited code from a recording medium;
a transversal filter for subjecting the signal reproduced by the first means to partial-response waveform equalization to generate an equalization-resultant signal, the partial-response waveform equalization depending on tap coefficients;
second means for detecting whether or not the equalization-resultant signal generated by the transversal filter corresponds to a zero-cross point, and generating 0-point information in response to a result of said detecting;
a first delay circuit responsive to the 0-point information generated by the second means for outputting at least four successive samples of the 0-point information;
a second delay circuit responsive to the equalization-resultant signal generated by the transversal filter for outputting at least four successive samples of the equalization-resultant signal;
a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code;
third means for calculating a difference between the temporary decision value of the equalization-resultant signal and an actual value thereof, and generating an error signal in response to the calculated difference; and
fourth means for controlling the tap coefficients of the transversal filter in response to the error signal generated by the third means;
wherein the type of the partial-response waveform equalization is PR(a, b, b, b, a).

8. A reproducing apparatus as recited in claim 7, wherein the second means comprises means for detecting a polarity inversion of the equalization-resultant signal, means for selecting one of two samples of the equalization-resultant signal which are positionally adjacent to the detected polarity inversion, the selected one of the samples being closer to a value of "0", and means for generating the 0-point information in response to the selected sample.

9. A recording and reproducing apparatus comprising:
first means for generating a parity signal in response to an input signal, and adding the parity signal to the input signal to generate a parity-added signal;
a run length encoder for converting every "m" bits of the parity-added signal to "n" bits of a signal of a run-length-limited code, where "m"<"n";
second means for recording the signal of the run-length-limited code on a recording medium;
third means for reproducing the signal of the run-length-limited code from the recording medium;
an A/D converter for converting the signal reproduced by the third means into a digital reproduced signal;
a phase locked loop for re-sampling the digital reproduced signal at a re-sampling frequency to generate a re-sampling resultant signal, extracting a phase error from the digital reproduced signal, and controlling the re-sampling frequency in response to the extracted phase error;
fourth means for detecting whether or not the re-sampling resultant signal generated by the phase locked loop corresponds to a zero-cross point, and generating 0-point information in response to a result of said detecting;
an adaptive equalizer for subjecting the re-sampling resultant signal to waveform equalization in response to the 0-point information generated by the fourth means to generate an equalization-resultant signal;
a maximum likelihood decoder for subjecting the equalization-resultant signal to maximum likelihood decoding to generate a first decoding-resultant signal and first likelihood information relating to the first decoding-resultant signal;
a run length decoder for converting every "n" bits of the first decoding-resultant signal to "m" bits of a second decoding-resultant signal, and converting the first likelihood information to second likelihood information relating to the second decoding-resultant signal; and
fifth means for subjecting the second decoding-resultant signal generated by the run length decoder to error correction in response to a parity signal contained in the second decoding-resultant signal.

10. A reproducing apparatus comprising:
first means for reproducing a signal of a run-length-limited code from the recording medium;
an A/D converter for converting the signal reproduced by the first means into a digital reproduced signal;
a phase locked loop for re-sampling the digital reproduced signal at a re-sampling frequency to generate a re-sampling resultant signal, extracting a phase error from the digital reproduced signal, and controlling the re-sampling frequency in response to the extracted phase error;
second means for detecting whether or not the digital reproduced signal corresponds to a zero-cross point, and generating 0-point information in response to a result of said detecting;
an adaptive equalizer for subjecting the re-sampling resultant signal to waveform equalization in response to the 0-point information generated by the second means to generate an equalization-resultant signal;

a maximum likelihood decoder for subjecting the equalization-resultant signal to maximum likelihood decoding to generate a first decoding-resultant signal and first likelihood information relating to the first decoding-resultant signal;

a sync signal detector for detecting every sync signal in the first decoding-resultant signal;

third means for measuring a time interval between adjacent sync signals detected by the sync signal detector;

fourth means for determining whether or not the time interval measured by the third means is equal to a predetermined reference value;

fifth means for detecting at least one of (1) when an absolute value of the phase error exceeds a prescribed threshold value and (2) when the absolute value of the phase error is maximized, and generating slip point information representing a time position corresponding to said detecting;

sixth means for subjecting the first decoding-resultant signal and the first likelihood information to data length adjustment at the time position represented by the slip point information to generate a second decoding-resultant signal and second likelihood information in cases where the fourth means determines that the time interval measured by the third means is not equal to the predetermined reference value and the fifth means detects at least one of (1) when the absolute value of the phase error exceeds the prescribed threshold value and (2) when the absolute value of the phase error is maximized and; and a run length decoder for converting every "n" bits of the second decoding-resultant signal to "m" bits of a third decoding-resultant signal, and converting the second likelihood information to third likelihood information relating to the third decoding-resultant signal, where "m"<"n".

11. A reproducing apparatus comprising:

first means for reproducing a signal of a run-length-limited code from the recording medium;

an A/D converter for converting the signal reproduced by the first means into a digital reproduced signal;

a phase locked loop for re-sampling the digital reproduced signal at a re-sampling frequency to generate a re-sampling resultant signal, extracting a phase error from the digital reproduced signal, and controlling the re-sampling frequency in response to the extracted phase error;

second means for detecting whether or not the re-sampling resultant signal corresponds to a zero-cross point, and generating 0-point information in response to a result of said detecting;

an adaptive equalizer for subjecting the re-sampling resultant signal to waveform equalization in response to the 0-point information generated by the second means to generate an equalization-resultant signal;

a maximum likelihood decoder for subjecting the equalization-resultant signal to maximum likelihood decoding to generate a first decoding-resultant signal and first likelihood information relating to the first decoding-resultant signal;

a sync signal detector for detecting every sync signal in the first decoding-resultant signal;

third means for measuring a time interval between adjacent sync signals detected by the sync signal detector;

fourth means for determining whether or not the time interval measured by the third means is equal to a predetermined reference value;

fifth means for detecting at least one of (1) when an absolute value of the phase error exceeds a prescribed threshold value and (2) when the absolute value of the phase error is maximized, and generating slip point information representing a time position corresponding to said detecting;

sixth means for subjecting the first decoding-resultant signal and the first likelihood information to data length adjustment at the time position represented by the slip point information to generate a second decoding-resultant signal and second likelihood information in cases where the fourth means determines that the time interval measured by the third means is not equal to the predetermined reference value and the fifth means detects at least one of (1) when the absolute value of the phase error exceeds the prescribed threshold value and (2) when the absolute value of the phase error is maximized and; and a run length decoder for converting every "n" bits of the second decoding-resultant signal to "m" bits of a third decoding-resultant signal, and converting the second likelihood information to third likelihood information relating to the third decoding-resultant signal, where "m"<"n".

12. A reproducing apparatus as recited in claim 10, wherein the adaptive equalizer comprises:

a transversal filter for subjecting the re-sampling resultant signal to partial-response waveform equalization to generate the equalization-resultant signal, the partial-response waveform equalization depending on tap coefficients;

a first delay circuit responsive to the 0-point information for outputting at least four successive samples of the 0-point information;

a second delay circuit responsive to the equalization-resultant signal for outputting at least four successive samples of the equalization-resultant signal;

a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code;

means for calculating a difference between the temporary decision value of the equalization-resultant signal and an actual value thereof, and generating an error signal in response to the calculated difference; and means for controlling the tap coefficients of the transversal filter in response to the generated error signal;

wherein the type of the partial-response waveform equalization is PR(a, b, b, b, a).

13. A reproducing apparatus as recited in claim 11, wherein the adaptive equalizer comprises:

a transversal filter for subjecting the re-sampling resultant signal to partial-response waveform equalization to generate the equalization-resultant signal, the partial-response waveform equalization depending on tap coefficients;

a first delay circuit responsive to the 0-point information for outputting at least four successive samples of the 0-point information;

a second delay circuit responsive to the equalization-resultant signal for outputting at least four successive samples of the equalization-resultant signal;

a temporary decision device for calculating a temporary decision value of the equalization-resultant signal on the basis of a PR mode signal, an RLL mode signal, the successive samples of the 0-point information which are outputted from the first delay circuit, and the successive samples of the equalization-resultant signal which are outputted from the second delay circuit, the PR mode signal representing a type of the partial-response waveform equalization, the RLL mode signal representing a type of the run-length-limited code;

means for calculating a difference between the temporary decision value of the equalization-resultant signal and an actual value thereof, and generating an error signal in response to the calculated difference; and means for controlling the tap coefficients of the transversal filter in response to the generated error signal;

wherein the type of the partial-response waveform equalization is PR(a, b, b, b, a).

* * * * *